US008042064B2

(12) United States Patent  (10) Patent No.: US 8,042,064 B2
Cardu  (45) Date of Patent: Oct. 18, 2011

(54) SYSTEM AND METHOD FOR DELIVERING VIRTUAL TOUR CONTENT USING THE HYPER-TEXT TRANSFER PROTOCOL (HTTP)

(76) Inventor: Salvatore Cardu, Petersfield (GB)

( * ) Notice: Subject to any disclaimer, the term of this patent is extended or adjusted under 35 U.S.C. 154(b) by 651 days.

(21) Appl. No.: 11/552,578

(22) Filed: Oct. 25, 2006

(65) Prior Publication Data

US 2008/0222538 A1  Sep. 11, 2008

(30) Foreign Application Priority Data

Oct. 26, 2005 (GB) .................................. 0521796.3

(51) Int. Cl.
G06F 3/00 (2006.01)
(52) U.S. Cl. ........ 715/850; 715/719; 715/723; 715/720; 715/722; 715/848; 715/849; 715/851; 715/852
(58) Field of Classification Search .......... 715/719–723, 715/848–852
See application file for complete search history.

(56) References Cited

U.S. PATENT DOCUMENTS

| | | | | |
|---|---|---|---|---|
| 5,790,121 A * | 8/1998 | Sklar et al. | ..................... | 715/853 |
| 5,897,619 A * | 4/1999 | Hargrove et al. | ................. | 705/4 |
| 6,005,679 A * | 12/1999 | Haneda | ......................... | 358/453 |
| 6,459,442 B1 * | 10/2002 | Edwards et al. | .............. | 715/863 |
| 6,477,526 B2 * | 11/2002 | Hayashi et al. | ....................... | 1/1 |
| 6,580,441 B2 * | 6/2003 | Schileru-Key | ................ | 715/805 |
| 6,691,282 B1 * | 2/2004 | Rochford et al. | ............. | 715/234 |
| 6,985,929 B1 * | 1/2006 | Wilson et al. | ................. | 709/217 |
| 7,388,519 B1 * | 6/2008 | Kreft | ........................ | 340/995.24 |
| 7,392,208 B2 * | 6/2008 | Morse et al. | .................... | 705/26 |
| 7,570,261 B1 * | 8/2009 | Edecker et al. | ............... | 345/420 |
| 2002/0070981 A1 * | 6/2002 | Kida | ............................. | 345/833 |
| 2002/0163547 A1 * | 11/2002 | Abramson et al. | ............ | 345/855 |
| 2005/0128212 A1 * | 6/2005 | Edecker et al. | ............... | 345/582 |
| 2005/0273458 A1 * | 12/2005 | Adams | .............................. | 707/1 |
| 2006/0206345 A1 * | 9/2006 | Lundberg et al. | ................. | 705/1 |
| 2009/0132316 A1 * | 5/2009 | Florance et al. | ................... | 705/7 |

\* cited by examiner

*Primary Examiner* — Simon Ke

(57) ABSTRACT

A system and method for delivering Virtual Reality (VR) tour content and spatial navigation comprising the hyper-text transfer protocol (HTTP) through a dynamic web-based relational database that stores, manipulates, co-ordinates and classifies complex digital data sets over a common gateway interface for on request interactive exchange and search engine retrieval of hotspots. The dynamic online-based software generates and organizes dynamic VR tours through a secure intuitive back-end system allowing the administrator/licensee to maintain technical, quality and security control ensuring secure access for development, modification, management, and distribution of each VR tour. Each VR tour encompasses the interactive exchange of hotspots allowing visitors to interact with still or panoramic pictures and videos which are linked to graphical site information (e.g. maps), URL web-links, text, hyperlinked banners, PDF documents, audio files and direct email-links which can automatically be modularized for off-line operation on mobile devices such as laptops, PDA's and CD's.

10 Claims, 52 Drawing Sheets

Edit a City

* Fields in Bold are mandatory.
* Please upload only standard .jpg images.
* Banner can be .jpg or .swf files.

| | |
|---|---|
| City Name | testcity1a |
| Country Name | India |
| Large Map | [Browse] (For better view upload 1024X768 pixels images) testmainmap1.jpg |
| Map PDF | [Browse] printable-gtg-flyer.pdf |
| Picture | [Browse] (For better view upload 1075X161 pixels images) testtoppicture1.jpg |
| Select Picture Type | 180 Degree Image |
| Audio For Picture | [Browse] sound1.mp3 |
| Banner | [Browse] (For better view upload 106X402 pixels images) kontext3.jpg |
| Tour Description | Test city tour 1 |
| Status | Active |

[Update City]

Figure 33
Figure 34
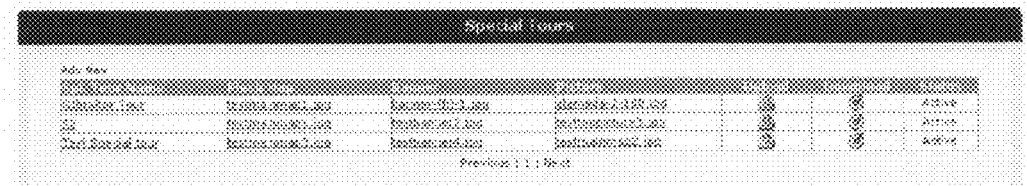
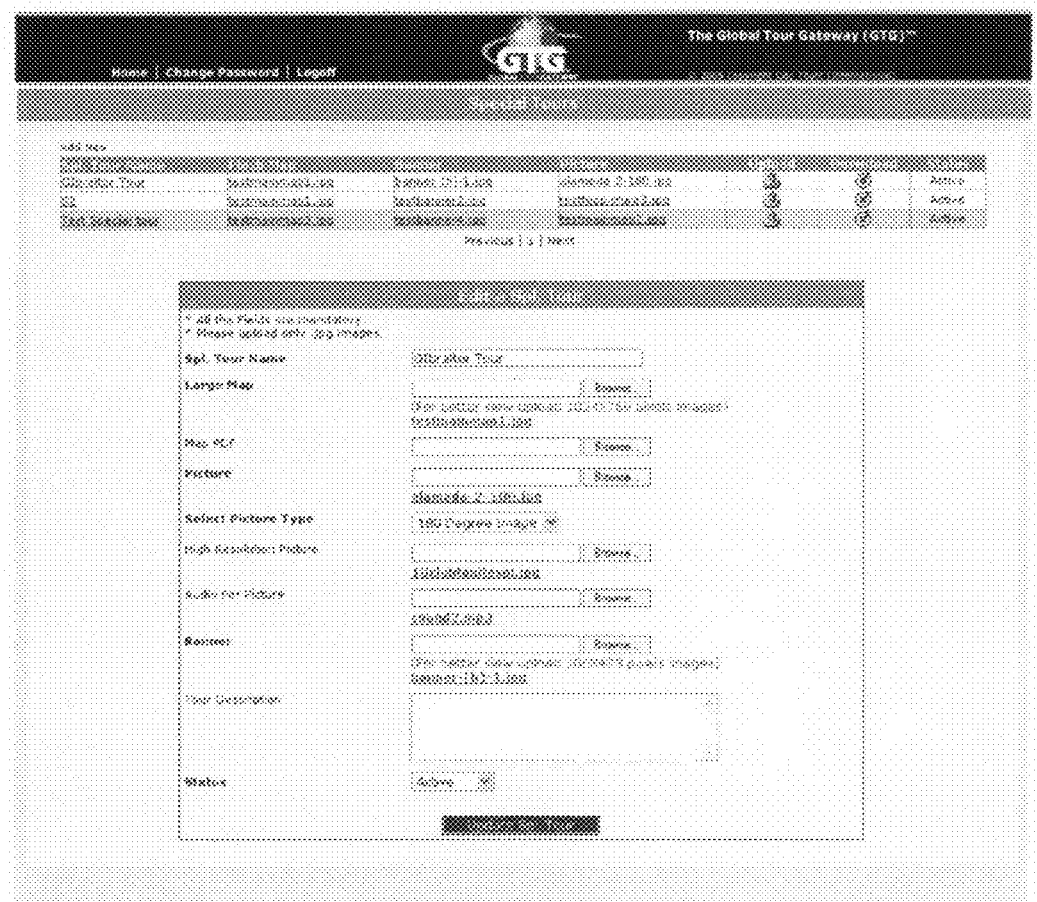

Figures 65, 66, 67:
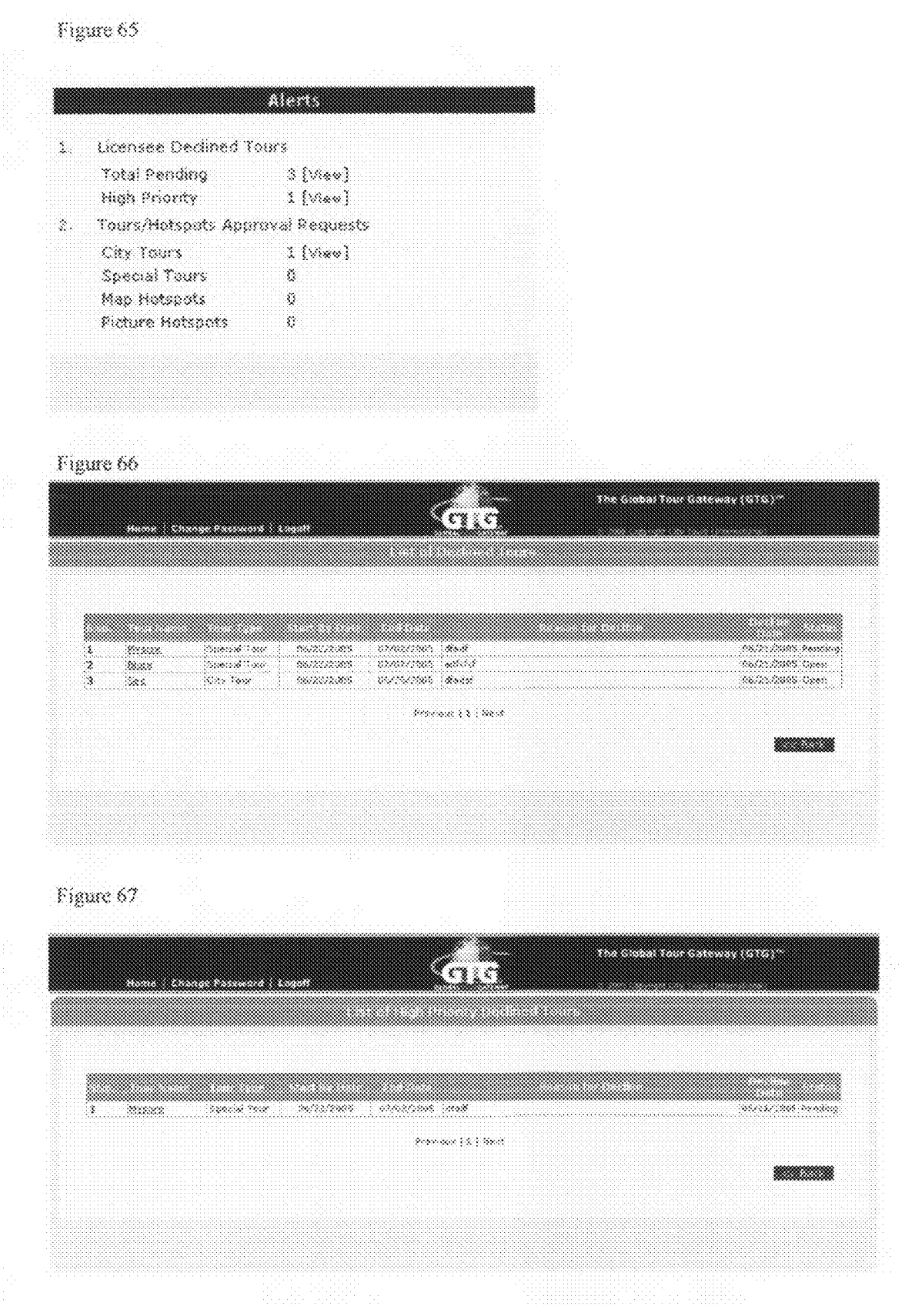

| Alerts | |
|---|---|
| 1. Licensee Declined Tours | |
| Total Pending | 3 [View] |
| High Priority | 1 [View] |
| 2. Tours/Hotspots Approval Requests | |
| City Tours | 1 [View] |
| Special Tours | 0 |
| Map Hotspots | 0 |
| Picture Hotspots | 0 |

The Global Tour Gateway (GTG)™

Home | Change Password | Logoff

© 2005 Copyright City Tours (International)

Manage Tour Details

Constraints on City Tour

| Map Hotspots | Picture Hotspots | Picture Hotspots Level | No of Uploads | Start By Date | Duration |
|---|---|---|---|---|---|
| 3 | 2 | 2 | 2 | 31-May-2005 | 21 |

* Fields in Bold are mandatory.
* Please upload only standard .jpg images.
* Banner can be .jpg or .swf files.

City Tour: Hyd

Country Name: Test Country
Cannot find the country you are looking for? click here.

Tour Description: [         ]

Choose Categories

Available Categories:
- Course
- Drink & Food
- Education
- Education & Entertainme

[Deselect All] [Select All] [Deselect] [Select]

Selected Categories:
- Health

Note: If any changes are made in selecting categories after hotspots are added to the tour, the hotspots related to those categories will not be visible.

Large Map: [Browse...]
(For better view upload 1024X768 pixels images)
testmainmap4.jpg

Map PDF: [Browse...]

Picture: [Browse...]
(For better view upload 1975X161 pixels images)
testtoppicture4.jpg Select Picture Type: 360 Degree Image High Resolution Picture: [Browse...]

Audio For Picture: [Browse...]

Banner: [Browse...]
(For better view upload 106X423 pixels images)
testbanner4.jpg Skin Color: [■]

Status: Active

[<< Back] [Update Tour Details]          ^Top

SYSTEM AND METHOD FOR DELIVERING VIRTUAL TOUR CONTENT USING THE HYPER-TEXT TRANSFER PROTOCOL (HTTP)

CLAIM OF PRIORITY

I claim foreign priority of GB 0521796.3 filed on 26 Oct. 2005

BACKGROUND OF THE INVENTION

1. Field of the Invention

The present invention relates to a system and method for the delivery and administration of intuitively synchronized geographical multimedia content via HTTP for the purpose of enabling virtual tours of real geographical sites using an internet browser.

2. Description of Related Art

BACKGROUND

Globalization has increased the competitive pressures, challenges, and rewards for just about every industry on the planet. The continuing eradication of geographical, political, and temporal boundaries have forced private industries and governments alike to adopt new strategies and techniques in order to be among other things more accommodating and reactive to customers. The Internet has set the stage to a great degree for globalization but has also provided many emerging technologies for enabling companies of all types to meet the competitive challenges of globalization. One such emerging technology is the provision, administration of virtual tours of various real geographical sites through an internet browser front-end. An increasing number of organizations in industries (like hospitality and entertainment) where high visibility is of great importance are waking up to the benefit of being able to provide virtual tours of properties, facilities, and services through a high availability low cost medium in order to reach as wide an audience as possible.

There is the need to develop a virtual tour technology that has a back-end that is capable of the high speed manipulation of complex multimedia data sets, process interactions, and digital information environments in response to a highly intuitive, easily accessed, and user friendly front-end. There is also the need to deliver this technology according to application solution provisioning (ASP) method in order to ensure a range of possible service provisioning that would ensure that the solution provider could maintain technical control, quality control, and security control of the platform as it is internet based, and to ensure customer organizations of all sizes secure access for development and administration of their respective site tours.

BRIEF SUMMARY OF THE INVENTION

The present invention relates to embodiments of a system and method for delivering virtual tour content and spatial navigation whereby the hyper-text transfer protocol (HTTP) through a dynamic web based relational database that stores, manipulates, co-ordinates and classifies complex digital data sets over a common gateway interface by country and city for on request interactive exchange and search engine retrieval, and allows to administer, organise, post, update and interact with still, panoramic images or videos which are linked to graphical site information (e.g. maps), URL web links, text, hyperlinked publicity banners, portable document formats, audio files, URL links and direct email contacts which can automatically be modularised for of line operation or presentation on mobile devices such as laptops, hand held computers, laptops, personal digital assistants and storage media such as compact discs, and can be dynamically modified by the applications self generated login name(s) and password(s). According to a variation, an embodiment allows for management of default settings for each tour allowing the administrator/licensee to select any hotspot to become the default hotspot in the tour and change the skin colour and logo if required. According to another variation, an embodiment allows for and comprises the administrator to add, modify, and delete licensee tours.

Now, according to one variation of the present invention, an embodiment enables an administrator/licensee to securely and continuously create, store, co-ordinate, administer, alter application skin colour and/or logo, change their password and deliver the interactive exchange of dynamic, interactive virtual tour information according to geographical boundaries through a user-friendly application with self explanatory series of back-end intuitively structured information field components that require no coding or computer programming skills and that the administrator/licensee can operate completely with mouse access throughout the application. In addition, there is a variation embodiment wherein the embedding of hotspots in all tours including a descriptive title for the hotspot and its associated still or panoramic image or video clip that features associated PDF file, text description, MP3 auditory sound bytes for on demand playback, manageable thumbnail that can be instructed to stay on at all times or under specific categories, embedded URL links, email address links, promotional/information banners with embedded links, and both mandatory and optional basic contact information e.g. Door No, Street name, Office Phone 1 and 2, Mobile No, Fax No, City, Country, Post Code, Email Id and Website URL.

Furthermore, according to another variation of the present invention, dynamic digital data sets are stored and then activated through user interaction by a series of distinct and clearly defined manageable categorised hypertext words, internal search engine and/or dynamic hotspots which in turn triggers the delivery of an interactive panoramic image or video, its associated text, web link, email, audio, hyperlinked banner, graphical site information and PDF which the end user commands and directs through intuitive virtual controls. According to a further variation of the present invention, an embodiment allows for continuous modifications by administrator or licensee to manage their respective tour module and constantly access, modify and enhance the delivery of respective virtual tours to the end user(s).

According to still another variation of the present invention, an embodiment allows the status of an entire tour or an individual hotspots to be made inactive and/or active (viewable or un-viewable) by administrator/licensee by way of a drop down menu. Likewise, according to a different variation, an embodiment allows the licensee to add a hotspot by clicking the 'Add Hotspot' button which in turn prompts the administrator or licensee to pinpoint a particular position by means of crosshairs/reticle indicator to place a hotspot on the map. In addition, according to another variation, an embodiment consists of allowing the licensee to 'Edit', 'Delete' or 'Move' a hotspot by placing the mouse/cursor over a hotspot. Furthermore, according to another variation, an embodiment prompts the administrator/licensee to select one of the following three options via a drop down menu a) 'Still Image', b) '180 Degree Image, or c) '360 Degree Image' image options to regulate how image is revealed and allowed to be controlled by the end user. Now, according to another variation, an embodiment permits the administrator/licensee to link any hotspots within a tour or within a picture to be linked to any hotspot within the tour that the administrator/licensee chooses to link and allows the linked hotspots alternative associated text and PDF files. Furthermore, according to another variation, an embodiment allows for the modified tour(s) to be uploaded by the administrator/licensee to a unique URL on the www.gtgvr.com server or downloaded for offline presentations, distribution on CD, personal digital assistants or to be uploaded to one or more websites. Furthermore, according to still another variation, an embodiment permit the super administrator to add to the number of Map Hotspots, Picture Hotspots, Picture Hotspot Levels, number of Uploads and duration of the tour. Finally, according to another variation, there is an embodiment having a security feature that prohibits a tour to go live prior to approval by the super administrator by notifying the super administrator that tour(s) or hotspot(s) have been requested for approval which in turn ensures that offensive or malicious material is not uploaded and if such material is detected the licensee will be notified and the tour will be declined allowing the client to remove or replace the offensive or malicious.

BRIEF DESCRIPTION OF DRAWINGS AND TABLES

An embodiment of the invention will now be described by way of example only with reference to the accompanying tables in which:

Figures 5, 6:
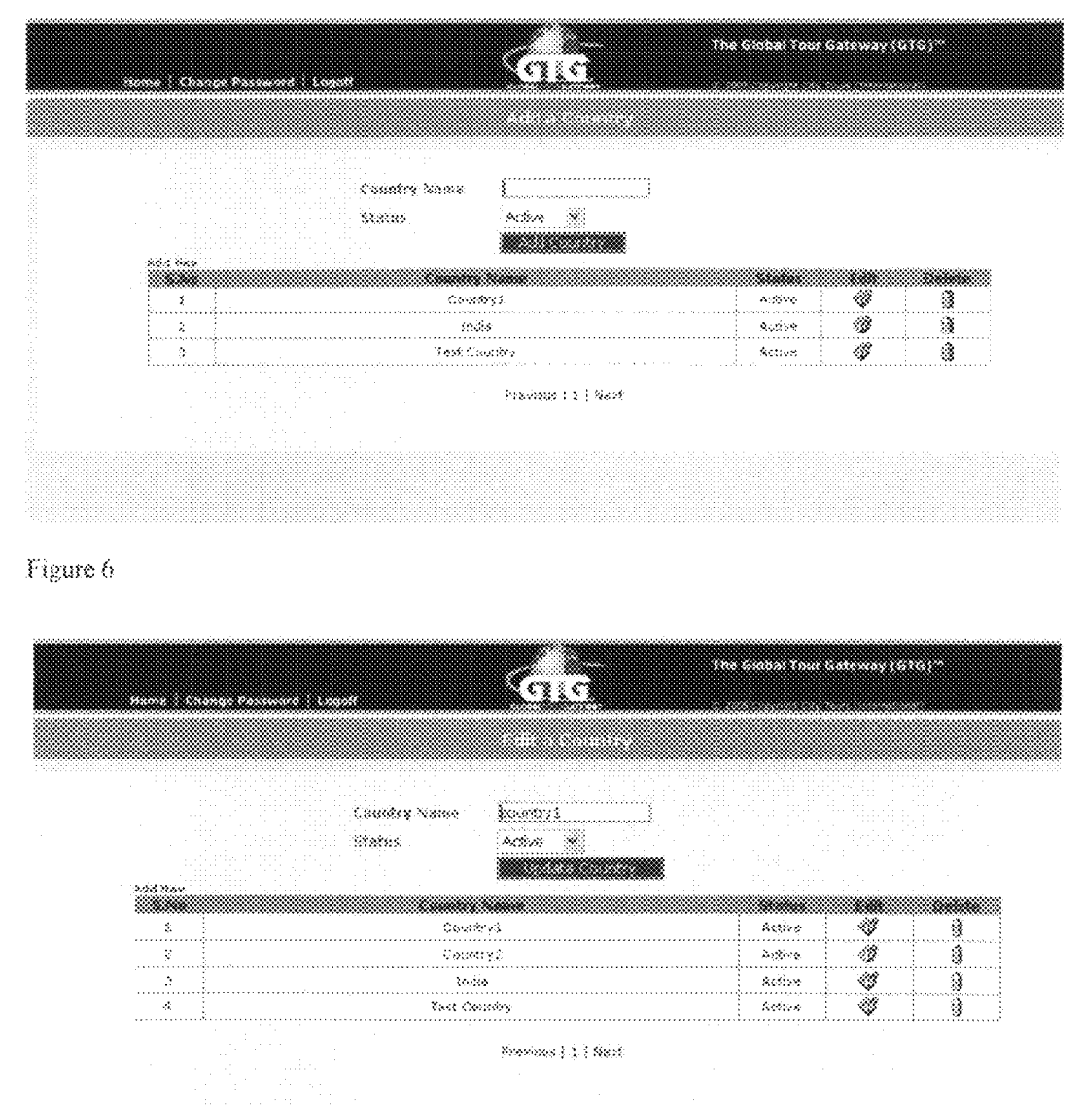

FIG. 5 is a representation of the adding of a geographical location such as a country, according to an exemplary embodiment of the present invention;

FIG. 6 is a representation of the editing of information for a specified country, according to an exemplary embodiment of the present invention;

FIG. 9 is a representation of how a tour in a city can be edited, according to an exemplary embodiment of the present invention;

FIG. 10 is a screen shot illustrating the Admin Login screen for access to the Database Control Panel, according to an exemplary embodiment of the present invention;

FIG. 15 is a screen shot illustrating the Add/Manage a City screen which allows the admin to add a city, city map, picture and banner to a City Tour, according to an exemplary embodiment of the present invention;

FIG. 16 is a screen shot illustrating the information associated to a City Tour with links for managing and viewing, according to an exemplary embodiment of the present invention;

FIG. 17 is a screen shot illustrating the fields for editing the existing City details, according to an exemplary embodiment of the present invention;

FIG. 18 is a screen shot illustrating the ability to Manage a Categories, according to an exemplary embodiment of the present invention;

FIG. 23 is a screen shot illustrating the add fields for Managing City Hotspots, according to an exemplary embodiment of the present invention;

FIG. 33 is a screen shot illustrating the Edit fields for Special City tours, according to an exemplary embodiment of the present invention;

FIG. 34 is a screen shot illustrating the module for adding a Special City in a specified country, according to an exemplary embodiment of the present;

FIG. 53 is a screen shot illustrating the My Tour Screen Page for a licensee with accepted tour, according to an exemplary embodiment of the present invention;

FIG. 65 is a screen shot illustrating the Alerts message window, according to an exemplary embodiment of the present invention;

FIG. 66 is a screen shot illustrating the List of Declined Tours, according to an exemplary embodiment of the present invention;

FIG. 67 is a screen shot illustrating the List of High Priority Declined Tours, according to an exemplary embodiment of the present invention;

FIG. 70 is a screen shot illustrating the Licensee Home page, according to an exemplary embodiment of the present invention;

FIG. 71 is a screen shot illustrating the Licensee Manage Tour Details page, according to an exemplary embodiment of the present invention;

DESCRIPTION OF EMBODIMENTS

Figure 1:
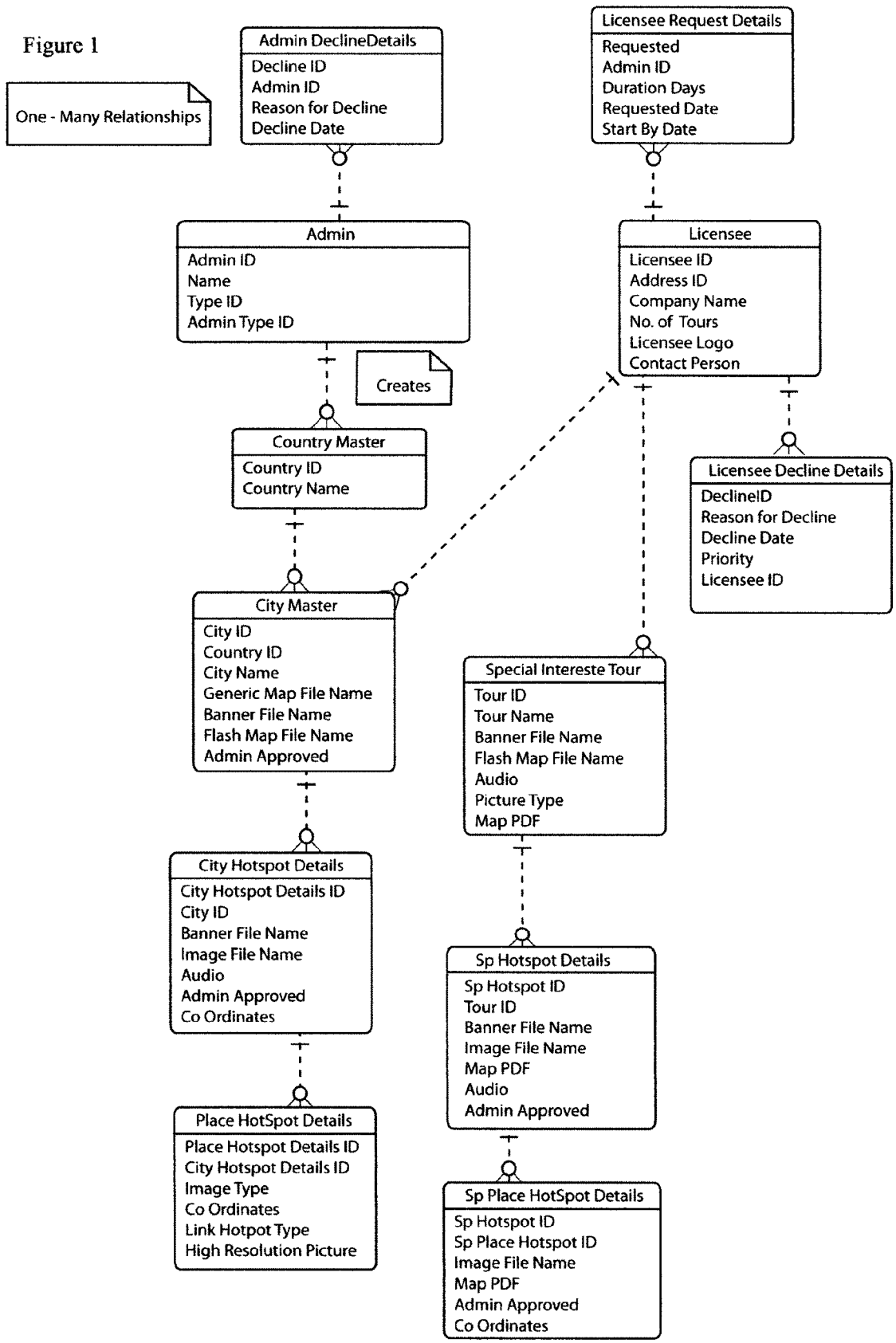
FIG. 1 is a representation of the relational database on the web server that stores the multimedia content for the tours and the administration control rules, according to an exemplary embodiment of the present invention.
Figure 2:
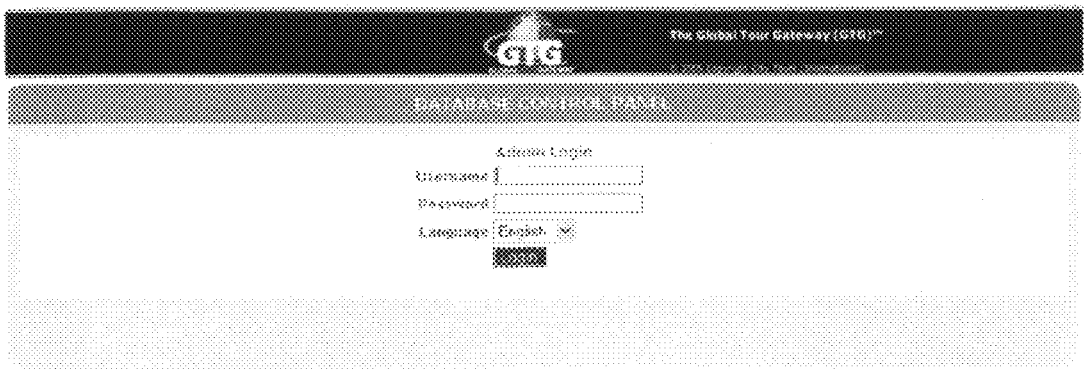
FIG. 2 is a representation of the Admin Module log on panel, according to an exemplary embodiment of the present invention.
Figure 3:
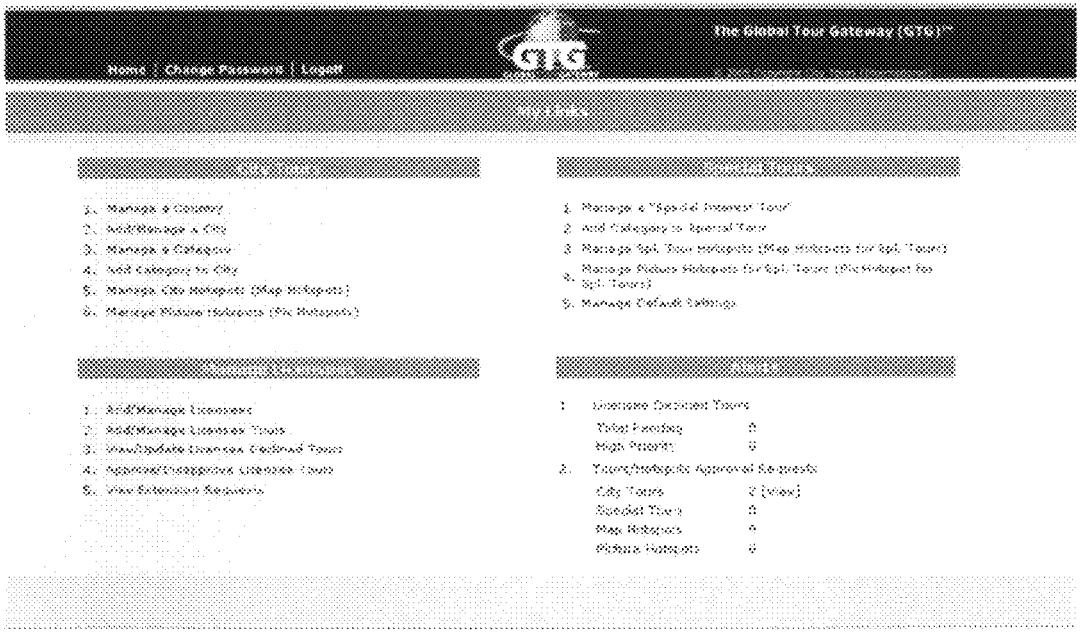
FIG. 3 is a representation of the Admin Module control panel, according to an exemplary embodiment of the present invention.
Figure 4:
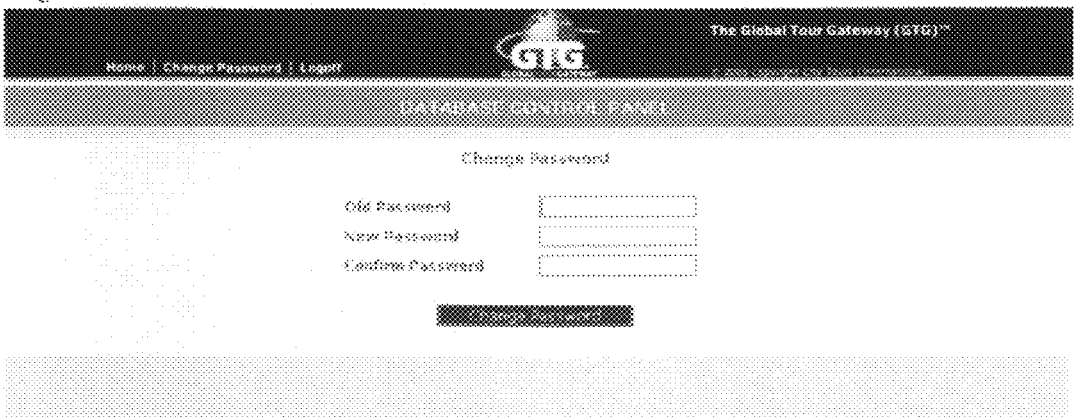
FIG. 4 is a representation of the change password module, according to an exemplary embodiment of the present invention.
Figure 7:
FIG. 7 is a representation of the editing module for adding a city in a specified country, according to an exemplary embodiment of the present invention.
Figure 8:
FIG. 8 is a representation of how one or several tours can be added under a specified city, according to an exemplary embodiment of the present invention.

The instant invention relates to embodiments of a web based system for delivering complex multimedia data sets, process interactions, and digital information that comprises of: (1) An administration module for access control (usernames and passwords), data input, and development of multimedia content stored in a relational database backend; (2) A web interface for the delivery multimedia content and the interactive exchange of information with end-users; and (3) A high performance relational database backend for the storage and co-ordination of multimedia content for tours and hotspots with each tour. The instant invention also relates to embodiments of a system for the organization and classification of multimedia content into tours according to geographical boundaries e.g. by country, by city, and by location and that accommodates: (1) The continuous amendment, adjusting, and appending of tour content; (2) The uploading of prior customized tour content to the relational database backend; and (3) The downloading of modularized versions of tours for usage on mobile devices such as laptops, storage media such as compact discs, and other web site locations. The instant invention further relates to embodiments of a system for the linkage and synchronization of menu items and intuitive controls with graphical site information (e.g. maps), pictorial layouts (e.g. 180° or 360° photo shots), sound bytes, and web site information. The instant invention in addition relates to embodiments of a license management module for the access control of developers to tours they have developed for delivery to end-users. The instant invention relates to embodiments of an interactive keyword search engine for each defined tour to locate hotspots. Furthermore, the instant invention relates to embodiments of a method for embedding hotspots into each tour that features: (1) Including PDF files such as rate sheets, menus, flyers, brochures, vouchers that end users can view and print out at any location; (2) Text descriptions for providing end users with more information on the hotspot; (3) MP3 file embedding for audio playback of narrated tours; (4) The embedding of video files, 180° or 360° photo shots and the synchronization with MP3 files with narration; (5) URL embedding for linkage to other websites that would have further information regarding the hotspot; (6) Email address linkage in order to facilitate contact by email messages; and (7) Activation triggers for the temporary de-activation of hotspots in the event a developer is in the process of updating information about said hotspot. Now, the instant invention also relates to embodiments of Inter-connectivity between hotspots within a tour; to embodiments of Modification of tour skin for personalization requirements; to embodiments of Facility to up-load logo to allow for personal branding requirements; and to embodiments of Distinct directories defined in each tour database for category listings for each hotspot.

DETAILED DESCRIPTION

1. Admin Module

The admin module consists of a City Tour and a Special Tour. The admin module maintains the information regarding the city tour and special tour and also the information regarding the licensee. The admin in the Licensee module is referred to as Super admin.

1.1 Logging into Admin Module

Figures 9, 10:
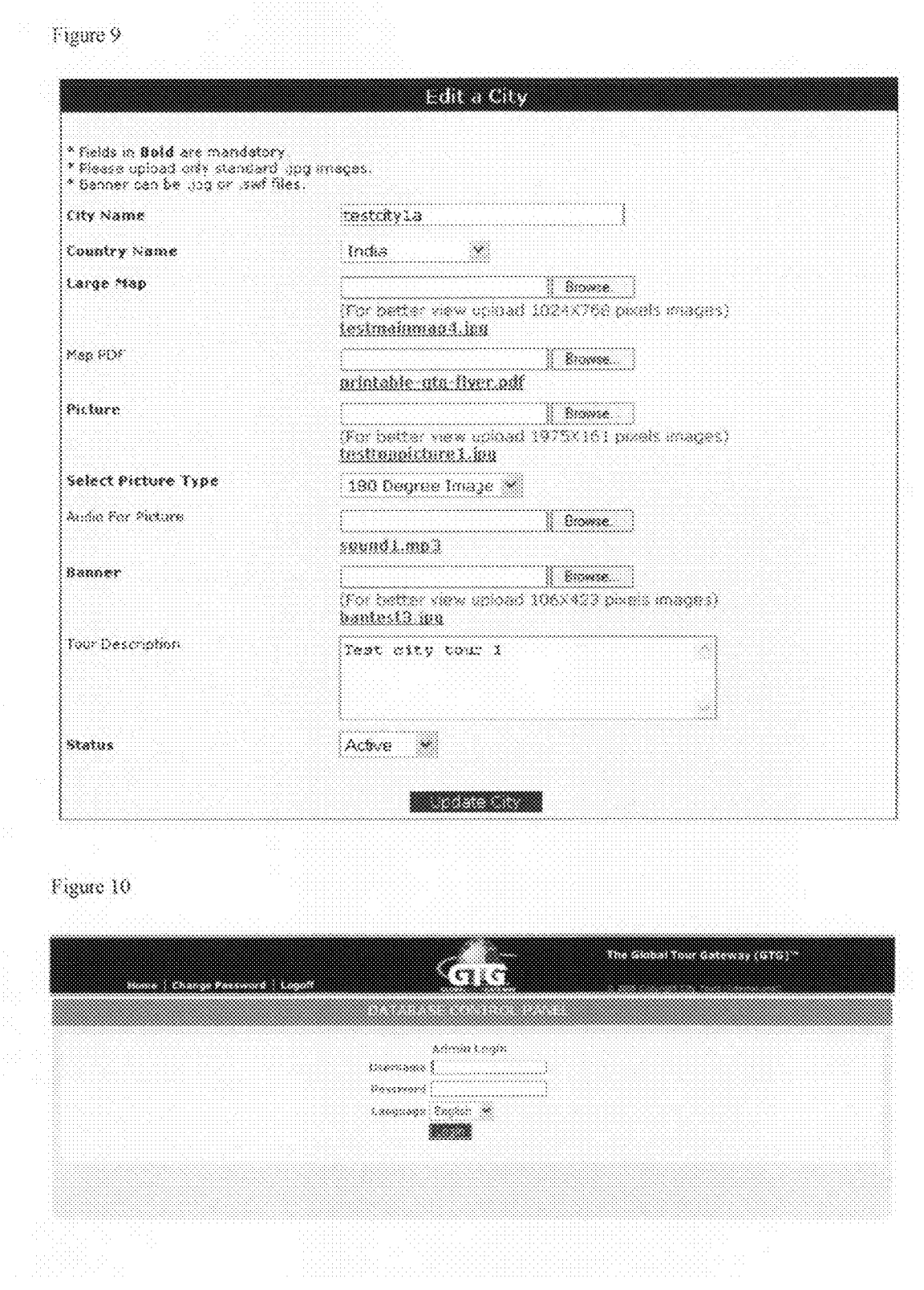

When the Admin enters the application path in the address bar of a browser a Login form is displayed as shown in FIG. 10.

1.2 Login and Password

Access to Admin module is based on a User Name and Password authentication, as shown above. Initially, the admin is provided with the default User Name and Password to access the application for the first time. Subsequently, the admin can change the Password. The language is set to English by default. If the User Name and Password are authenticated, then the home page is displayed else the admin is prompted to check the entered values when the Login button is clicked.

1.3 Home Page

Figure 11:
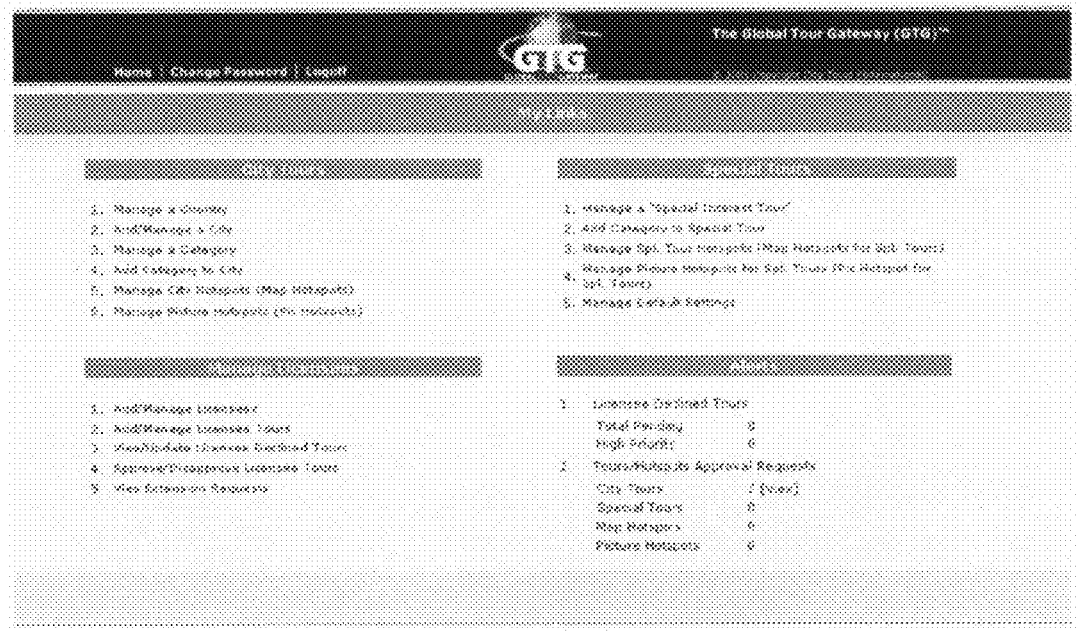
FIG. 11 is a screen shot illustrating the Admin Home Screen which allows the Admin to navigate and access the rules to City and Special Tours and Mange Licensees and Alerts, according to an exemplary embodiment of the present invention.

Immediately when the admin logs in the Home Page opens as shown in FIG. 11.

The home page is a default page from which the admin can navigate to the desired sections. The home page displays three hyperlinks on the right top corner. The following are the user preferences, which can be set by the user any time:

1. 1. Home
2. 2. Change Password
3. 3. Log off

Note: The three hyperlinks are displayed on each and every screen of City Explorer, so that the admin can go the home page or change password or log off whenever required.

Home

Allows the admin to go to the home page whenever required.

Change Password

Figure 12:
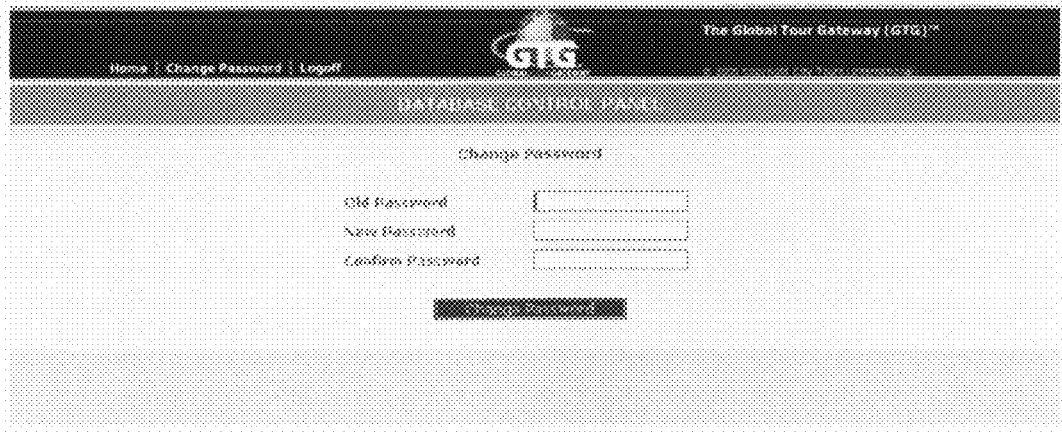
FIG. 12 is a screen shot illustrating the Change Password screen, according to an exemplary embodiment of the present invention.

Allows the admin to change the existing password. The change password screen can be invoked by clicking the Change Password link as shown in FIG. 12.

About the Fields:

| Fields | Description |
|---|---|
| Old Password | Allows the admin to enter the existing password. [Edit Box] - [Mandatory] |
| New Password | Allows the admin to enter new password [Edit Box] - [Mandatory] |

| Fields | Description |
| --- | --- |
| Confirm password | Allows the admin to re-enter new password, which should be exactly the one entered in Password field. [Edit Box] - [Mandatory] |
| Change Password | When clicked, validates all fields, change the password and navigates the admin to the home page. [Edit Box] - [Mandatory] |

Once the admin enters all the values and clicks the Change Password button the home page will be displayed. When the admin clicks the Change Password button the entered values are validated and the admin is prompted to check the values if the values of the fields are not matching.

1.4 My Links

The My Links consists of four sections:
City Tours: Allows the admin to add city tours.
Special Tours: Allows the admin to add special tours.
Manage Licensees: Allows the admin to add/manage licensees.
Alerts: Provides the alerts to the admin.

1.4.1 City Tours

The City Tours section allows the admin to add and manage the Country, City, Category, map hotspots, and picture hotspots.

1.4.1.1 Manage a Country

Figure 13:
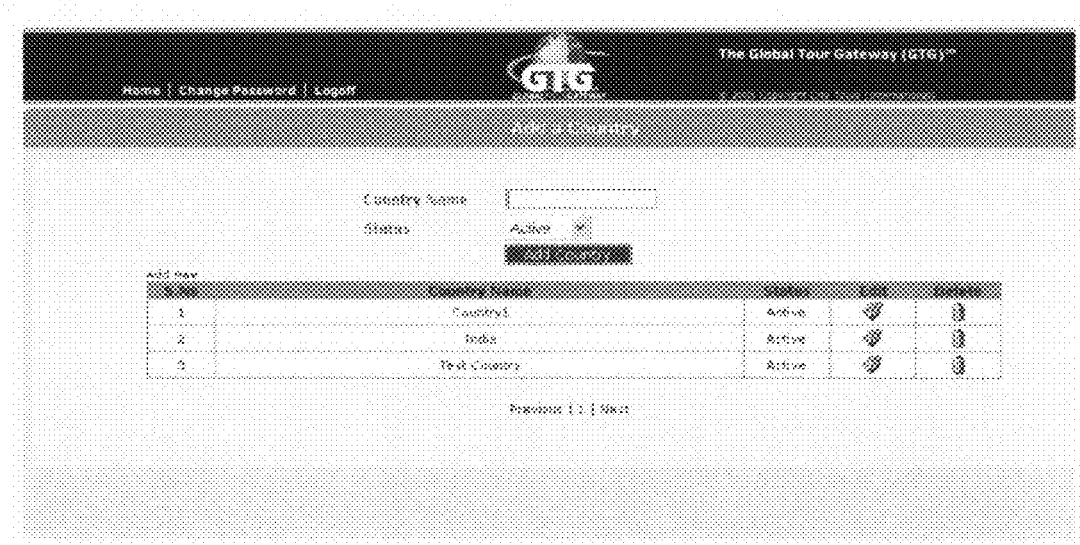
FIG. 13 is a screen shot illustrating the Manage a Country screen enabling the ability to add a new country to the tour or manage the existing records, according to an exemplary embodiment of the present invention.

Manage a Country screen helps the admin to add a new country to the tour or manage the existing records. Add a Country screen as shown in FIG. 13 can be invoked by clicking the Manage a Country link.

About the Fields:

| Fields | Description |
| --- | --- |
| Country Name | Allows the admin to enter name of the country. [Edit box] - [Mandatory] |
| Status | Holds the status either Active or Inactive. [Combo Box] |
| Add Country | When clicked, saves the changes made by the admin. [Button] |

The admin needs to enter the relevant information into the fields and save.

Figure 14:
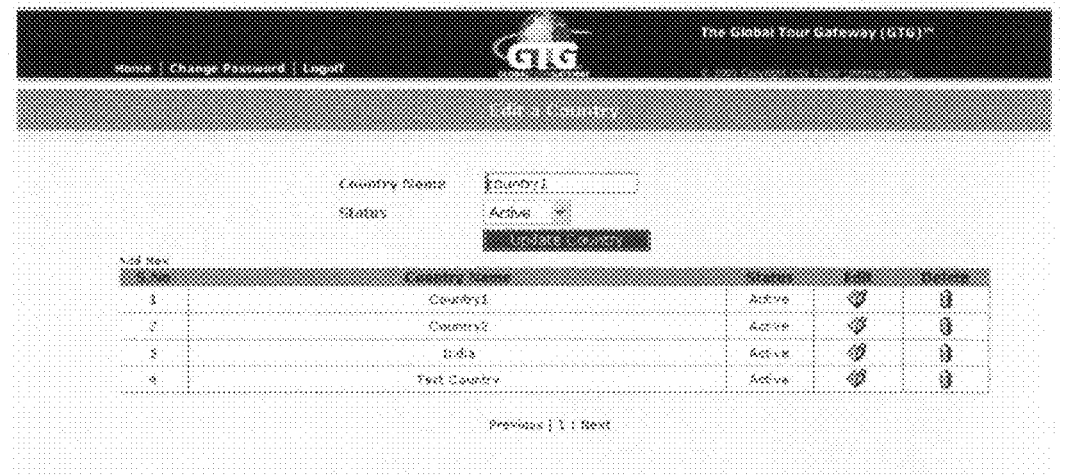
FIG. 14 is a screen shot illustrating the Manage a Country screen editable regions, according to an exemplary embodiment of the present invention.

The admin can edit the Country Name by clicking the Edit icon at the end of row, which updates the fields with the relevant information in editable mode as shown in FIG. 14.

The admin can delete the Country Name by clicking the Delete icon at the end of the row.

Figures 15, 16:
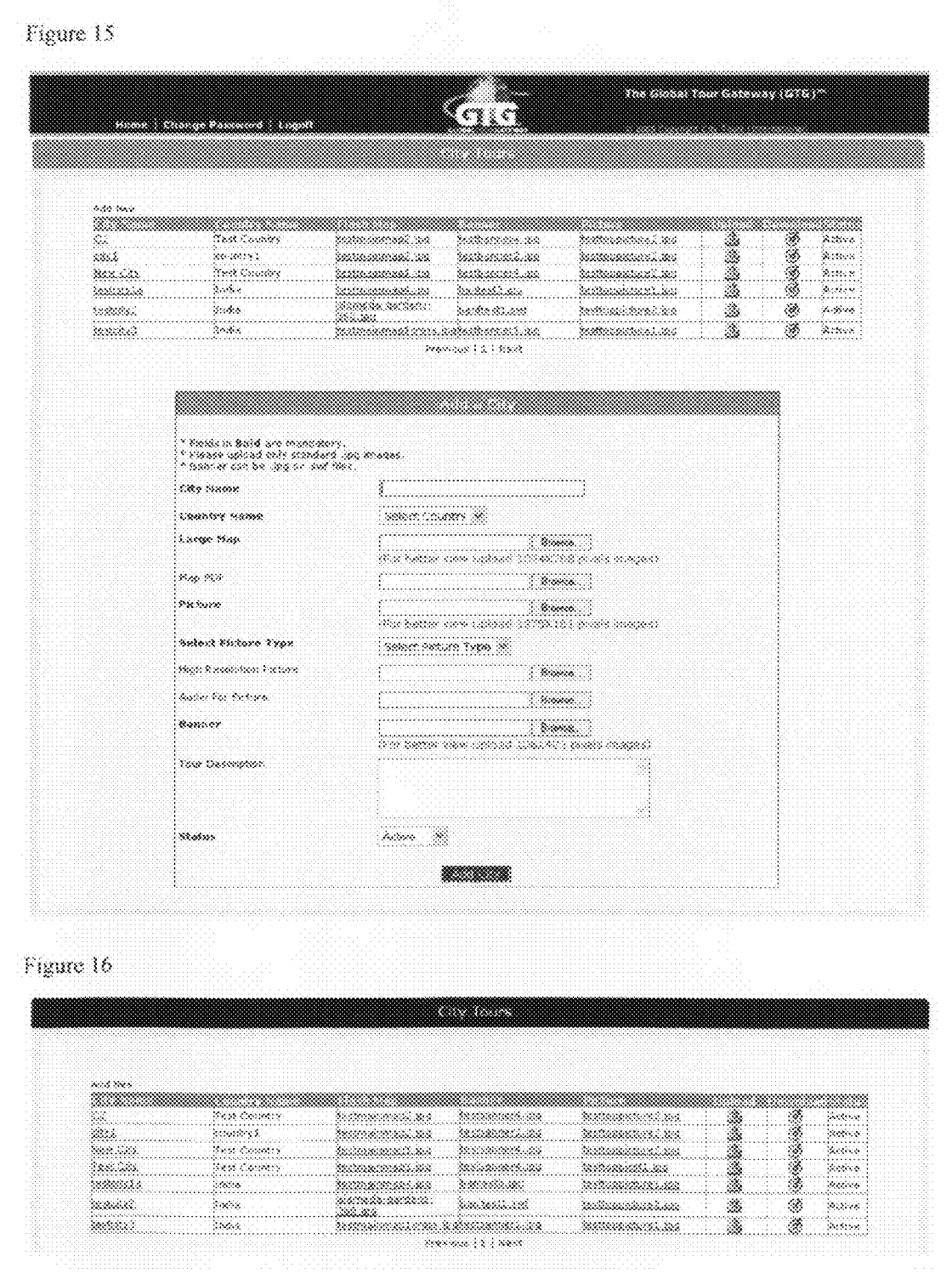

Note: Only the country Name, which does not exist can be deleted. The Country, which exists, cannot be deleted by admin. 4.1.2 Add/Manage a City Add/Manage a City screen allows the admin to add a city, city map, picture and banner to a City Tour. On clicking the Add/Manage a City link, the Add a City Screen is displayed as shown in FIG. 15.

About the Fields:

| Fields | Description |
| --- | --- |
| City Name | Allows the admin to enter the name of the City. [Edit Box] - [Mandatory] |
| Country Name | Holds the list of Country names. [Combo Box] - [Mandatory] |
| Large map | Allows the admin to select the map hotspot [Edit Box] - [Mandatory] |
| Map PDF | Allows the admin to select the map PDF. [Edit Box] |
| Picture | Allows the admin to enter the picture image. [Edit Box] - [Mandatory] |
| Select Picture Type | Holds the picture types either Still image/180 degree/360 degree image. [Combo box] - [Mandatory] |
| High Resolution Picture | Allows The Admin To Select High Resolution Picture. [Edit Box] |
| Audio for Picture | Allows the admin to select the audio for picture. [Edit Box] |
| Banner | Allows the admin to select the banner for picture. [Edit Box] - [Mandatory |
| Tour Description | Allows the admin to enter tour description. [Edit Box] |
| Status | Holds the status either active or inactive. [Combo Box] - [Mandatory] |
| Add city | When clicked, saves the changes made by the admin. [Button] |

The admin needs to enter the information into the fields and save.

The added records are displayed in the grid at the top of the screen as shown below. The Flash Map, Banner and Picture grid have a hyperlink by clicking which the admin can view the relevant image. The admin can also Upload or Download a tour by clicking the corresponding icons as shown in FIG. 16.

The admin can also edit the existing City details by clicking the City Name hyperlink in the grid. Then the fields are populated with the existing information in editable mode as shown below:

The admin can make the necessary changes and click Update City button to save the changes made.

1.4.1.3 Manage a Category

Manage a Category screen allows the admin to enter a Category. On clicking the Manage a Category link, the Add a Category screen will be displayed as shown in FIG. 18.

About the Fields:

| Fields | Description |
| --- | --- |
| Category Name | Allows the admin to enter name of the Category [Edit box] - [Mandatory] |
| Status | Holds the status either Active or Inactive. [Combo box] |
| Add Category | When clicked, saves the changes made by the admin. [Button] |

The admin needs to enter the category name, select the status Active or Inactive and save. The recorded information will be displayed in gird in the middle of the screen.

The admin can also edit the existing Category by clicking the respective hyperlink. Then the fields are populated with the existing information in editable mode.

Figure 19:
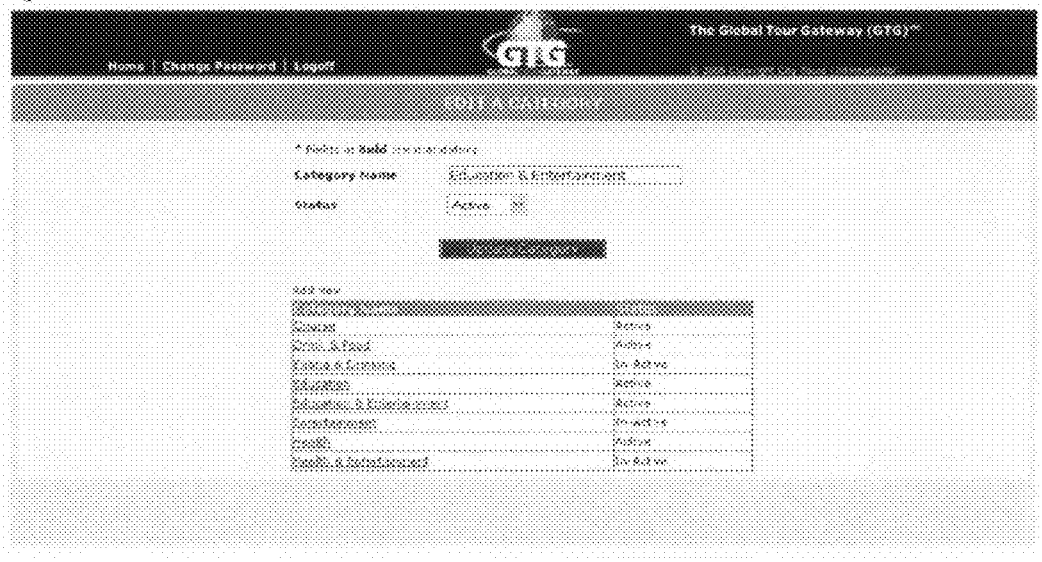
FIG. 19 is a screen shot illustrating the ability for Editing Categories, according to an exemplary embodiment of the present invention.

The admin can make the necessary changes and click Update Category button to save the changes made as shown in FIG. 19.

1.4.1.4 Add Category to City

Figure 20:
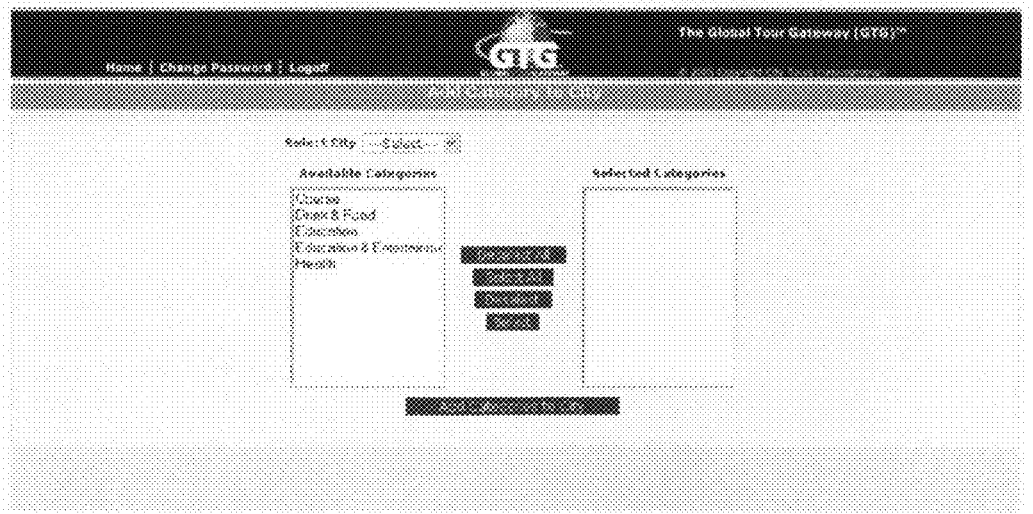
FIG. 20 is a screen shot illustrating the Manage City Hotspots, according to an exemplary embodiment of the present invention.
Figure 21:
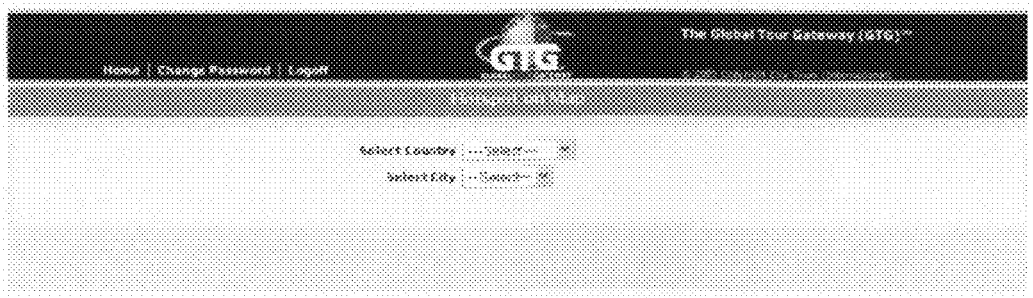
FIG. 21 is a screen shot illustrating the fields for Managing City Hotspots, according to an exemplary embodiment of the present invention.
Figure 22:
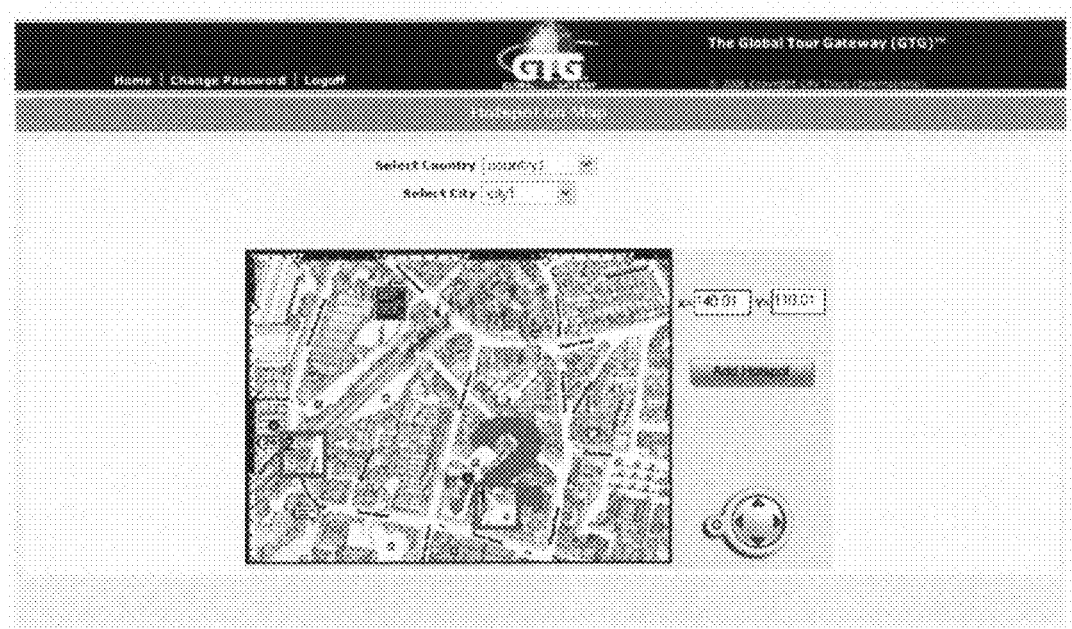
FIG. 22 is a screen shot illustrating the Managing City Hotspots, according to an exemplary embodiment of the present invention.
Figure 24:
FIG. 24 is a screen shot illustrating the editable fields for Managing City Hotspots, according to an exemplary embodiment of the present invention.

The admin can add Category to a city tour in the Add Category to City screen. The admin can also select or deselect multiple categories to a city. On clicking the Add Category to City link the screen titled Add Category Screen will be displayed as in FIG. 20.

About the Fields:

| Fields | Description |
| --- | --- |
| Select City | Holds the list of City names. [Combo box] |
| Available Categories | Holds the list of available Categories in a particular city. [Column] |
| Selected Categories | Holds the list of selected categories in a particular city. [Column] |
| Deselect All | When clicked deselects all the categories. [Button] |
| Select all | When clicked selects all the categories [Button] |
| Deselect | When clicked removes the selected category from Available Categories to Selected categories list or vice versa. [Button] |
| Select | When clicked moves the selected category from Available Categories to Selected categories list or vice versa. [Button] |
| Update categories | When clicked, updates the selected categories to list. [Button]. |

Once the name of the city from the drop down list is selected, the columns below (Available Categories and Selected Categories) are updated with all the categories available in that city. The admin must select a category from the Available list column and click on the Select button in order to move it to the Selected Categories column.

To move multiple categories at one go from Available Categories to Selected Categories column, the admin has to select multiple categories and click on the Select button. The admin can move all the Available Categories at one go to the Selected Categories column by clicking the Select All button.

The admin can also deselect a category either from Available Categories or Selected Categories column by clicking the Deselect button after selecting a particular category. Multiple categories can be deselected by using the Deselect All button.

1.4.1.5 Manage City Hotspots (Map Hotspots)

Figure 25:
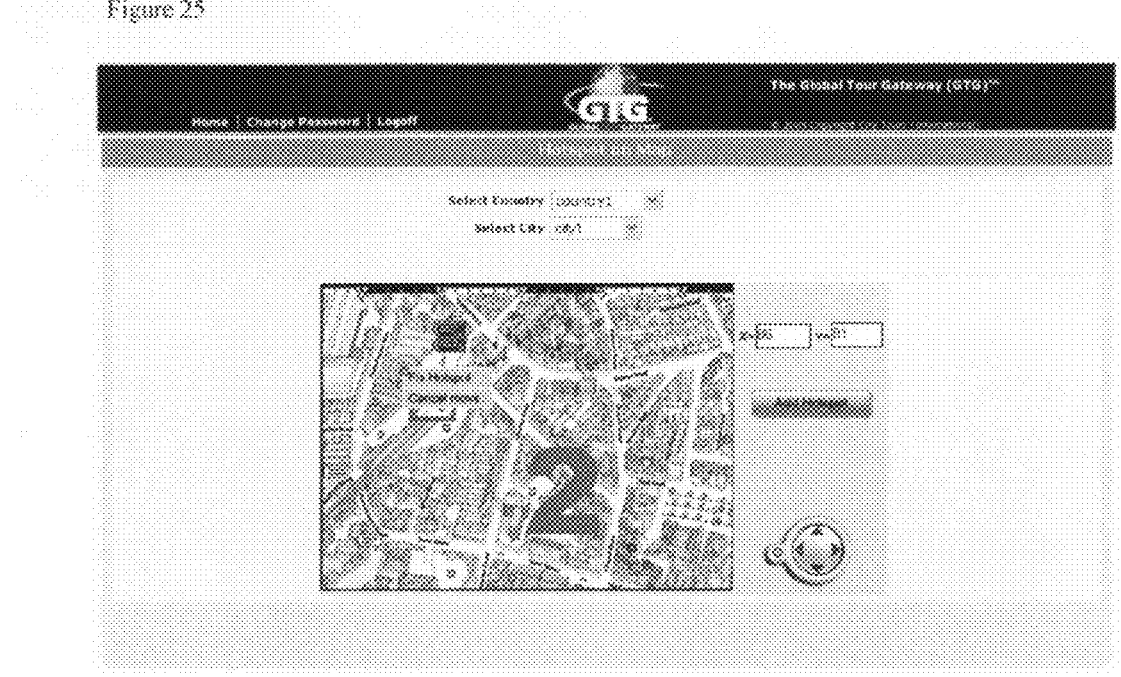
FIG. 25 is a screen shot illustrating ability for moving or fixing a City Hotspots, according to an exemplary embodiment of the present invention.

The screen allows the admin to add, edit, delete and move a map hotspot to the city tour. On clicking the Manage City Hotspots (Map Hotspots) link, the Hotspot on Map screen is displayed as shown in FIG. 25:

About the Fields:

| Fields | Description |
| --- | --- |
| Select Country | Holds the list of Country names. [Combo Box] |
| Select City | Holds the list of City names. [Combo Box] |

Figure 27:
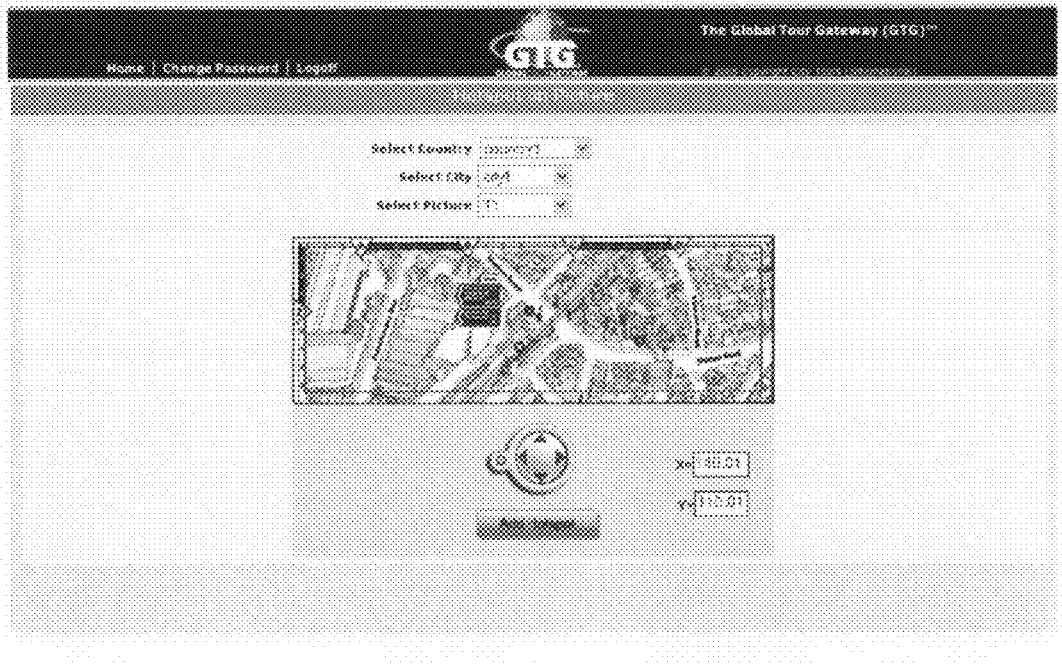
FIG. 27 is a screen shot illustrating the picture map to manage or add picture Hotspots, according to an exemplary embodiment of the present invention.

Select the Country Name and the City Name from the drop down list this displays the City map in the middle of the screen as shown in FIG. 27:

The navigating icon on the screen allows the admin to move the picture map horizontally or vertically.

Figure 23:
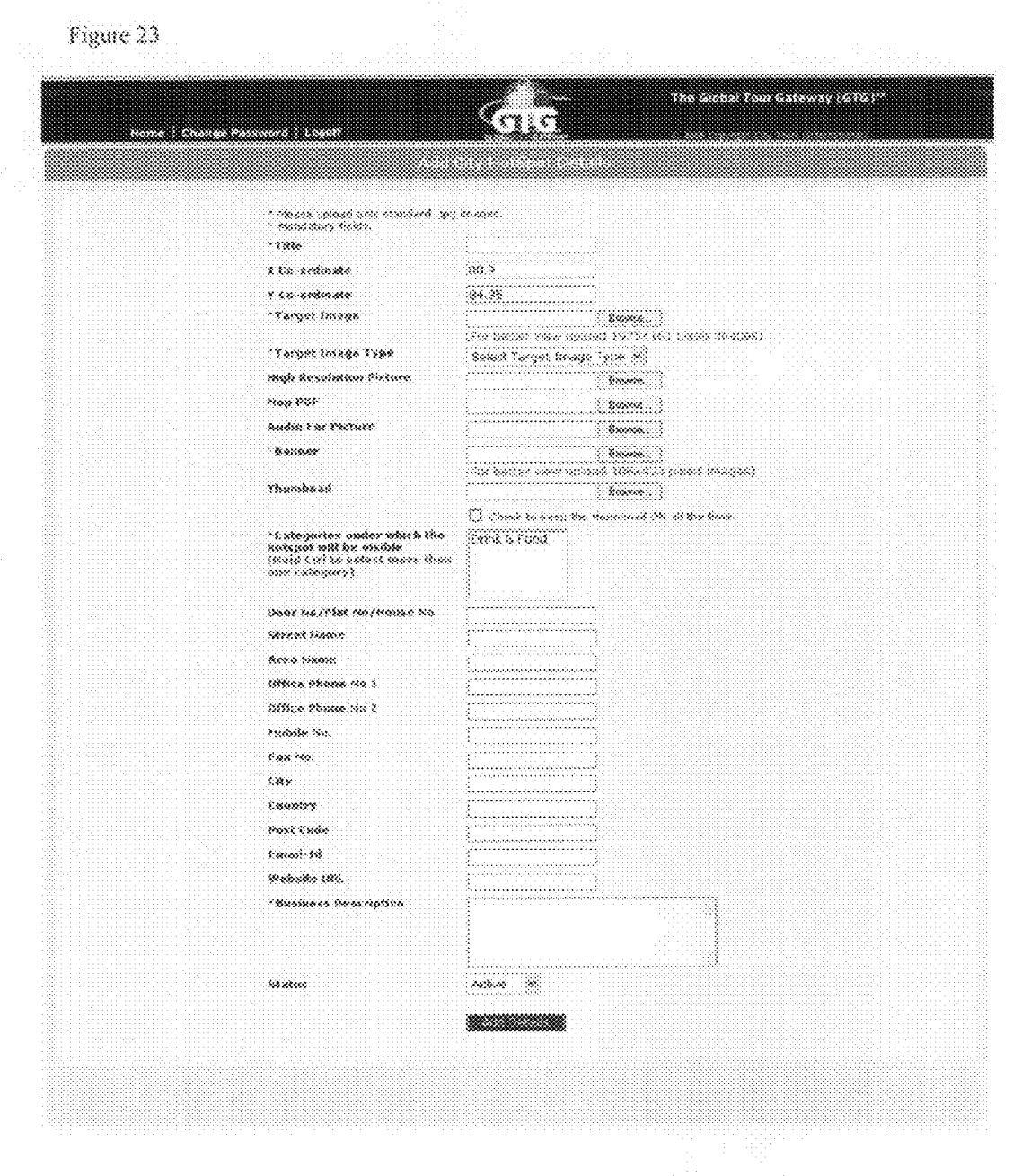

The admin can add hotspots to the City map by clicking the Add Hotspots button. Then the admin will be prompted with a marker to select a particular location in the map. After selecting a location a new screen titled "Add City Hotspot Details" will be displayed as shown in FIG. 23.

About the Fields:

| Fields | Description |
| --- | --- |
| Title | Allows the admin to enter title of the hotspot. [Edit Box] - [Mandatory] |
| X and Y Co-ordinates | Displays the X and Y Co-ordinates of the selected location by Default. [Edit box] - [Disabled] |

-continued

| Fields | Description |
| --- | --- |
| Target Image | Allows the admin to select the target image for map hotspot. [Edit box] - [Mandatory] |
| Target Image Type | Holds the list of target image types. [Combo Box] - [Mandatory] |
| High Resolution Picture | Allows the admin to select high resolution picture - [Edit Box] |
| Map PDF | Allows the admin to select the Map PDF image. [Edit Box] |
| Audio for Picture | Allows the admin to select audio for picture. [Edit Box] |
| Banner | Allows the admin to select the banner. [Edit box] - [Mandatory] |
| Thumbnail | Allows the admin to select the thumbnail. [Edit box] |
| Check to keep the thumbnail ON all the time | Allows the admin to check to keep the thumbnail on all the time. [Edit box] |
| Categories under which hotspot will be visible | Holds the list of categories added to the city tour. [Combo Box] [Mandatory] |
| Door No/plot No/House No | Allows the admin to enter door number or plot number or house number. [Edit box] |
| Street name | Allows the admin to enter name of the street. [Edit box] |
| Area Name | Allows the admin to enter name of the area. [Edit box] |
| Office Phone No. 1 and 2 | Allows the admin to enter office phone numbers. [Edit box] |
| Mobile No | Allows the admin to enter mobile number. [Edit box] |
| Fax No | Allows the admin to enter fax number. [Edit box] |
| City | Allows the admin to enter the name of the city. [Edit box] |
| Country | Allows the admin to enter the name of the country. [Edit box] |
| Post Code | Allows the admin to enter the postal code. [Edit box] |
| Email-id | Allows the admin to enter the email id. [Edit box] |
| Website URL | Allows the admin to enter website URL. [Edit box] |
| Business Description | Allows the admin to enter the description. [Edit box] - [Mandatory] |
| Status | Holds the status either Active or Inactive. [Combo Box] |
| Add Details | When clicked, saves the changes made by the admin. [Button] |

The admin needs to enter the Title and Select the Target Image, Banner and Thumbnail to create a map hotspot to a City Tour. The Personal details such as House No, Area Name, Phone No, Fax No, Email Id, Website etc., should also be entered. After updating the details the created hotspot will be highlighted on the screen.

Note: The admin must upload only .jpg images and the banner must be of .jpg or .swf files. For better view the admin can upload 1975.times.161 pixels images for Target Image and 106.times.423 pixels images for Banners. Only MP3 files must be uploaded for audio.

Figure 29:
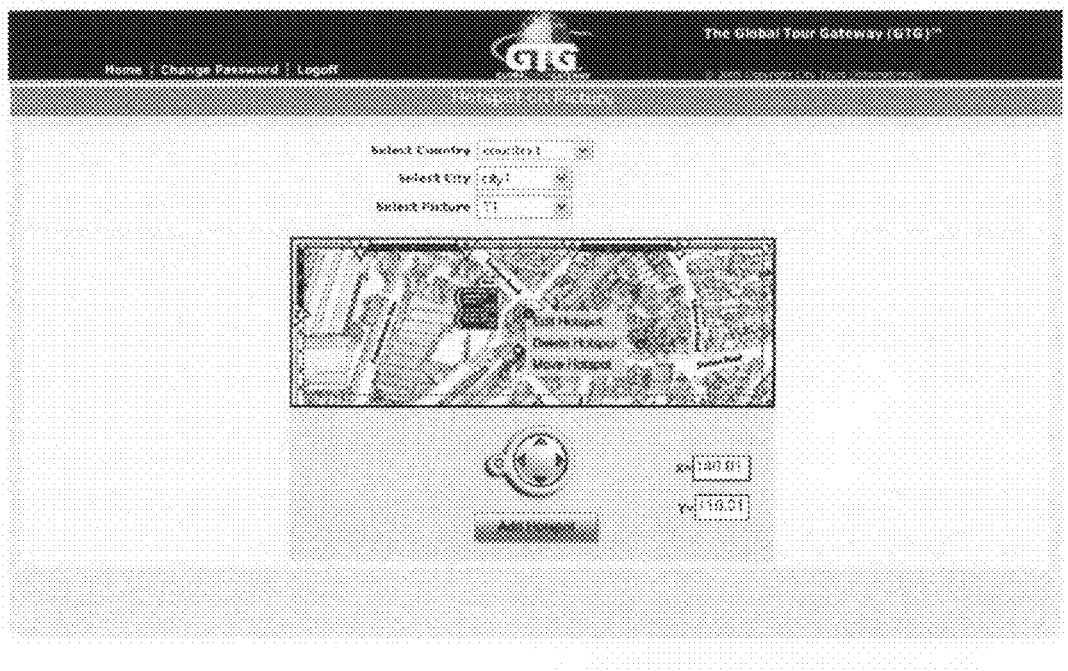
FIG. 29 is a screen shot illustrating the editing, moving or deleting a Picture Hotspots, according to an exemplary embodiment of the present invention.

The admin can edit the existing hotspots. On placing the marker on the existing hotspot the admin is prompted with three options—Edit Hotspot, Delete Hotspot and Move Hotspot. By clicking on the Edit Hotspot option the admin will be displayed with Edit Hotspot Details screen as shown in FIG. 29. The fields are populated with the existing information in editable mode.

The admin can make the necessary changes to the fields and click Update Details button to save the changes.

The admin can delete the existing hotspot by clicking the Delete Hotspot option after placing the marker on particular hotspot.

The admin can move the existing hotspot by clicking the Move Hotspot option. Then the admin will be prompted with two options—Fix Hotspot and Cancel Move. The admin can drag and drop the hotspot wherever required or fix the hotspot at the same location by clicking the Fix Hotspot option and cancel by Cancel Move option as shown in FIG. 25.

1.4.1.6 Manage Picture Hotspots (Picture Hotspots)

Figure 26:
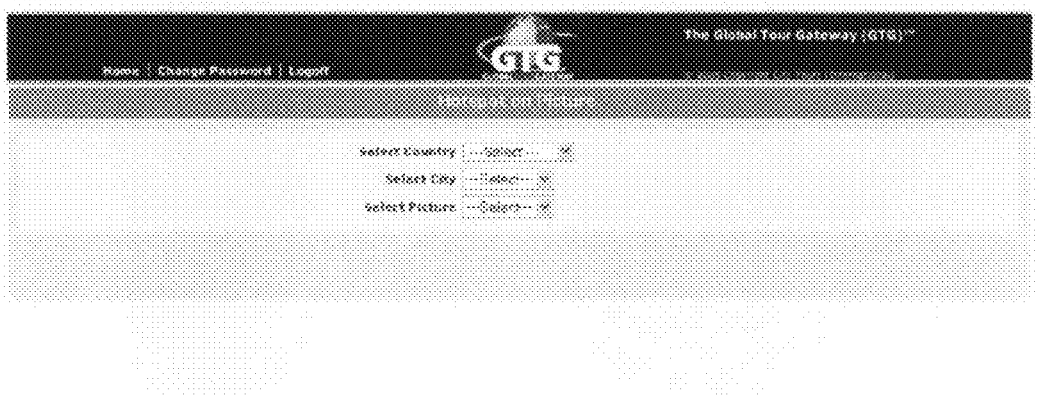
FIG. 26 is a screen shot illustrating the drop down menu enabling to add and/or edit Hotspots on pictures, according to an exemplary embodiment of the present invention.

Picture Hotspots screen allows the admin to add or edit picture hotspots to the City Tour. On clicking the Manage Picture Hotspots link, the "Hotspot on Picture" screen will be displayed as shown in FIG. 26.

About the Fields:

| Fields | Description |
| --- | --- |
| Select Country | Holds the list of Country names. [Combo box] |
| Select City | Holds the list of City names. [Combo box] |
| Select picture | Holds the list of pictures added to the city tour. [Combo box] |

Select the Country name, City name and Picture from the drop down list this displays the picture map in the middle of the screen as shown in FIG. 27

The icon at the bottom of the screen allows the admin to move the picture map horizontally or vertically.

Figure 28:
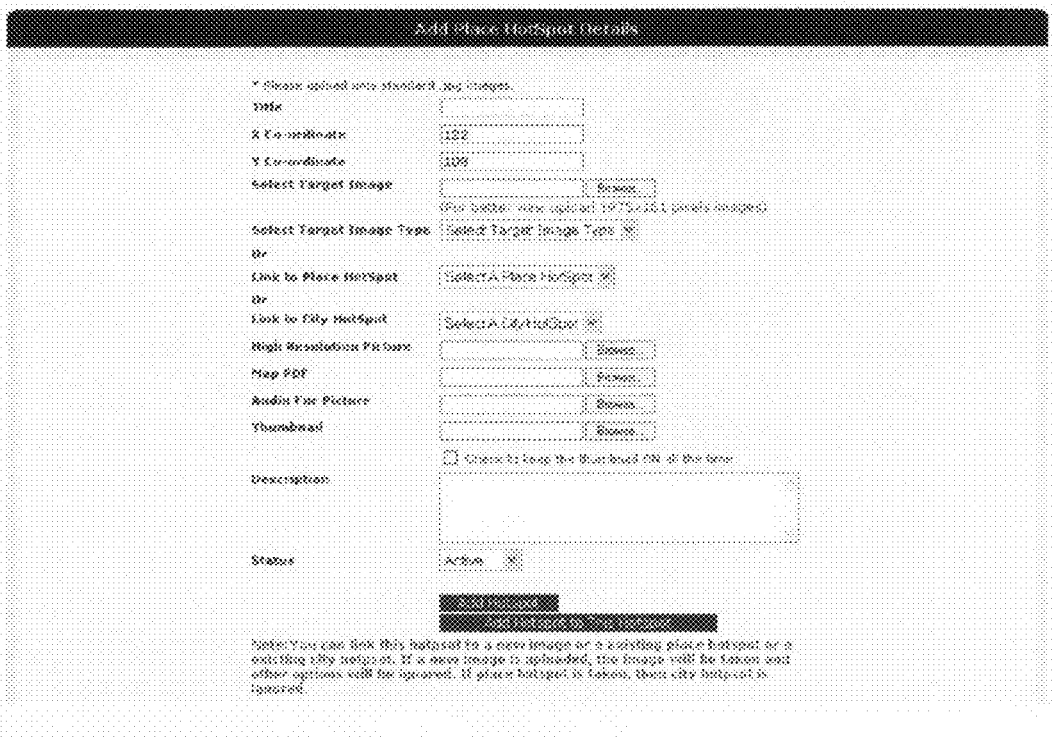
FIG. 28 is a screen shot illustrating the editable fields for Add Place Hotspot with drop down menu to allow links to Picture Hotspots or Picture (Place Hotspot), according to an exemplary embodiment of the present invention.

The admin can add place hotspot to the city by clicking the Add Hotspots button. Then the admin will be prompted with a marker to select a particular location in the map. After selecting a particular location a new screen titled "Add Place Hotspot Details" will be displayed as shown in FIG. 28.

About the Fields:

| Fields | Description |
| --- | --- |
| Title | Allows the admin to enter the title for Picture hotspot. [Edit Box] |
| X and Y Co-ordinates | Displays the X and Y co-ordinates of the picture. [Non-Editable Text Box] |
| Select Target Image | Allows the admin to select the target image. [Edit Box] |
| Select Target Image Type | Allows the admin to select target image type. [Edit Box] |
| Link To Place Hotspot | Allows the admin to select in order to link the picture to the place hotspot. [Edit Box] |
| Link to City Hotspot | Allows the admin to select in order to link the picture to the city hotspot. [Edit Box] |
| High Resolution Picture | Allows the admin to select high-resolution picture. [Edit Box] |
| Map PDF | Allows the admin to select map PDF. [Edit Box] |
| Audio for Picture | Allows the admin to select audio for picture. [Edit Box] |
| Description | Allows the admin to enter the description of the picture hotspot, if any. [Edit Box] |
| Status | Holds the status either active or inactive. [Combo Box] |
| Add Hotspot | When clicked, saves the changes made by the admin. [Button] |
| Add Hotspot to This hotspot | When clicked, adds the picture hotpot to the linked hotspot. [Button] |

The admin is required to enter the Title and Select Target Image, High Resolution Picture, Map PDF and Audio for Picture. The admin can also link the selected image to either Place or City hotspot if required. The admin must enter the Description and specify the Status to record the hotspot either in Active or Inactive state.

Note: The admin must upload only standard .jpg images. For better view the admin can upload 1975.times.161 pixels images for Target Image. Only MP3 files must be selected for audio.

Figure 30:
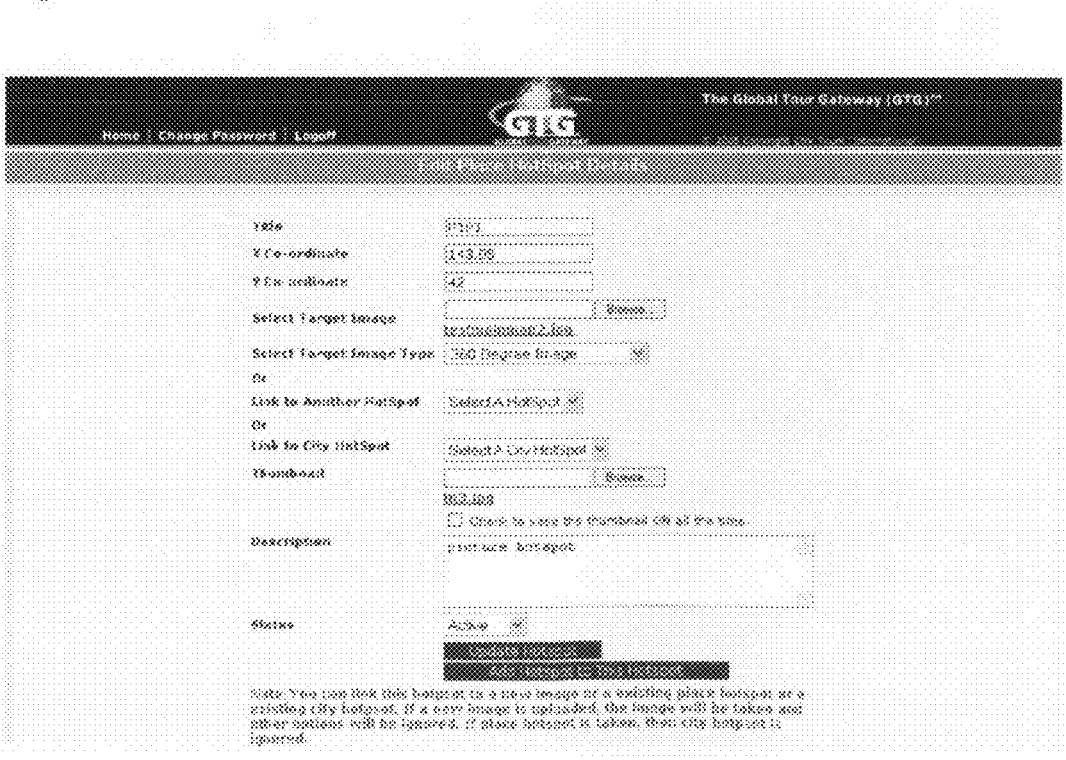
FIG. 30 is a screen shot illustrating the screen for fixing or cancelling move, according to an exemplary embodiment of the present invention.

The admin can edit the existing picture hotspot. On placing the marker on the existing hotspot the admin is prompted with three options—Edit Hotspot, Delete Hotspot and Move Hotspot (as shown above). By clicking the Edit Hotspot option the admin will be displayed with "Edit Hotspot Details" screen. The admin can make the necessary changes to the screen and click Update Hotspot button as shown in FIG. 30.

The admin can delete the existing hotspot by clicking the Delete Hotspot option after placing the marker on particular hotspot as shown in FIG. 29.

Figure 31:
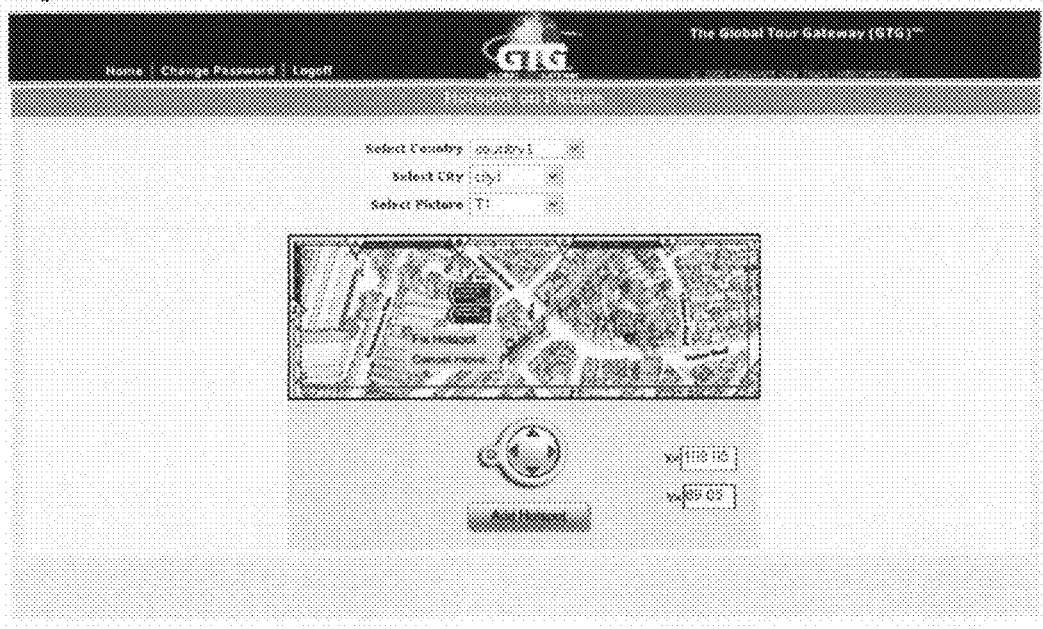
FIG. 31 is a screen shot illustrating the moving or deleting of a Picture Hotspots, according to an exemplary embodiment of the present invention.

The admin can move the existing hotspot by clicking the Move Hotspot option. Then the admin will be prompted with two options—Fix Hotspot and Cancel Move as shown in FIG. 31. The admin can drag and drop the hotspot wherever required or fix the hotspot at the same location by clicking the Fix Hotspot option and cancel by Cancel Move option.

1.4.2 Special Tour

The Special Tour section enables the admin to add, manage, edit and delete a special interest tour.

1.4.2.1 Manage a "Special Interest Tour"

Figure 32:
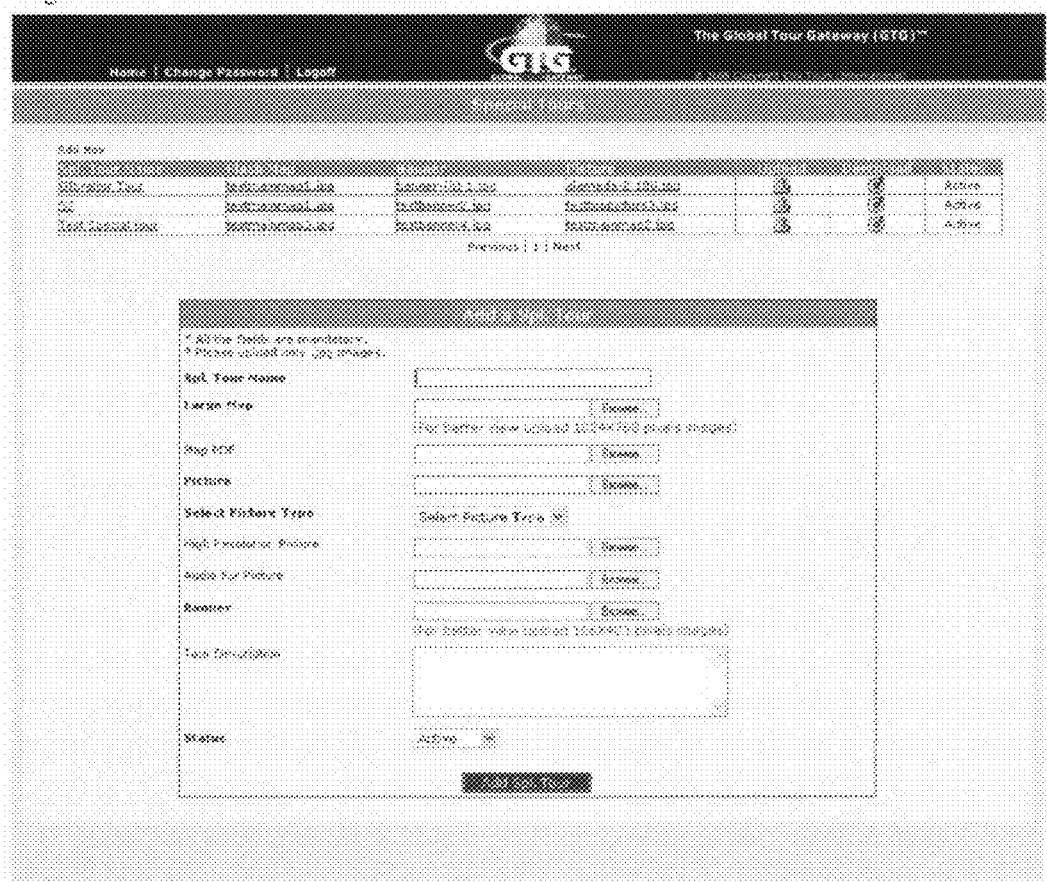
FIG. 32 is a screen shot illustrating the module for adding a Special City in a specified country, according to an exemplary embodiment of the present invention.

On clicking the Manage a "Special Interest Tour" link, the Special Tours screen will be displayed as follow as shown in FIG. 32:

| Fields | Description |
| --- | --- |
| Spl. Tour name | Allows the admin to enter name of the Special Tour. [Edit Box] |
| Large Map | Allows the admin to select large map. [Edit Box] |
| Map PDF | Allows the admin to select map pdf. [Edit Box] |
| Picture | Allows the admin to select picture map. [Edit Box] |
| Select Picture Type | Allows the admin to select picture type. [Edit Box] |
| High Resolution Picture | Allows The Admin To Select High Resolution Picture. [Edit Box] |
| Audio for Picture | Allows the admin to select audio for picture. [Edit Box] |
| Banner | Allows the admin to select banner for picture. [Edit Box] |
| Tour description | Allow the admin to enter tour description, if any. [Edit Box] |
| Status | Holds the list of Status either Active or Inactive. [Combo Box] |
| Add Spl. Tour | When clicked, saves the data entered by the admin. [Button] |

Note: All fields are mandatory

The admin needs to enter the Special Tour Name and Select the Large Map, Map PDF, Picture, High Resolution Picture, Audio for Picture, and Banner. The admin must also specify the Picture Type, Status and enter the Description of the tour and click Add Spl Tour button.

Note: The admin must upload only .jpg images. For better view the admin can upload 1024/760 pixels images for Large Map and 106.times.423 pixels images for Banners. Only MP3 files must be selected for audio.

The added information is displayed in the grid on the top of the screen as shown below. The Flash Map, Banner, and Picture have a hyperlink by clicking which the admin can view the appropriate image. The admin can also Upload or Download the special tour by clicking the corresponding icons as shown in FIG. 33.

The admin can also edit the existing Special Tour details by clicking the Spl Tour Name hyperlink. Then the fields are populated with the existing information in editable mode in a new screen titled "Edit a Spl. Tour" as shown in FIG. 34.

The admin can make the necessary changes and click Update Spl. Tour to save the changes.

1.4.2.2 Add Category to Spl Tour

Figure 35:
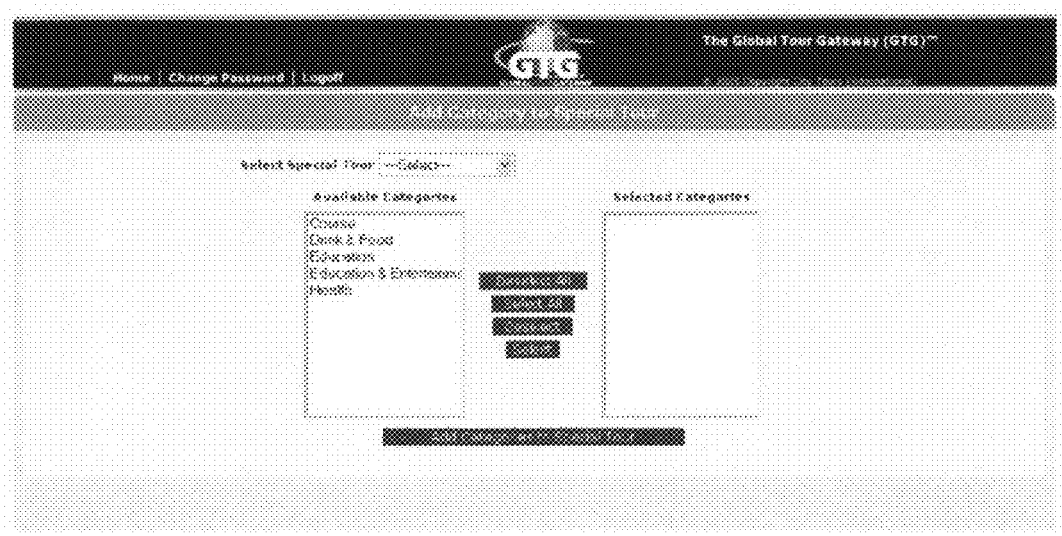
FIG. 35 is a screen shot illustrating the ability to Manage a Categories for Special Tours, according to an exemplary embodiment of the present invention.

The admin can add category to special tour in the Add Category to Spl Tour screen. The admin can also select or deselect multiple categories to Spl tour. On clicking the Add Category to Spl Tour link, a Special Tours page will be displayed as shown in FIG. 35.

About the Fields:

| Fields | Description |
|---|---|
| Select Special Tour | Holds the list of special tour names. [Combo box] |
| Available Categories | Holds the list of available categories in a particular city. [Column] |
| Selected categories | Holds the list of selected categories in a particular city. [Column] |
| Deselect All | When clicked, deselects all the categories. [Button] |
| Select all | When clicked, selects all the categories. [Button] |
| Deselect | When clicked, removes the selected category from Available Categories to Selected Categories list or vice versa. [Button] |
| Select | When clicked, moves the selected category from Available Categories to Selected Categories list or vice versa. [Button] |
| Add Categories to Special Tour | When clicked, saves the changes made by the admin. [Button] |

Once the Special Tour name from the tours listed is selected, the columns (Available Categories and Selected Categories) are updated with all the categories available in that tour. The admin must select a category from the Available Categories list and click on the Select button in order to move it to the Selected Categories column.

To move multiple categories at one go from Available Categories to Selected Categories column, the admin has to select multiple categories and click on the Select button. The admin can also move all the Available Categories at one go to the Selected Categories column by clicking the Select All button.

The admin can also deselect a category either from Available Categories or Selected Categories column by clicking the Deselect button after selecting a particular category. Multiple categories can be deselected by using the Deselect All button.

1.4.2.3 Manage Spl. Tour Hotspots (Map Hotspots for Spl. Tour)

Figure 36:
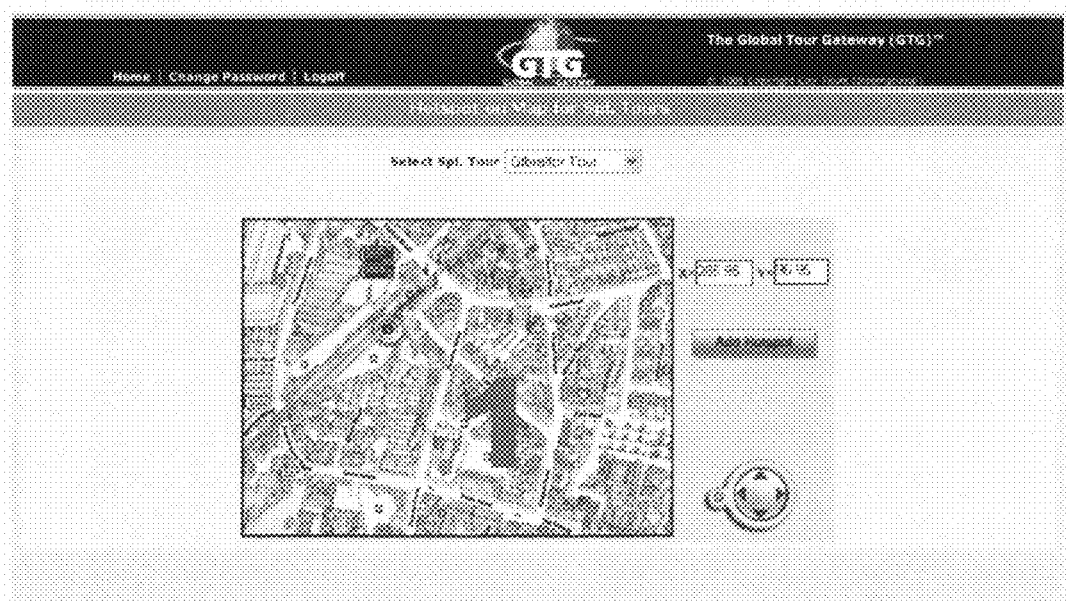
FIG. 36 is a screen shot illustrating the Managing of Special Tour Hotspots, according to an exemplary embodiment of the present invention.

Manage Spl Tour Hotspots screen allows the admin to add, edit, delete and move map hotspots for Spl Tour. On clicking the Manage Spl Tour Hotspots link, the Hotspot on Map for Spl. Tours screen is displayed as shown as shown in FIG. 36.

About the Fields:

| Fields | Description |
|---|---|
| Select Spl Tour | Holds the list of special tours. [Combo Box] |

Once the admin selects the Special Tour name the map will be displayed in the middle of the screen as shown above.

The icon at the right side corner of the screen allows the admin to move the picture map horizontally or vertically.

Figure 37:
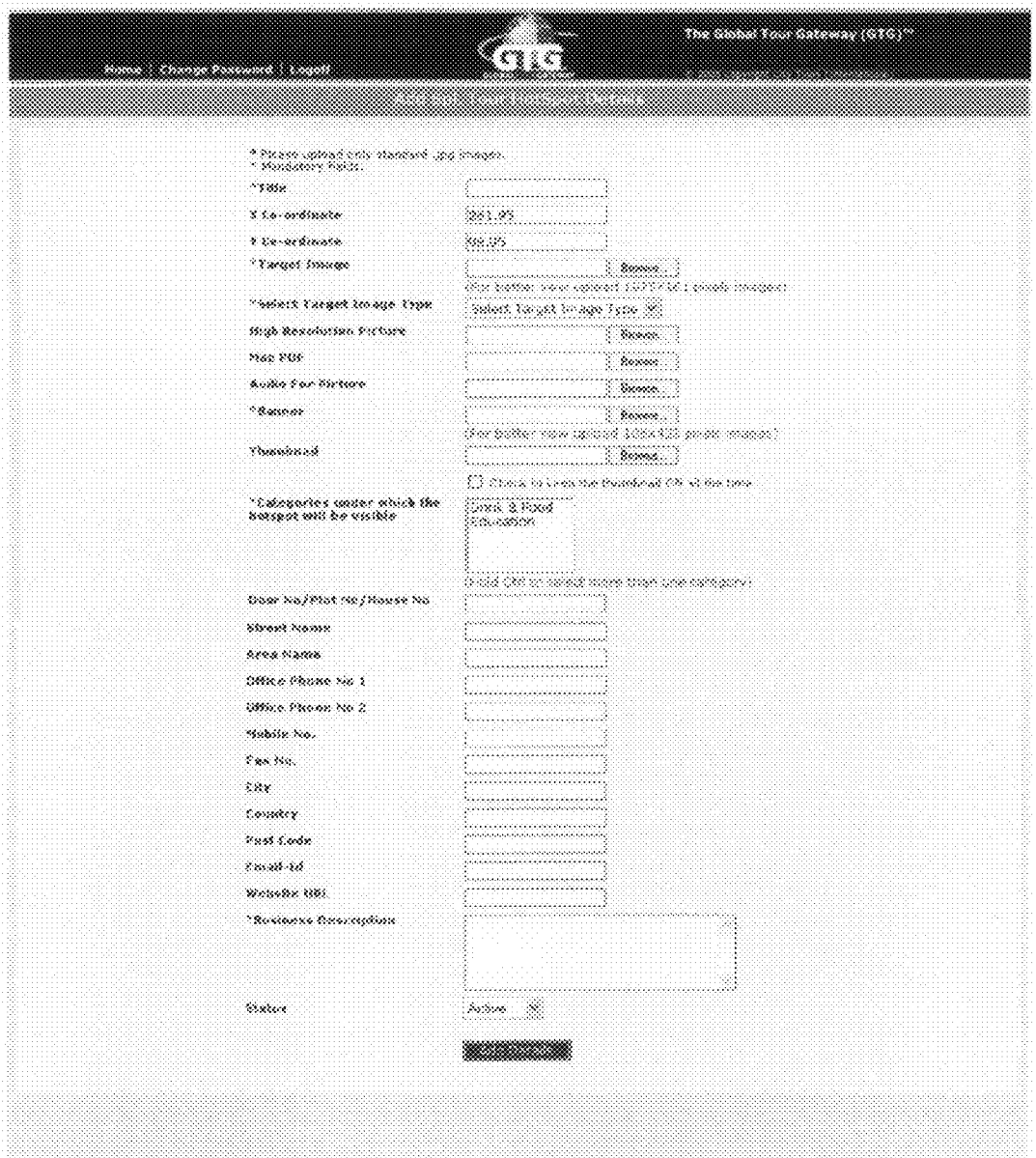
FIG. 37 is a screen shot illustrating the add fields for Managing Special Tour Hotspot Details, according to an exemplary embodiment of the present invention.

The admin can add a new hotspot for Special Tour by clicking the Add Hotspot button. Then the admin is prompted with a marker to select a particular location in the map. After selecting a location a new screen titled "Add Spl. Tour Hotspot Details" will be displayed as shown in FIG. 37.

About the Fields:

| Fields | Description |
|---|---|
| Title | Allows the admin to enter the title for Spl tour. [Edit Box] - [Mandatory] |
| X and Y Co-ordinates | Displays the X and Y co-ordinates of the selected location. [Non-editable Text Box] |
| Target Image | Allows the admin to select target image for the selected location. [Edit Box] - [Mandatory] |
| Select Target Image Type | Allows the admin to select the target image type. [Edit Box] - [Mandatory] |
| High Resolution Picture | Allows the admin to select a high-resolution picture. [Edit Box] |
| Map PDF | Allows the admin to select the map PDF. [Edit Box] |
| Audio for Picture | Allows the admin to select audio for picture. [Edit Box] |
| Banner | Allows the admin to select banner for Spl tour. [Edit Box] - [Mandatory] |
| Thumbnail | Allows the admin to select the thumbnail for Spl tour. [Edit Box] |
| Check to keep the thumbnail ON all the time | Allows the admin to check the check box if the thumbnail has to be kept ON all the time. [Check Box] |
| Categories under which the hotspot will be visible | Allows the admin to select the hotspot under which the hotspot has to be displayed. [Edit Box] - [Mandatory] |
| Door No/Plot No/House No | Allows the admin to enter door number or plot number or house number. [Edit Box] |
| Street Name | Allows the admin to enter the street name. [Edit Box] |
| Area Name | Allows the admin to enter the name of the area. [Edit Box] |
| Office Phone No. 12 | Allows the admin to enter the office phone numbers. [Edit Box] |
| Mobile No. | Allows the admin to enter the mobile number. [Edit Box] |
| Fax No. | Allows the admin to enter the Fax number. [Edit Box] |
| City | Allows the admin to enter the name of the city. [Edit Box] |
| Country | Allows the admin to enter the name of the country. [Edit Box] |
| Post Code | Allows the admin to enter the postal code. [Edit Box] |
| Email-Id | Allows the admin to enter the email-id. [Edit Box] |
| Website URL | Allows the admin to enter the website URL. [Edit Box] |
| Business Description | Allows the admin to enter the Spl tour description, if any. [Edit Box] - [Mandatory] |
| Status | Holds the status either Active or Inactive. [Combo Box] |
| Add Details | When clicked, saves the changes made by the admin [Button] |

The admin needs to enter the Title and Select the Target Image, High Resolution Picture, Map PDF, Audio for Picture, Banner and Thumbnail to create a map hotspot to special tour. The Personal details such as House No, Area Name, Phone No, Fax No, Email Id, Website etc., should also be entered. The admin must also enter the Description, specify the Status and click Add Details. After updating the details the created hotspot will be highlighted on the screen.

Note: The admin must upload only .jpg images. For better view the admin can upload 1975.times.161 pixels images for Target Image and 106.times.423 pixels images for Banners. Only MP3 files must be selected for audio.

Figure 38:
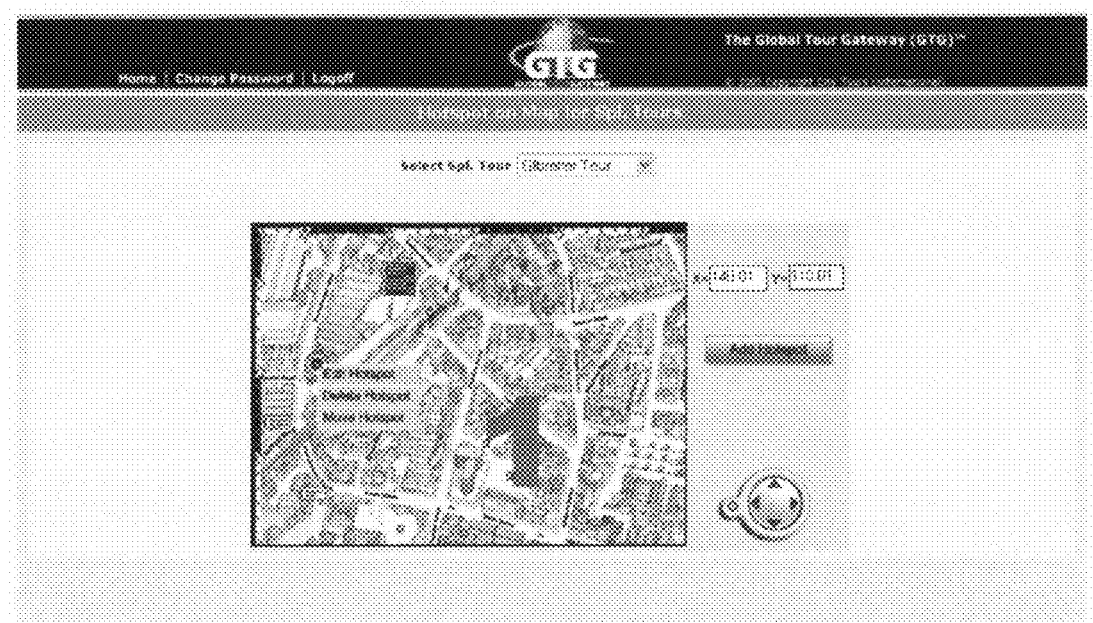
FIG. 38 is a screen shot illustrating ability for editing, moving or deleting a Special Tour Hotspots, according to an exemplary embodiment of the present invention.

The admin can edit the existing hotspots. On placing the marker on the existing hotspot the admin is prompted with three options—Edit Hotspot, Delete Hotspot and Move Hotspot. By clicking the Edit Hotspot option the admin will be displayed with Edit Hotspot Details screen as shown in FIG. 38.

Figure 39:
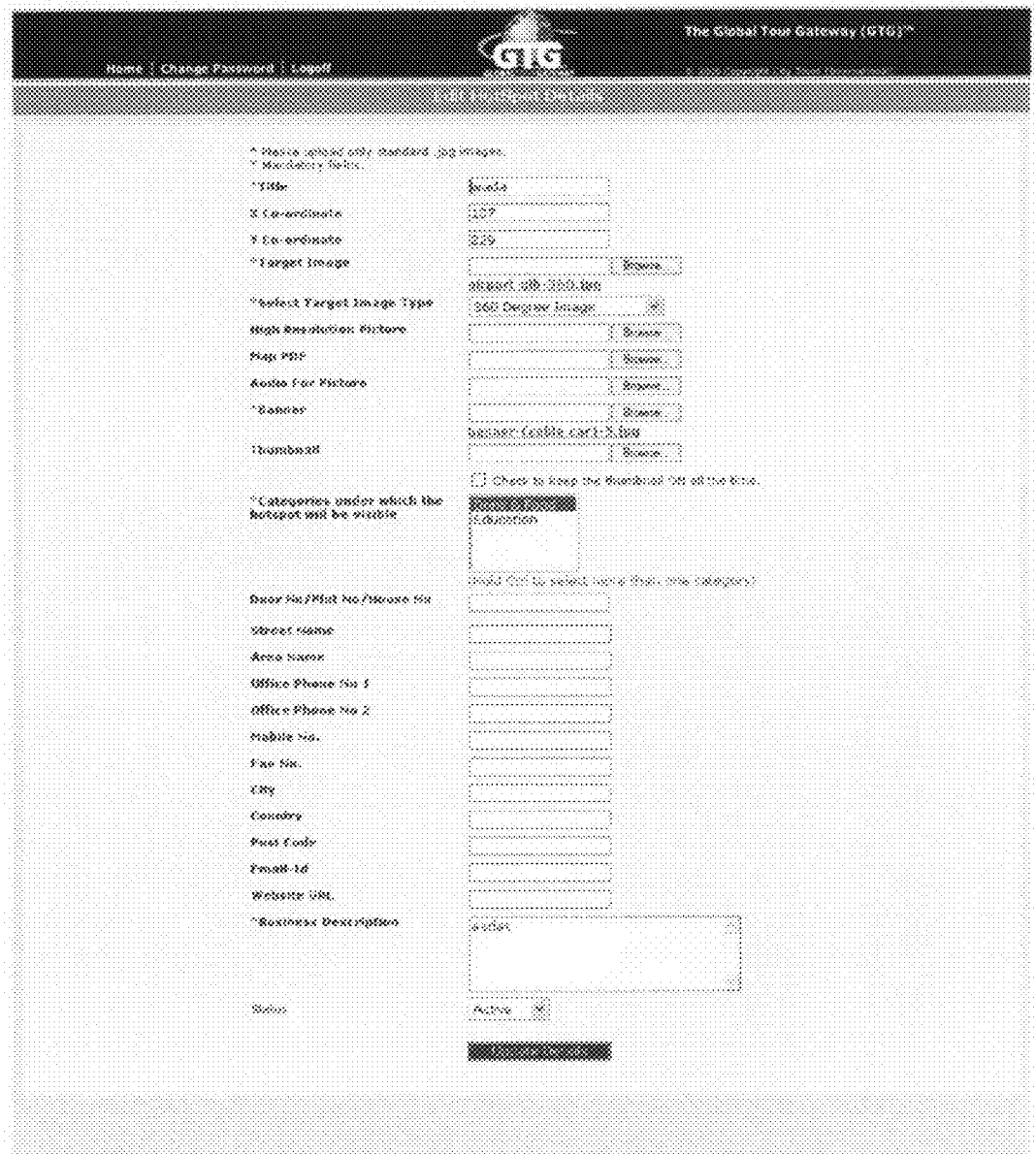
Figure 40:
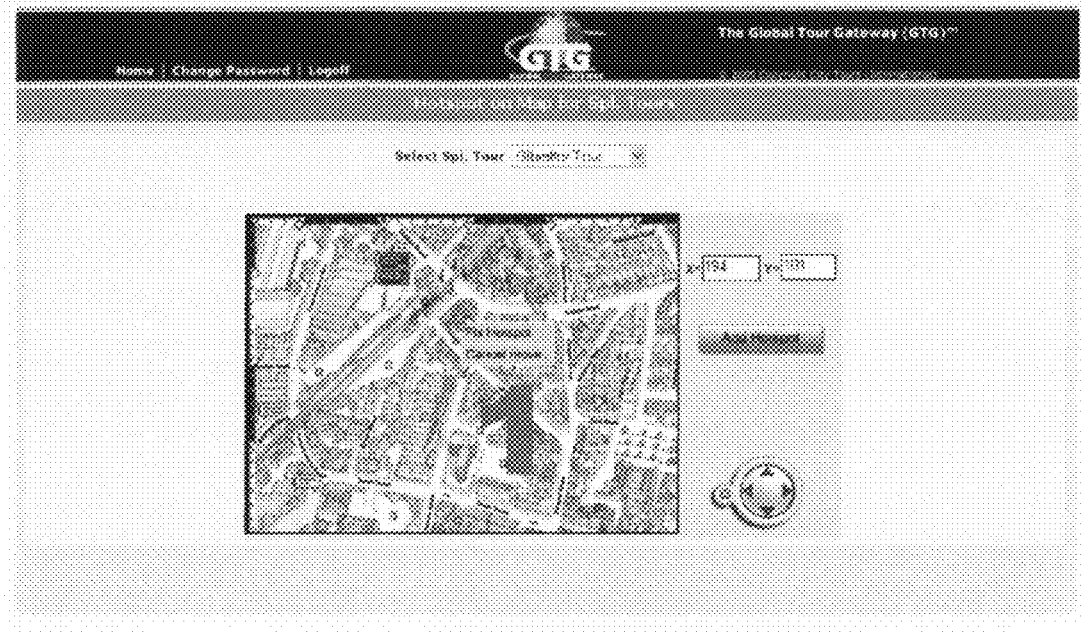
FIG. 40 is a screen shot illustrating ability for moving or fixing a Special Tour Hotspot, according to an exemplary embodiment of the present invention.

The fields Title, Target Image, Banner, Categories, Email-Id, Website URL, and Business Description are populated with the existing information in editable mode. The admin can make the necessary changes to the fields and click Update Details as shown in FIG. 39.

The admin can delete the existing hotspot by clicking the Delete Hotspot option after placing the marker on a particular hotspot.

The admin can move the existing hotspot by clicking the Move Hotspot option. Then the admin will be prompted with two options—Fix Hotspot and Cancel Move. The admin can drag and drop the hotspot wherever required or fix the hotspot at the same location by clicking the Fix Hotspot option and cancel by Cancel Move option.

1.4.2.4 Manage Picture Hotspot for Spl. Tours (Pic Hotspot for Spl. Tours)

Picture hotspot for Special Tour screen allows the admin to add, manage, edit, delete and move picture hotspots to the Spl tour. On clicking the Manage Picture Hotspots for Spl. tours link, the Hotspot on Picture for Spl. Tours screen will be displayed as shown in FIG. 41.

About the Fields:

| Fields | Description |
| --- | --- |
| Select Spl tour | Holds the list of special tours. [Combo Box] |
| Select Picture | Holds the list of special pictures. [Combo Box] |

Figure 41:
FIG. 41 is a screen shot illustrating ability for editing, moving or deleting Special Tour Hotspots, according to an exemplary embodiment of the present invention.

After selecting the Special Tour name and Picture from the drop down list picture map will be displayed in the middle of the screen as shown in FIG. 41.

The icon at the bottom of the screen allows the admin to move the picture map horizontally or vertically.

Figure 42:
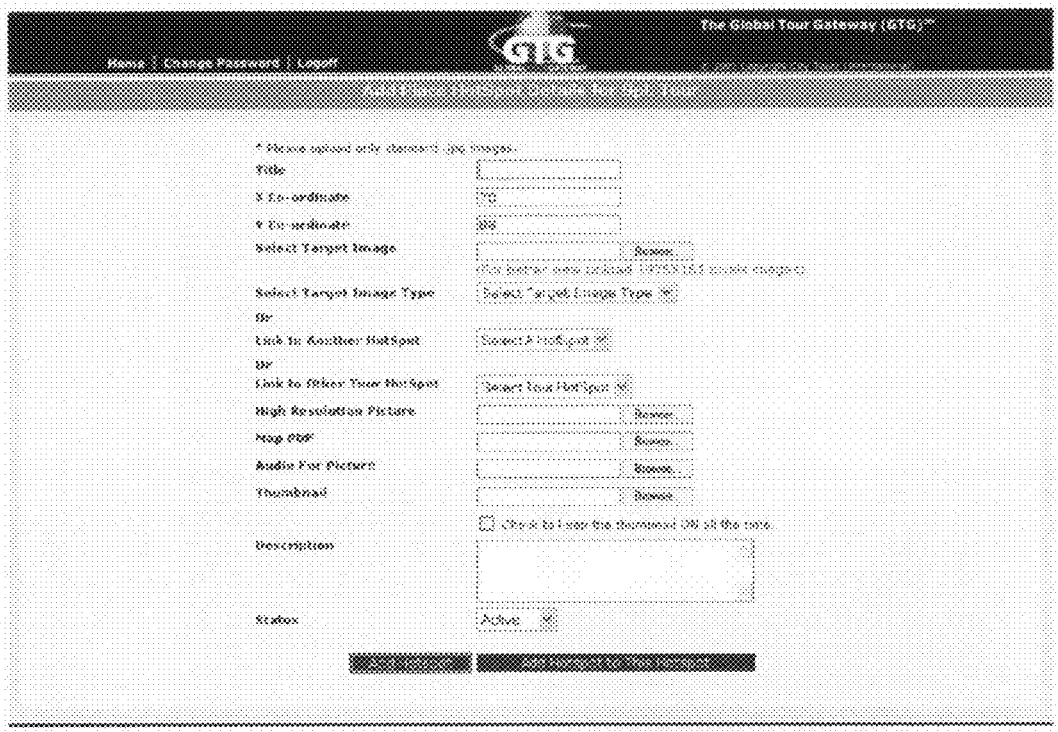
FIG. 42 is a screen shot illustrating the editable fields for Add Place Hotspot for a Special Tour with drop down menu to allow links to Picture Hotspots or Picture (Place Hotspot), according to an exemplary embodiment of the present invention.

The admin can add picture hotspots to the map by clicking the Add Hotspot button. Then the admin is prompted with a marker to select a particular location. After selecting a location a new screen titled "Add Place Hotspot Details for Spl tour" will be displayed as shown in FIG. 42.

About the Fields:

| Fields | Description |
| --- | --- |
| Title | Allows the admin to enter the title. [Edit Box] |
| X and Y Co-ordinate | Displays the X and Y co-ordinates of the selected location. [Non-editable text box] |
| Select Target Image | Allows the admin to select the target image. [Edit Box] |
| Select Target Image Type | Holds the types of target image. [Edit Box] |
| Link to Another Hotspot | Holds the list of hotspots to link the image. [Combo Box] |
| Link to other Tour Hotspot | Holds the list of other Tour hotspots to link the image. [Combo Box] |
| High Resolution Picture | Allows the admin to select a high-resolution picture. [Edit Box] |
| Map PDF | Allows the admin to select map PDF. [Edit Box] |
| Audio for Picture | Allows The Admin To Select Audio For Picture. [Edit Box] |
| Description | Allows the admin to enter special tour description, if any. [Edit Box] |
| Status | Holds the status either Active or Inactive. [Combo Box] |
| Add Hotspot | When clicked, saves the data entered by the admin. [Button] |
| Add Hotspot to this Hotspot | When clicked, links one hotspot to another. [Button] |

The admin is required to enter the Title for special tour and Select Target Image, High Resolution Picture, Map PDF, and Audio for Picture. The admin can also link the selected image to Other Tour Hotspot, if required. The admin must enter the Description and specify the Status to record the hotspot either in Active or Inactive state.

Note: The admin must upload only .jpg images. For better view the admin can upload 1975.times.161 pixels images for Target Image. Only MP3 files must be selected for audio.

Figure 43:
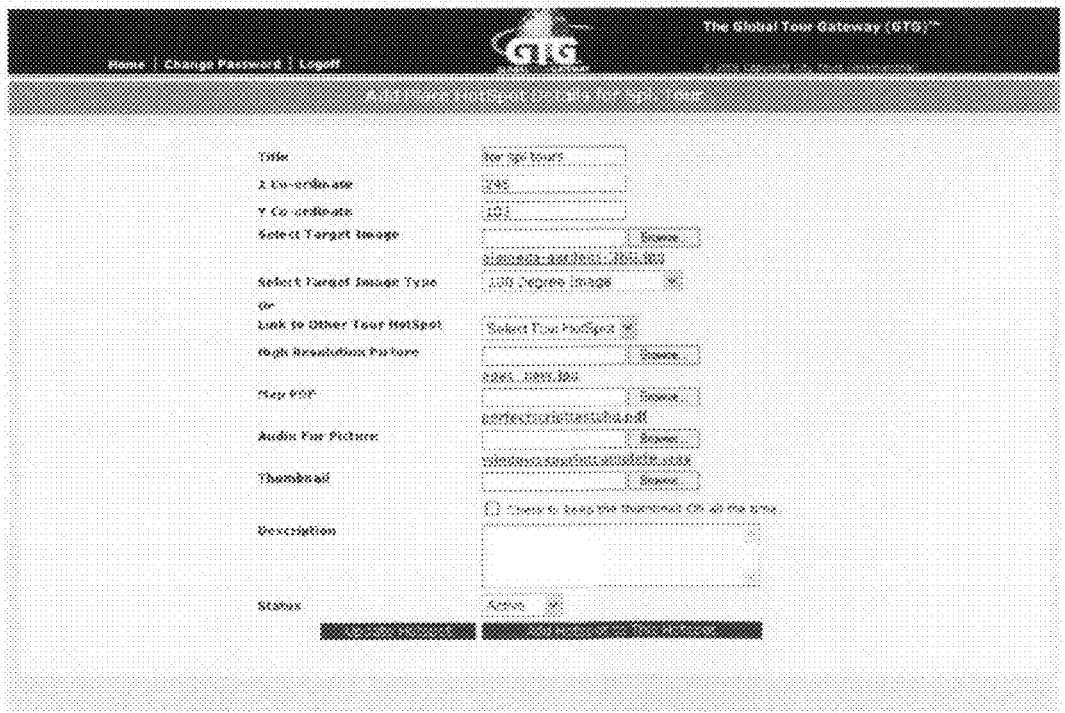
FIG. 43 is a screen shot illustrating the editing, moving or deleting a Picture Hotspot for a Special Tour, according to an exemplary embodiment of the present invention.

The admin can edit the existing picture hotspot. On placing the marker on the existing hotspot the admin is prompted with three options—Edit Hotspot, Delete Hotspot, and Move Hotspot. By clicking the Edit Hotspot option the admin will be displayed with "Edit Hotspot Details" screen as shown in FIG. 43.

The fields, Title, Target Image, High Resolution Picture, Map PDF are updated with the existing information. The admin can make the necessary changes and click Update Hotspot.

The admin can delete the existing hotspot by clicking the Delete Hotspot option after placing the marker on a particular hotspot.

Figure 44:
FIG. 44 is a screen shot illustrating the moving or deleting of a Picture Hotspot for a Special Tour, according to an exemplary embodiment of the present invention.

The admin can move the existing hotspot by clicking the Move Hotspot option. Then the admin will be prompted with two options—Fix Hotspot and Cancel Move. The admin can drag and drop the hotspot wherever required or fix the hotspot at the same location by clicking the Fix Hotspot option and cancel by Cancel Move option as shown in FIG. 44.

1.4.2.5 Manage Default Settings

Figure 45:
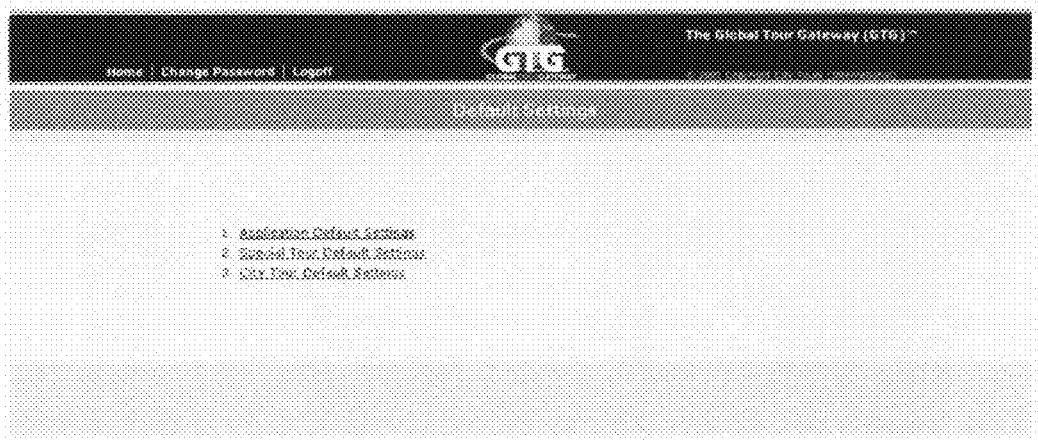
FIG. 45 is a screen shot illustrating the Main Default Settings Page, according to an exemplary embodiment of the present invention.

Manage Default Settings section enables the admin to add default settings to the application. On clicking the Manage Default Settings link, a new screen appears displaying three links as follows:

1. 1. Application Default Settings
2. 2. Special Tour Default Settings
3. 3. City Tour Default Settings The Manage Default Settings is shown in FIG. 45

1.4.2.5.1 Application Default Settings

Figure 46:
FIG. 46 is a screen shot illustrating the Application Default Settings Page, according to an exemplary embodiment of the present invention.

The screen allows the admin to add default settings to the application. On clicking the Application Default Settings link, the screen will be displayed as shown in FIG. 46.

About the Fields:

| Fields | Description |
| --- | --- |
| Set Default City | Holds the list of City names. [Combo Box] |
| Set Default Hotspot | Holds the list of Hotspots. [Combo Box] |
| Set Default | When clicked, sets the selected City and Hotspot as default to the system. [Button] |

The admin needs to select the City Name and Hotspot to set as a default and click on the Set Default button. Then the city name and map hotspot are added to the application as default settings. These default application settings are displayed by default to the user in the User Interface.

1.4.2.5.2 Special Tour Default Settings

Figure 47:
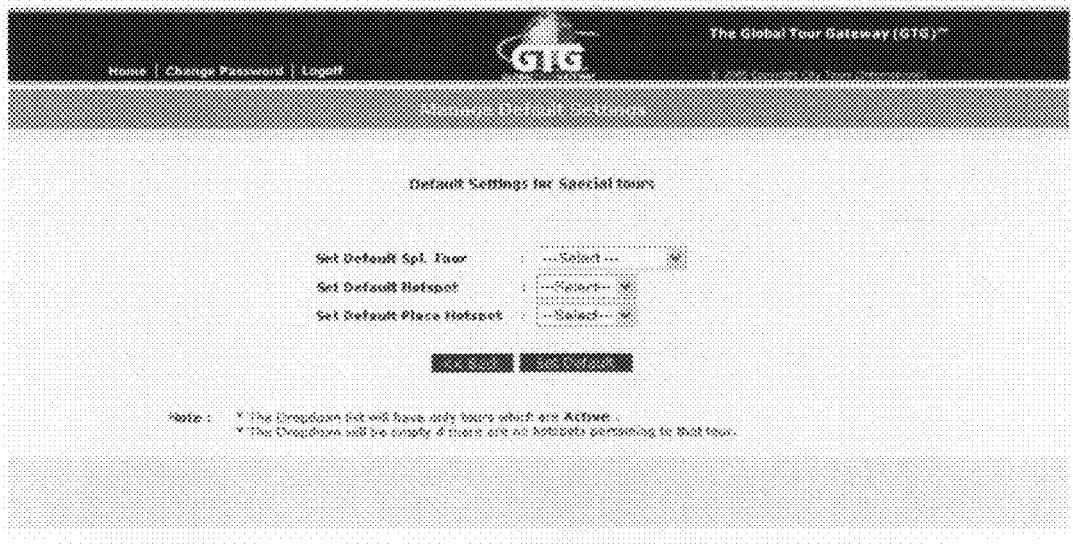
FIG. 47 is a screen shot illustrating the Special Tour Default Settings Page, according to an exemplary embodiment of the present invention.

The screen allows the admin to add default settings for the Special Tour. On clicking the Special Tour Default Settings link the screen will be displayed as shown in FIG. 47.

About the Fields:

| Fields | Description |
| --- | --- |
| Set Default Spl Tours | Holds the list of Special Tours. [Combo Box] |
| Set Default Hotspot | Holds the list of hotspots. [Combo Box] |
| Set Default Place Hotspot | Holds the list of place hotspots. [Combo Box] |
| Set Default | When clicked, sets the default settings to the system [Button] |

The admin is required to select the special tour, hotspot, place hotspot and click on the Set Default button. Then the special tour, hotspot and place hotspot are added to the application as default settings. These default settings for Special Tour are displayed to the user in the User Interface by default.

1.4.2.5.3 Default Settings for City Tour

Figure 48:
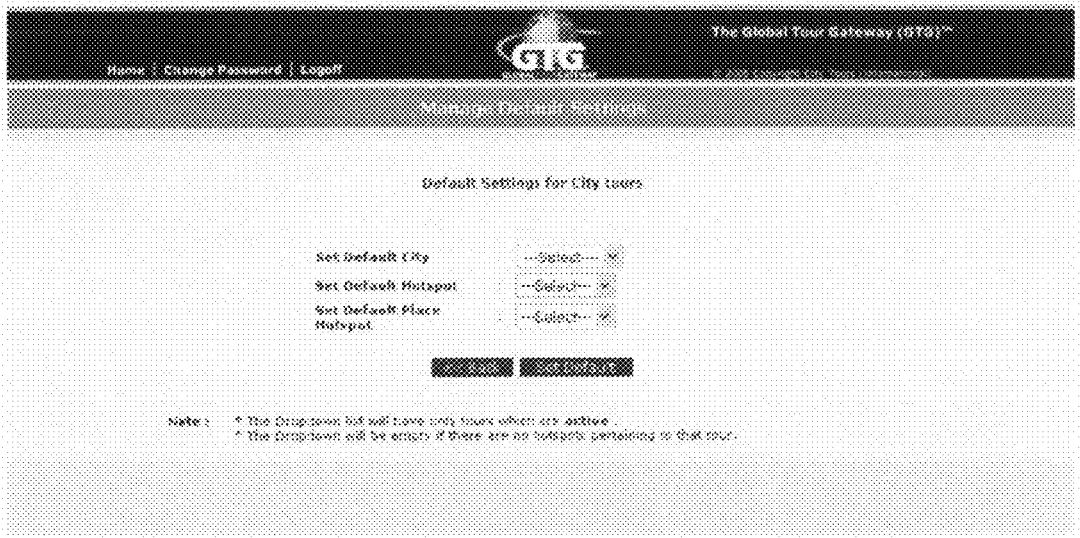
FIG. 48 is a screen shot illustrating the City Tour Default Settings Page, according to an exemplary embodiment of the present invention.

The screen allows the admin to add default settings for City Tour. On clicking the City Tour Default Settings link, the screen will be displayed as shown in FIG. 48.

About the Fields:

| Fields | Description |
| --- | --- |
| Set Default City | Holds the list of City names. [Combo Box] |
| Set Default Hotspot | Holds the list of hotspots. [Combo Box] |
| Set Default Place Hotspot | Holds the list of place hotspots. [Combo Box] |
| Set Default | When clicked, updates the information. [Button] |

The admin needs to select the default city name, hotspot and place hotspot and click on the Set Default button. Then the City, map hotspot and place hotspot are added to the application as default settings. These default settings for City Tour are displayed to the user in the User Interface by default.

2. Manage Licensees

The Manage licensees section enables the super admin to view the registered licensees of City Explorer. The module also allows the super admin to add new licensee details.

2.1 Add/Manage Licensee

Figure 49:
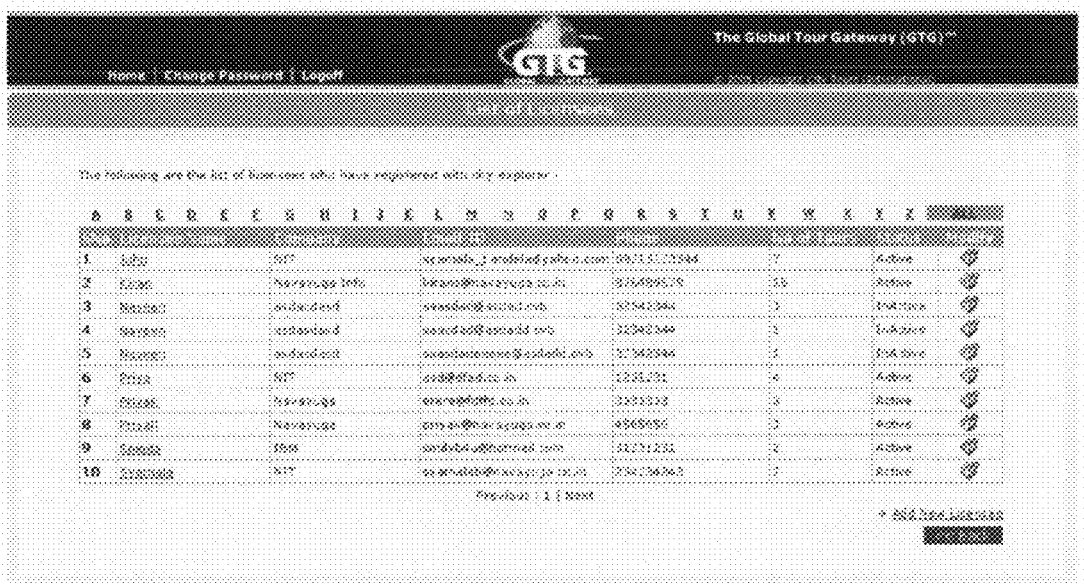
FIG. 49 is a screen shot illustrating the Add Manage Licensees page, according to an exemplary embodiment of the present invention.

Add/Manage licensee screen displays the list of licensees who have registered with City Explorer. Invoke the List of Licensees screen by clicking the Add/Manage Licensee link. The licensee details such as Licensee Name, Company, Email-ID, Phone, No. of Tours, and Status is displayed in columns as shown in FIG. 49.

The super admin can also view the licensee details in alphabetical order by clicking the Alphabets hyperlinks on the top of the screen. By clicking the ALL button the list of all the licensees registered with City Explorer are displayed.

Figure 50:
FIG. 50 is a screen shot illustrating the Add New Licensee Page, according to an exemplary embodiment of the present invention.

The super admin can add a new Licensee by clicking the Add New Licensee hyperlink at the bottom of the screen. This opens a new screen titled "New Licensee Details" as shown in FIG. 50.

About the Fields:

| Fields | Description |
| --- | --- |
| Name | Allows the super admin to enter the Name. [Edit Box] - [Mandatory] |
| Company | Allows the super admin to enter the Company Name. [Edit Box] - [Mandatory] |
| Email | Allows the super admin to enter the Email Id. [Edit Box] - [Mandatory] |
| Door No/Plot No/ House No | Allows the super admin to enter the Door number or Plot number or House number. [Edit Box] - [Mandatory] |
| Street Name | Allows the super admin to enter the name of the street. [Edit Box] - [Mandatory] |
| Country Phone Code | Allows the super admin to enter the phone code of the country. [Edit Box] |
| City | Allows the super admin to enter the name of the City. [Edit Box] - [Mandatory] |
| Country/State/ Province | Allows the super admin to enter the name of the Country or State or Province. [Edit Box] - [Mandatory] |
| Post Code | Allows the super admin to enter the postal code. [Edit Box] - [Mandatory] |
| Phone 1 and 2 | Allows the super admin to enter the phone numbers. [Edit Box] - [Mandatory] |
| Mobile | Allows the super admin to enter the mobile number. [Edit Box] |
| Website URL | Allows the super admin to enter the website URL. [Edit Box] |
| No. of tours | Holds the list of tours. [Combo Box] - [Mandatory] |
| Tour Details | Holds the Tour details. |
| Tour Name | Allows the super admin to enter the name of the tour. [Edit Box] |
| Tour Type | Holds the list of tour types either City Tour or Special Tour. [Combo Box] |
| No of Map Hotspots | Allows the super admin to enter the number of hotspots to be added to the selected tour. [Edit Box] |
| No of Picture Hotspots | Allows the super admin to enter the number of picture hotspots to Be added to the selected tour. [Edit Box] |
| Levels per Picture Hotspot | Allows the super admin to enter the number of levels to be added for each picture hotspot. [Edit Box] |
| No of uploads | Allows the super admin to enter the total number of uploads allowed. [Edit Box] |
| Tour Duration (In days) | Allows the super admin to enter the total duration of the tour in days. [Edit Box] |
| Start by Date | Allows the super admin to select the starting date of the tour. [Edit Box] |
| Back | When clicked, moves the admin one level back. [Button] |
| Clear | When clicked, deletes the added information and clears the fields. [Button] |
| Save | When clicked, saves the changes made by the super admin. [Button] |

The super admin needs to enter the personal details as well as Tour Details and save. The Start by Date should be greater than the current date. The tour details column displays only the number of rows that are specified in the No. of Tours field.

Note: The no. of map hotspots, picture hotspots, levels per picture hotspots and uploads entered in the tour details are only allowed while adding City or Special Tours.

Figure 51:
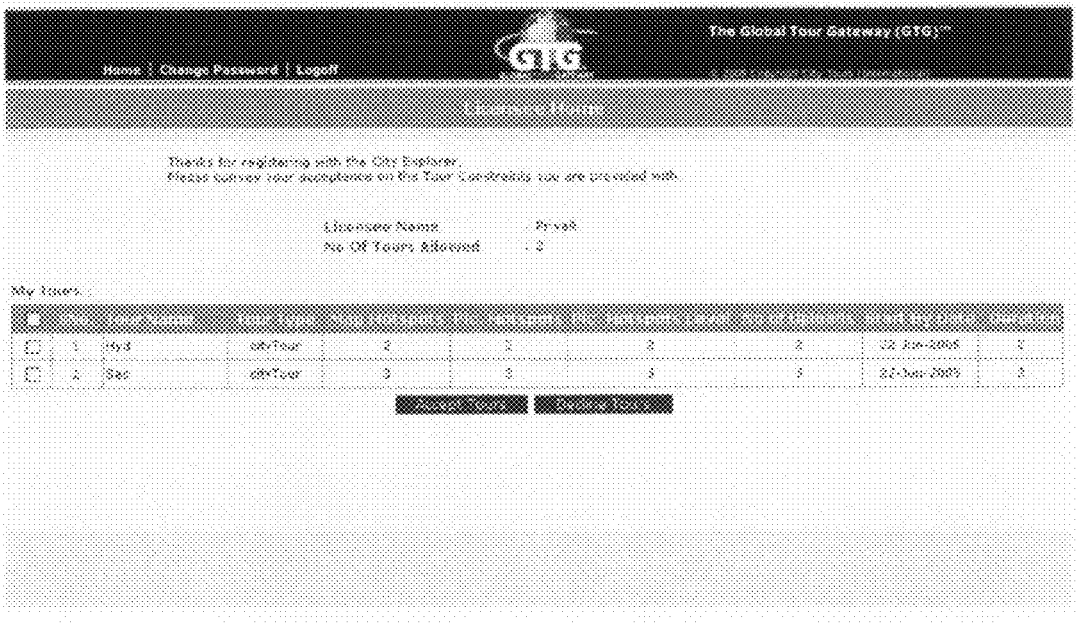
FIG. 51 is a screen shot illustrating the Licensee Home Page, according to an exemplary embodiment of the present invention.

After successful registration, the registration details, the URL and the login details are sent to the Licensees Email Id. Initially, the Licensee should enter into the Licensee track id and log in through the track link for the first time and then only the licensee can change the Password. The Licensee should enter the registered User Name and Password in the login form. The Licensee enters the Licensee Home page after successful login as shown in FIG. 51.

The Licensee Home Page displays the Licensee Name and No. of Tours allowed for that particular licensee on the top. The tour details are displayed in the middle of the screen. The Licensee needs to accept or decline the tours by clicking the Accept Tours or Decline Tours buttons at the bottom of the screen after selecting a particular tour check box.

Note:

1. The licensee needs to perform any one operation either Accept or Decline tour to continue further.

2. The licensee should accept a tour in order to upload a tour.

Note: When the licensee accepts a tour the application displays a warning message as "Do you accept the selected tours?".

Figure 52:
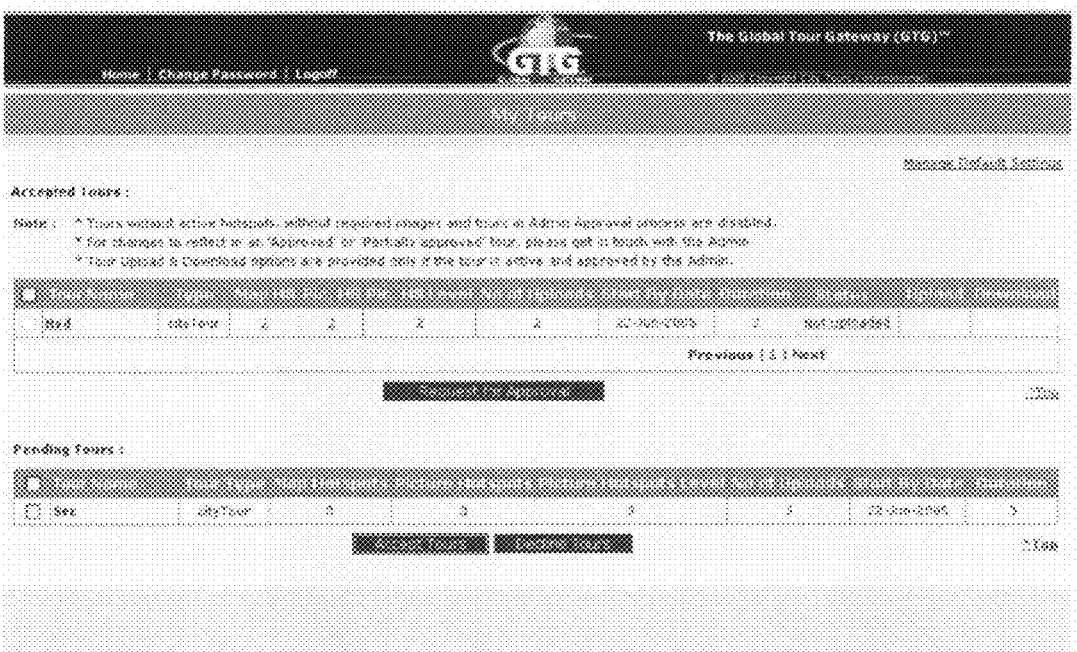
FIG. 52 is a screen shot illustrating the Licensee My Tour Screen Page, according to an exemplary embodiment of the present invention.

The My Tour screen after accepting a tour appears as shown in FIG. 52.

Figure 53:
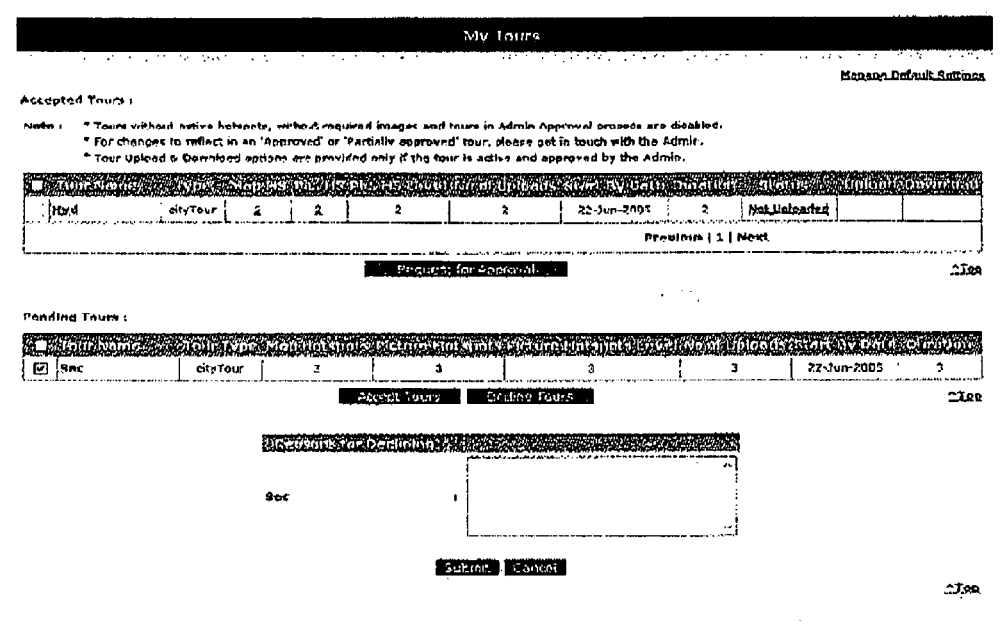

When the licensee tries to decline a tour the application displays the following message "Do you really want to decline the selected tours". If the licensee wants to continue then the application asks for the Reasons for Declining as shown in FIG. 53.

Figure 54:
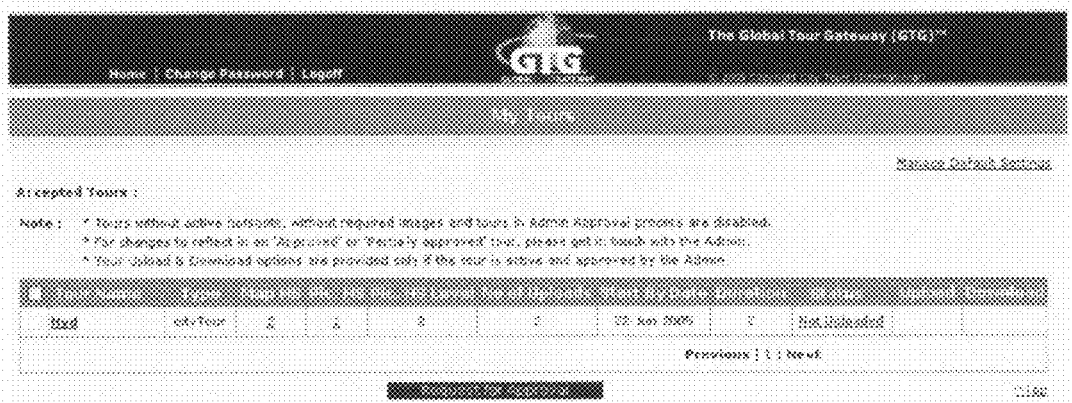
FIG. 54 is a screen shot illustrating the List of Licensee accepted tours, according to an exemplary embodiment of the present invention.

The licensee needs to enter the reason for declining and click Submit. Then the screen displays only the accepted tour and moves the declined tour to the View/update Licensee Declined Tours screen in super admin module as shown in FIG. 54.

As discussed above the new registered licensee details are displayed in the List of Licensees screen in Manage Licensee-Add/manage Licensees section. The Licensee Name in the grid has a hyperlink by clicking which the licensee can view the details of licensee such as Tour Name, Tour Type, No. of Map Hotspots, No. of Picture Hotspots, Levels per Picture Hotspot, No. of Uploads, Start by Date, End Date and Status.

Figure 55:
FIG. 55 is a screen shot illustrating the Modify License details page, according to an exemplary embodiment of the present invention.

The super admin can modify the existing Licensee details by clicking the Modify icon at the end of each row. This moves the super admin to the Modify Licensee Details screen as shown in FIG. 55.

The fields Name, Company Name, Email, Door No/Plot No/House No, Street Name, City, Country/State/Province, Post Code, and Phone are populated with the existing information. The super admin can make the necessary changes and click Update button.

Note: The updated licensee details are sent to the respective licensee's Email Id.

2.2 Add/Manage Licensee Tours

Figure 56:
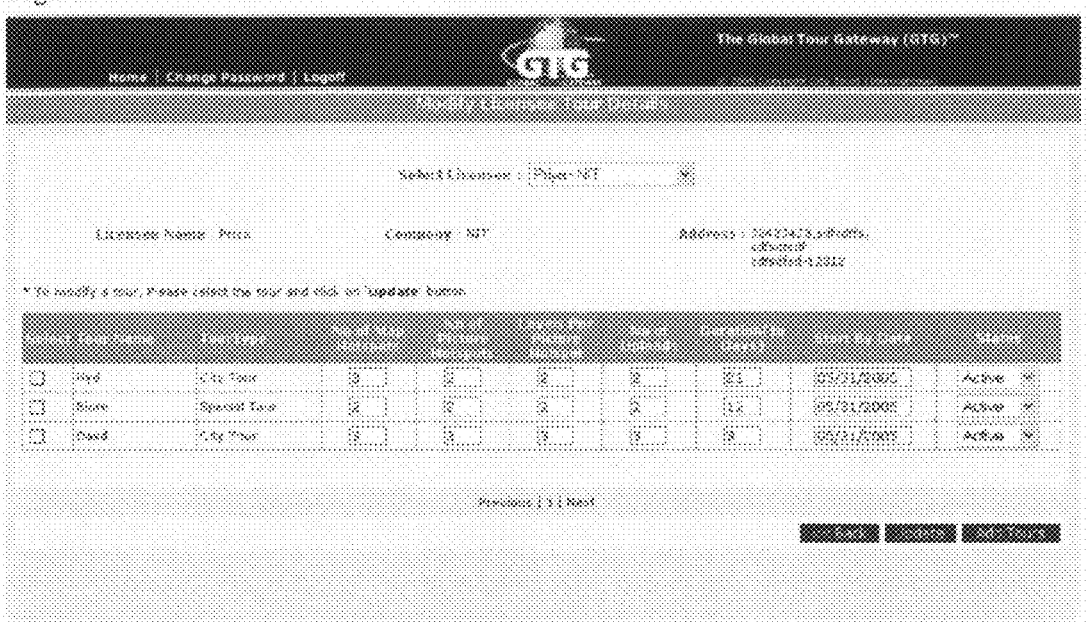
FIG. 56 is a screen shot illustrating the Add Manage Licensee Tours, according to an exemplary embodiment of the present invention.

The screen enables the super admin to add or update the new or existing licensee tour details. On clicking the Add/Manage Licensee Tours link, the Modify Licensee Tour Details screen will be displayed as shown in FIG. 56.

About the Fields:

| Fields | Description |
| --- | --- |
| Select Licensee | Holds the list of licensees registered with City Explorer. [Combo Box] |
| Licensee Name | Displays the name of the licensee by default. |
| Company | Displays the name of the company by default. |
| Address | Displays the address of the licensee by default. |

Once the super admin selects the licensee name from the drop down list the screen will be updated with the Licensee Name, Company and Address of the license on the top. The screen also displays the licensee details such as Tour Name, Tour Type, No. of Map Hotspots, No. of Picture Hotspots, Levels per Picture Hotspots, No. of Uploads, Duration, Start by Date and Status in the middle of the screen.

The super admin can update the tour details by selecting the corresponding check box at the beginning of each row. This makes the row editable and the super admin can make the necessary changes and click Update.

Figure 57:
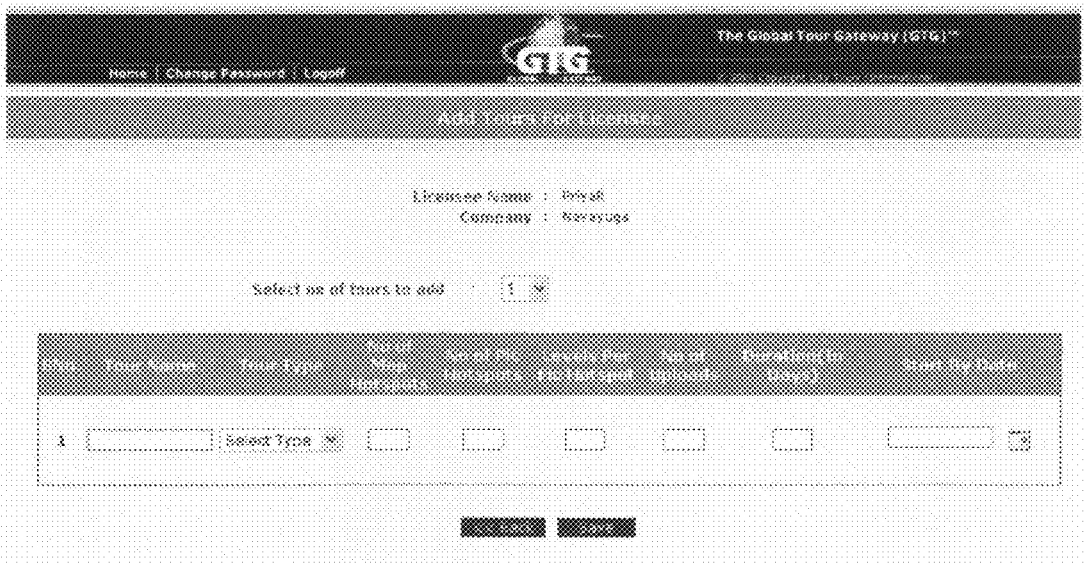
FIG. 57 is a screen shot illustrating Super Admin's Add Tours for Licensee, according to an exemplary embodiment of the present invention.

The super admin can also add new tours, if required by clicking the Add Tours button at the bottom of the screen. This displays a new screen titled "Add Tours for Licensee" as shown in FIG. 57.

The screen displays the Licensee Name and Company Name on the top. The super admin can also select the No. of tours to add to a licensee from the drop down list. The super admin needs to enter the information into the fields and save as shown in FIG. 57.

Note: When any licensee details are updated or any new tours are added to the selected licensee the details are sent to the licensee's Email Id.

2.3 View/Update Licensee Declined Tours

Figures 58, 59:
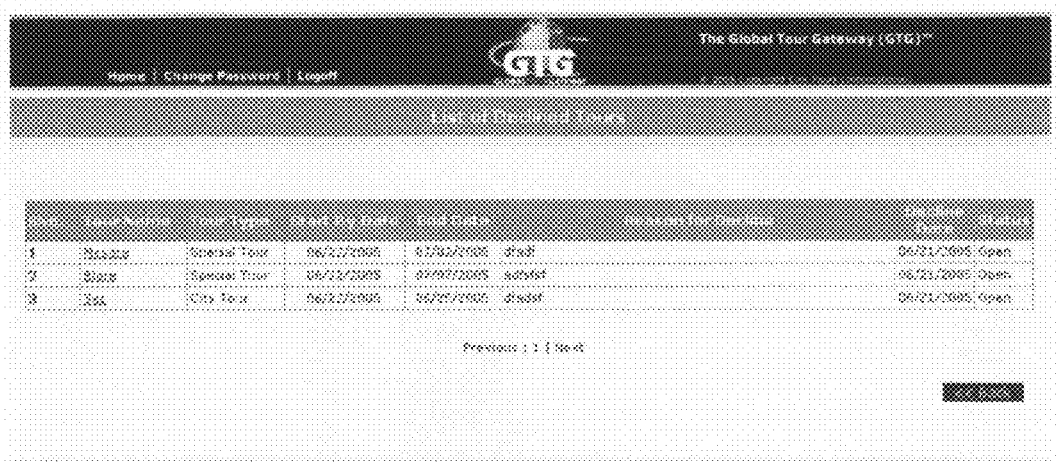
FIG. 58 is a screen shot illustrating the View Update Licensee Declined Tours, according to an exemplary embodiment of the present invention.
FIG. 59 is a screen shot illustrating the Modify Declined Tour Details, according to an exemplary embodiment of the present invention.

View/Update Licensee Declined Tours screen contains the list of declined tours and allows the super admin to view or update the details. Invoke the List of Declined Tours screen by clicking the View/Update Licensee Declined Tours link as shown in FIG. 58.

The Licensee details such as Tour Name, Tour Type, Start by Date, End Date, Reason for Decline, Decline Date, and Status are displayed in columns. The super admin can also update the Licensee declined tours by clicking the Tour Name hyperlink. This opens the Modify Declined Tour Details as shown in FIG. 59.

About the Fields:

| Fields | Description |
| --- | --- |
| Licensee Name | Displays the name of the licensee by default. [Text] |
| Company | Displays the company name by default. [Text] |
| Tour name | Allows the super admin to enter the name of the tour. [Edit Box] |
| Date Declined | Displays the current date by default. [Text] |
| Reason to Decline | Displays the reason for decline by default. [Text] |
| Tour Type | Allows the super admin to select the tour type either city tour orspecial tour. [Combo Box] |
| No. of Map hotspots | Allows the super admin to enter the no of map hotspots. [Edit Box] |
| No. of Picture Hotspots | Allows the super admin to enter the no of picture hotspots to be allowed. [Edit Box] |
| No. of Levels per Picture Hotspot | Allows the super admin to enter the no of levels to be allowed for picture hotspot. [Edit Box] |
| No. of Uploads | Allows the super admin to enter the no of uploads to be allowed. [Edit Box] |
| Duration | Allows the super admin to enter the total duration of the tour. [Edit Box] |
| Start Date | Allows the super admin to enter the starting date of the tour. [Edit Box] |
| Comments | Allows the super admin to enter comments, if any. [Edit Box] |
| Priority | Holds the list of priority either low/medium/high. [Combo Box] |
| Status | Holds the status either Open/pending/closed. [Combo Box] |
| Update | When clicked, save the changes made by the super admin. [Button] |

Note: All fields are mandatory. The Licensee Name and the Company Name are displayed on the top of the screen. The fields Tour name, No. of Map hotspots, No. of Picture Hotspots, No. of Levels per Picture Hotspots, No. of Uploads, Duration and Start Date are populated with the existing information. The super admin can make the necessary changes and click Update.

Note: Only the priority field will be updated when the status is pending.

2.4 Approve/Disapprove Licensee Tours

Figure 60:
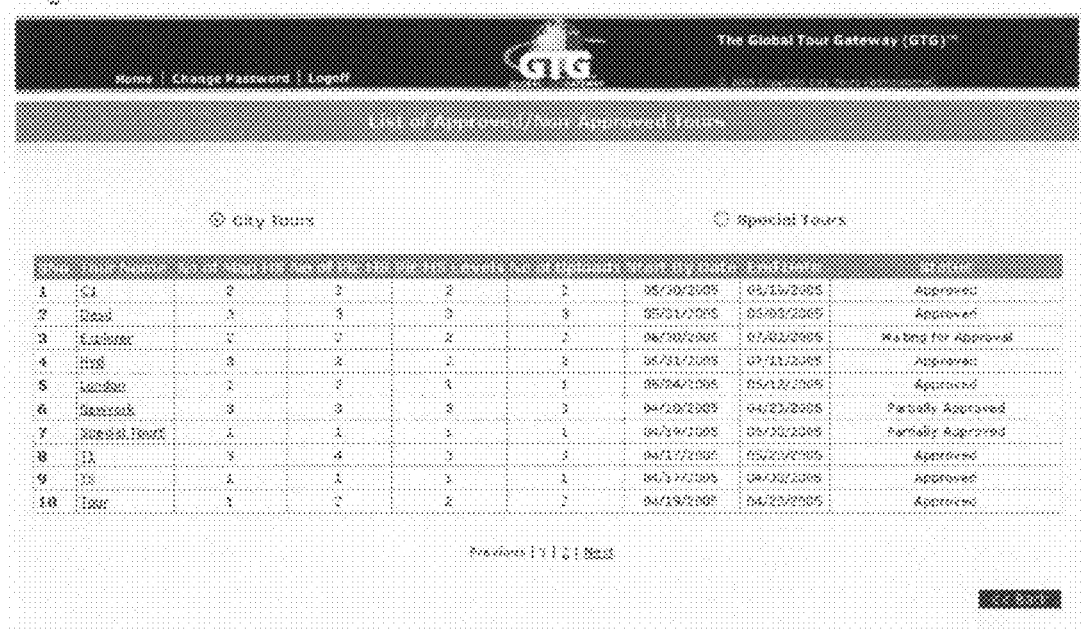
FIG. 60 is a screen shot illustrating the List of Approve Disapprove Licensee Tours, according to an exemplary embodiment of the present invention.

The screen allows the super admin to approve or disapprove the licensee tours. On clicking the Approve/Disapprove Licensee Tours link, the List Of Approve/Non-Disapproved Tours screen will be displayed as shown in FIG. 60.

The screen consists of two radio buttons, City Tours and Special Tours on clicking which the grid will be updated with the related information. The City or Special Tour details such as Tour name, No of Map Hotspots, No. of Picture Hotspots, Picture Hotspot Levels, No. of Uploads, Start by Date, End Date and Status are displayed.

Figure 61:
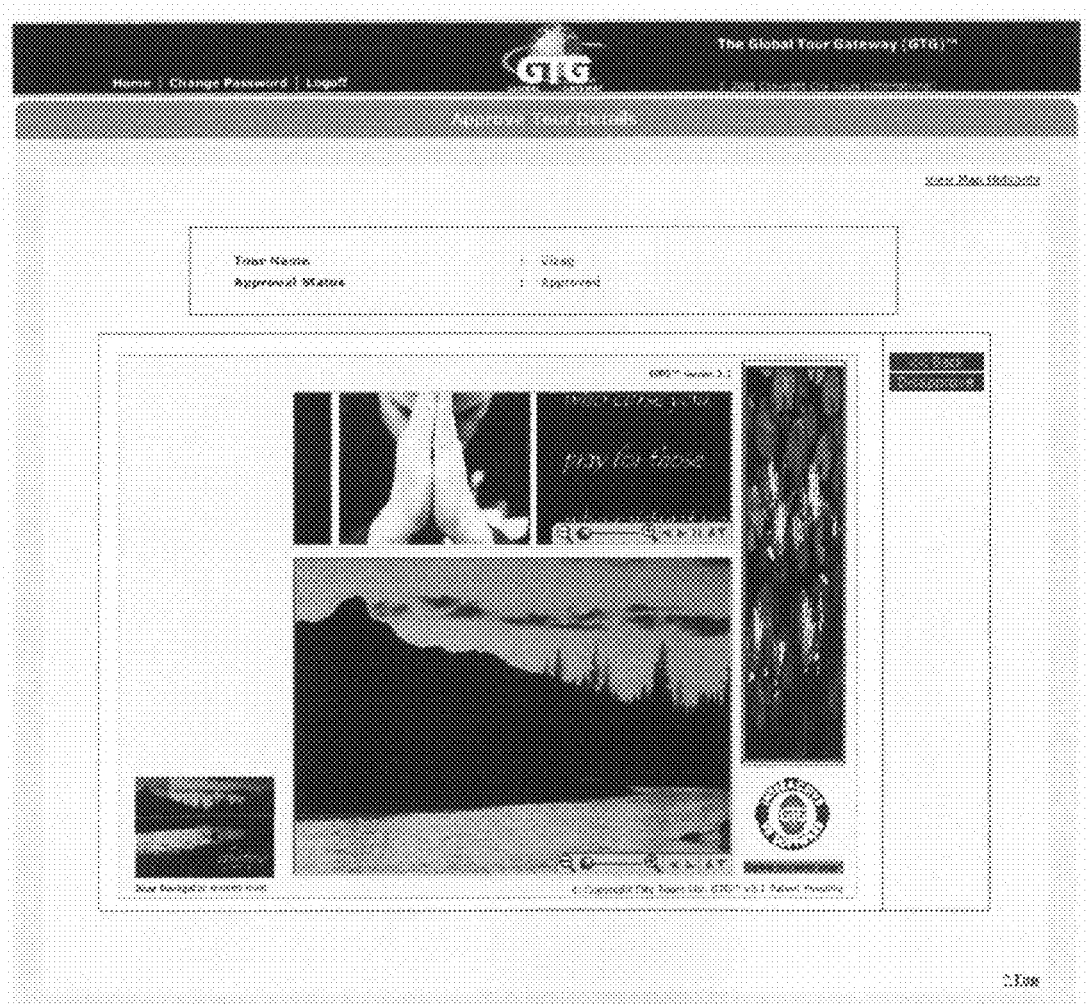
FIG. 61 is a screen shot illustrating the Tour for Approval or Disapproval of Tours, according to an exemplary embodiment of the present invention.

On clicking the respective link, the screen moves to a new screen titled "Approve Tour Details" as shown in FIG. 61.

Figure 62:
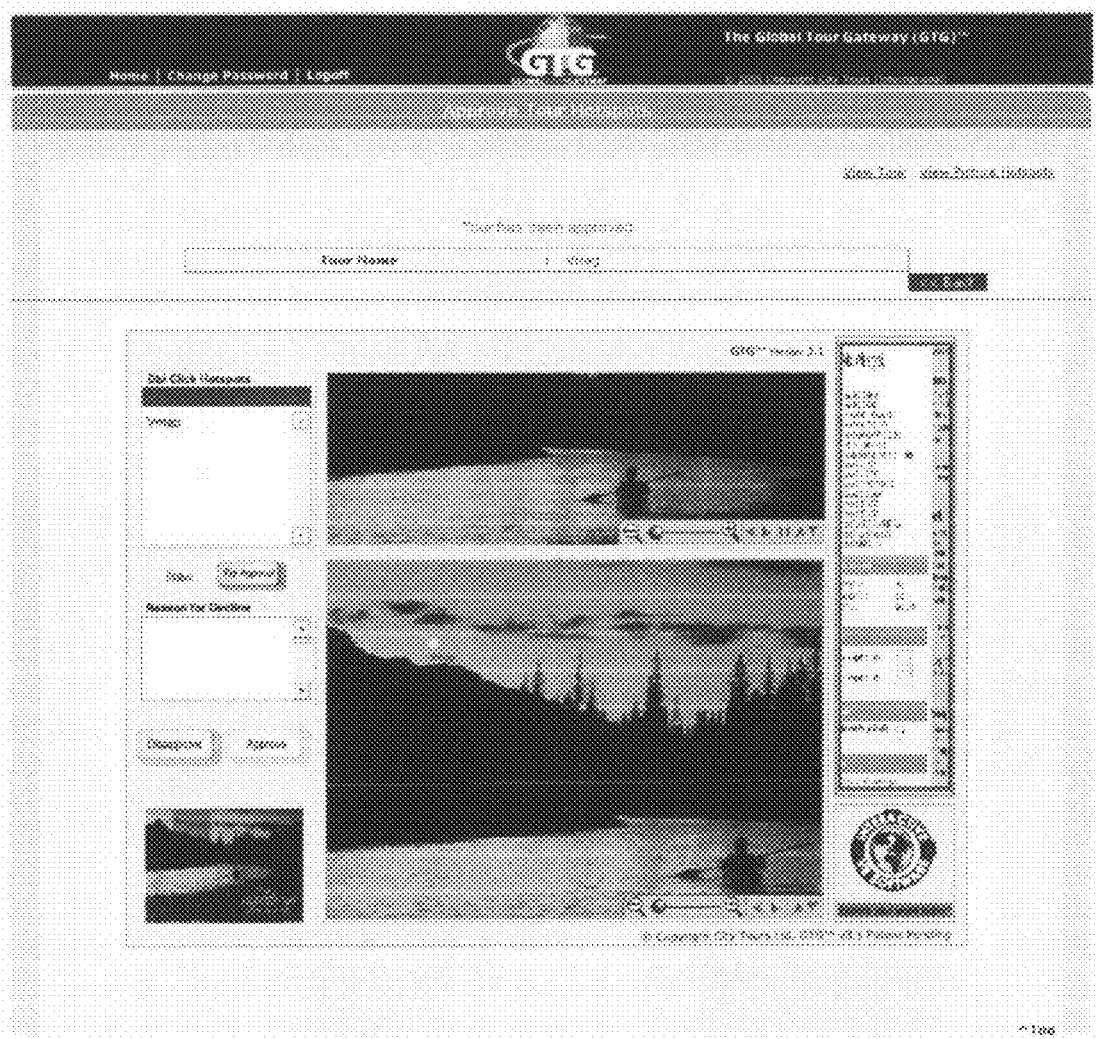
FIG. 62 is a screen shot illustrating the Tour for Approval or Disapproval of Map Hotspots, according to an exemplary embodiment of the present invention.

This screen displays the Tour Name and its Status either Approved or Disapproved on the top. The Map Hotspots, Picture Hotspots and Banner are displayed in the middle of the screen. The super admin can also view the map hotspots by clicking the View Map Hotspots hyperlink at the top right corner of the screen. This moves super admin to a new screen displaying the map hotspots as shown in FIG. 62.

Figure 63:
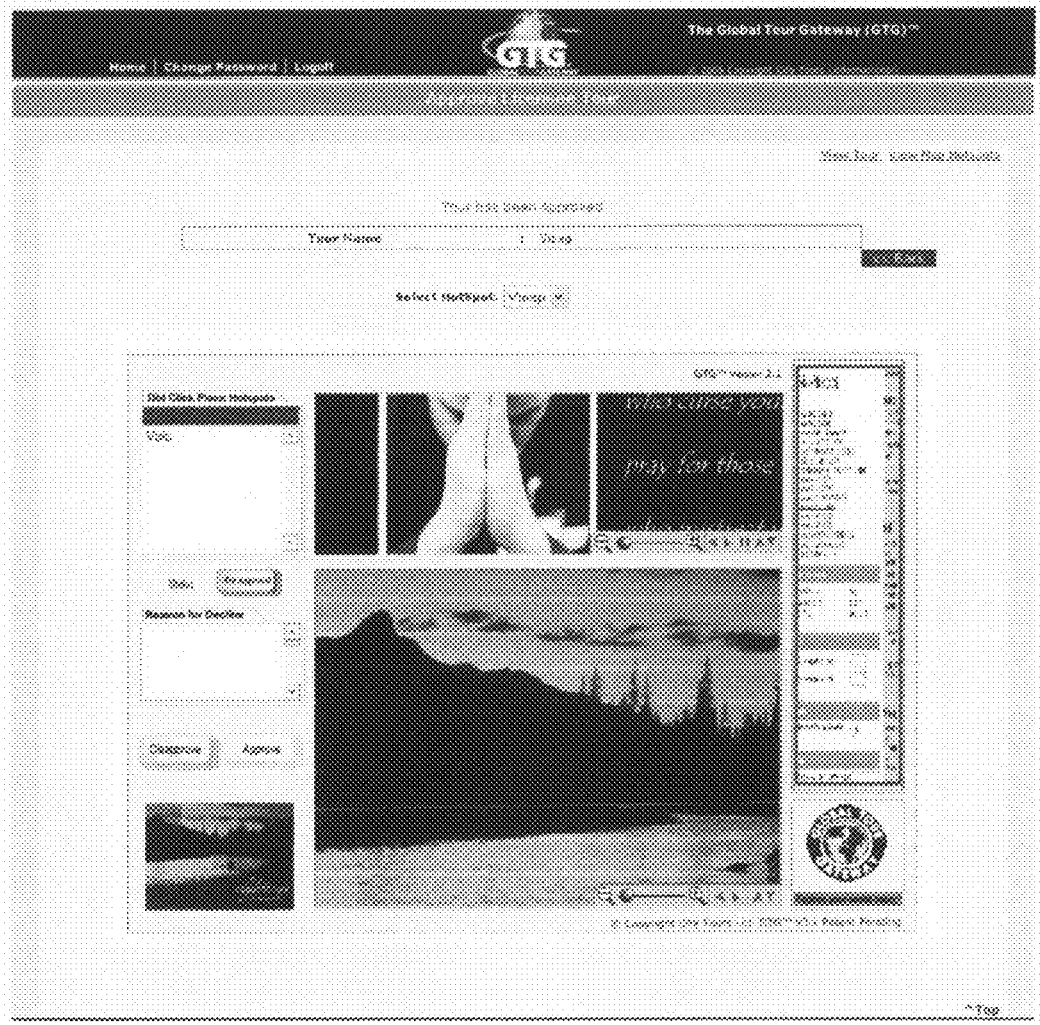
FIG. 63 is a screen shot illustrating the admin view of approved tour, according to an exemplary embodiment of the present invention.

On clicking the View Tour and View Picture Hotspots hyperlinks at right side corner on the top of the screen the admin can view the Tour and Picture Hotspots of the City or Special Tour. The Picture Hotspots screen appears as shown in FIG. 63.

The screen displays the Tour Name on the top and allows the admin to select the type of Picture Hotspot from the drop down list.

2.5 View Extension Requests

Figure 64:
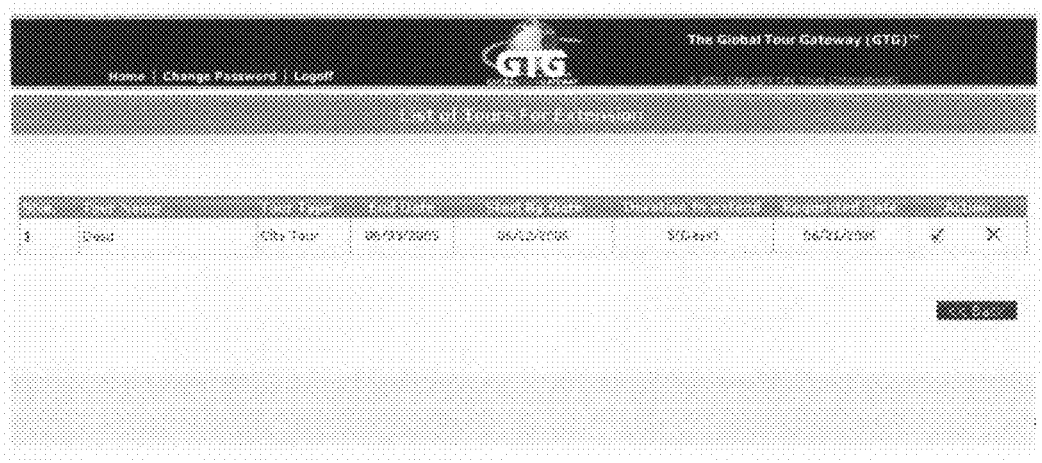
FIG. 64 is a screen shot illustrating the view extension requests page, according to an exemplary embodiment of the present invention.

The super admin can also view extension requests by clicking the View Extension Requests link in admin module. The View Extension Requests screen consists of the list of tours for extension. The screen allows the super admin to approve or reject tour extension as shown in FIG. 64.

The screen displays the request details of extension such as Tour Name, Tour Type, End Date, Start by Date, Duration to Extend, Requested Date and the Action to be performed either Approve Extension or Reject Extension.

3. Alerts

Alerts are of two types:
1. Licensees Declined Tours
2. Tours/Hotspots Approval Requests
FIG. 65 illustrates this.

3.1 Licensees Declined Tours

This section raises an alert when the declined tours are Total Pending and High Priority. This also displays the total number of tours that are pending and also a hyperlink to view the tour details.

When the super admin clicks on the View hyperlink adjacent to the total pending the screen will be displayed as shown in FIG. 66.

When the super admin clicks on the view hyperlink adjacent to the high priority then the screen will be displayed as shown in FIG. 67.

3.2 Tours/Hotspots Approval Requests

Tours/Hotspots Approval Requests raises an alert when the tours are requested for approval. The alerts are raised when the admin request to approve city tours, special tours, map hotspots, and picture hotspots.

Figure 68:
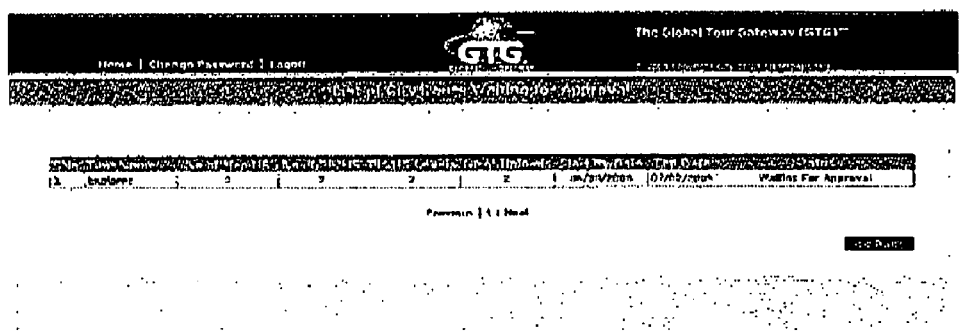
FIG. 68 is a screen shot illustrating the Tours and Hotspots Approval Requests, according to an exemplary embodiment of the present invention.

When the super admin clicks on the View hyperlink adjacent to the City Tours then the screen will be displayed as shown in FIG. 68.

The screen displays the list of city tours waiting for approval. The tour details such as Tour Name, No. of Map Hotspots, No. of Picture Hotspots, Picture Hotspot Levels, No. of Uploads, Start by Date, End Date and Status are displayed in columns.

4. Licensee Module

The Module allows the licensee to view the details of licensees registered with City Explorer. The licensee can also modify the tour details and request for tour extension when the tour is expired. The licensee module also allows the licensee to request for tour approval and accept or decline tours.

4.1 Logging into Licensee Module

Figure 69:
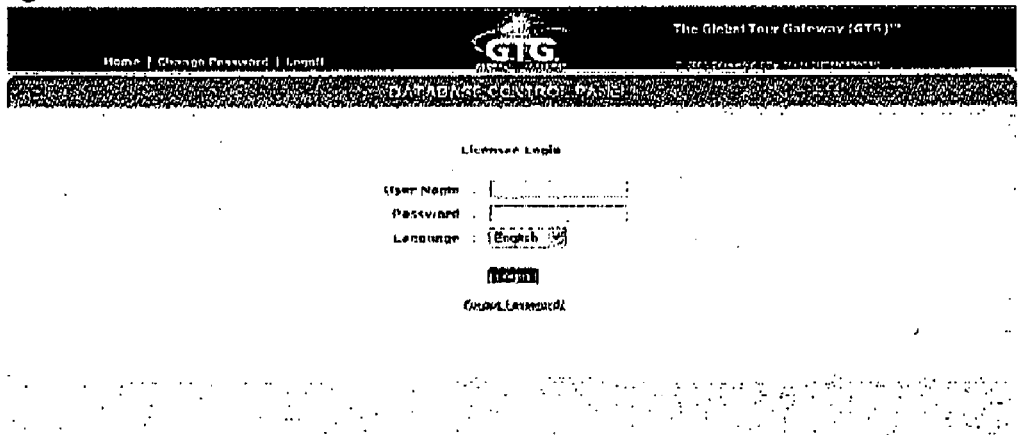
FIG. 69 is a screen shot illustrating the Login Licensee Module, according to an exemplary embodiment of the present invention.

After successful registration, the registration details, the URL and the login details are sent to the Licensees Email Id. Initially, the Licensee should enter into the Licensee track id and log in through the track link then the login screen is displayed as shown in FIG. 69.

4.2 Login and Password

The licensee needs to enter the registered User Name and Password for the first time and then only the licensee can change the Password. If the User Name and Password are authenticated, then the Licensee home page is displayed else the licensee is prompted to check the entered values.

Figure 70:
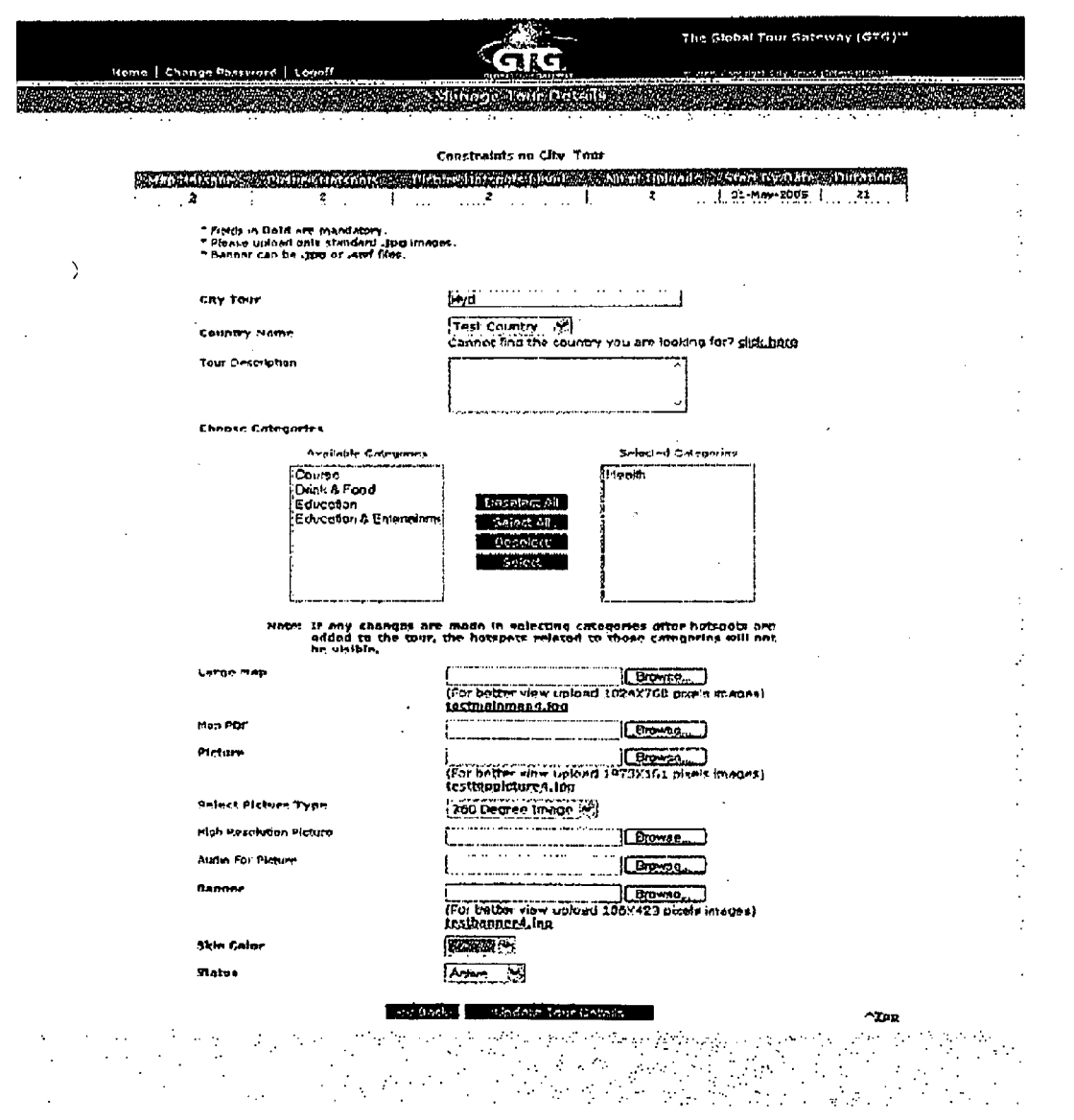

The following Licensee Home screen will be displayed to the licensee after successful login as shown in FIG. 70.

The screen displays the Licensees Map or Picture hotspots that can be added/activated to the active tours on the top. The Accepted Tour details such as Tour Name, Type, Map Hotspots, Picture Hotspots, Picture Hotspots Level, No. of Uploads, Start by Date, Duration, Status, Upload, and Download are displayed in grid in the middle of the screen.

The Accepted Tours section allows the licensee to manage tour details, request for approval or extension, Upload and download the active and approved tours by admin.

The licensee can request for approval by clicking the Request for Approval button after selecting the respective Tour Name check box. This displays a message asking the licensee to confirm the admin approval request for the selected tours. When the licensee clicks OK then the selected tours will be requested for approval.

The licensee can edit the existing Accepted Tour details by selecting a particular tour name check box and clicking a particular Tour Name hyperlink. This displays a new screen titled "Manage Tour Details" as shown in FIG. 71.

The Constraints on City Tour such as Map Hotspots, Picture Hotspots, Picture Hotspot Levels, No. of Uploads, Start by Date and Duration of the tour are displayed in grid on the top of the screen. The licensee can make the necessary changes to the fields in the middle of the screen.

About the Fields:

| Fields | Description |
| --- | --- |
| City tour | Allows the licensee to enter the title for City Tour. [Edit Box] - [Mandatory] |
| Country Name | Holds the list of country names. [Combo Box] - [Mandatory] |

Figure 72:
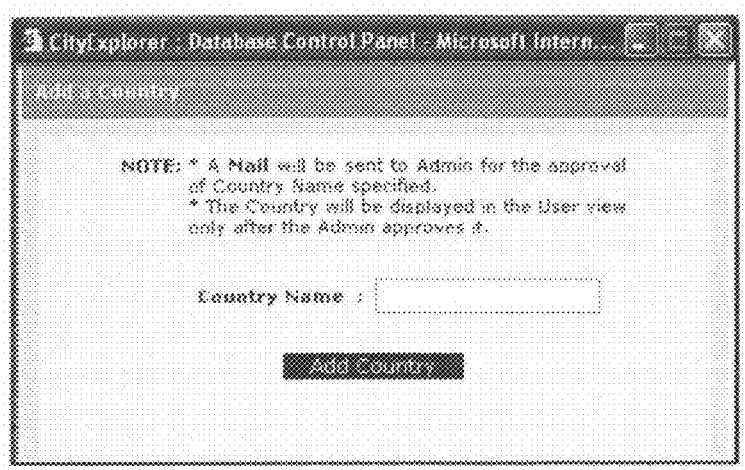
FIG. 72 is a screen shot illustrating the Add Country window if particular country is not found, according to an exemplary embodiment of the present invention.

If the licensee could not find the Country name he/she is looking for then the licensee can click on the link that appears below the field. This opens a pop-up window as shown in FIG. 72.

The licensee needs to enter the name of the Country in the fields and click Add Country button. This action sends a mail to the Admin for the approval of the Country Name specified and the Country Name will be displayed in the User view only after the admin approves it.

About the Fields:

| Fields | Description |
| --- | --- |
| Tour Description | Allows the licensee to enter the description of the tour. [Edit Box] |
| Choose Category | Allows the licensee to choose the category. [Column] - [Mandatory] |
| Large Map | Allows the licensee to select large map. [Edit Box] - [Mandatory] |
| Map PDF | Allows the licensee to select map pdf. [Edit Box] |
| Picture | Allows the licensee to select picture. [Edit Box] - [Mandatory] |
| Select Picture Type | Allows the licensee to select the type of picture. [Edit Box] - [Mandatory] |
| High Resolution Picture | Allows The licensee to select High Resolution Picture. [Edit Box] |
| Audio for Picture | Allows the licensee to select the audio for picture. [Edit Box] |
| Banner | Allows the licensee to select the banner for picture. [Edit Box] - [Mandatory] |
| Skin Color | Holds a wide range of colors. [Combo Box] - [Mandatory] |
| Status | Holds the status either Active or Inactive. [Combo Box] - [Mandatory] |

-continued

| Fields | Description |
|---|---|
| Update Tour Details | When clicked, save the changes made by the licensee. [Button] |

The licensee can make the changes to the City Tour title, Country Name and enter the Tour Description. The Available Categories and the Selected Categories are displayed in the two columns. The licensee can select or deselect the categories.

Note: If any changes are made in Selecting Categories after hotspots are added to the tour, the hotspots related to those categories will not be visible.

The licensee needs to select the Large Map, Map Pdf, Picture, High Resolution Picture, Audio for Picture and Banner for the tour. The licensee can also select the Skin Color in which he/she wants the User Interface to be displayed. Finally, select the Status either Active or Inactive and click Update Tour Details to save the changes made.

The licensee needs to approve the tour in order to add map hotspots, picture hotspots and banner to the tours. The tours must be active in order to upload or down load the tours.

4.2.1 Request for Extension

Figure 73:
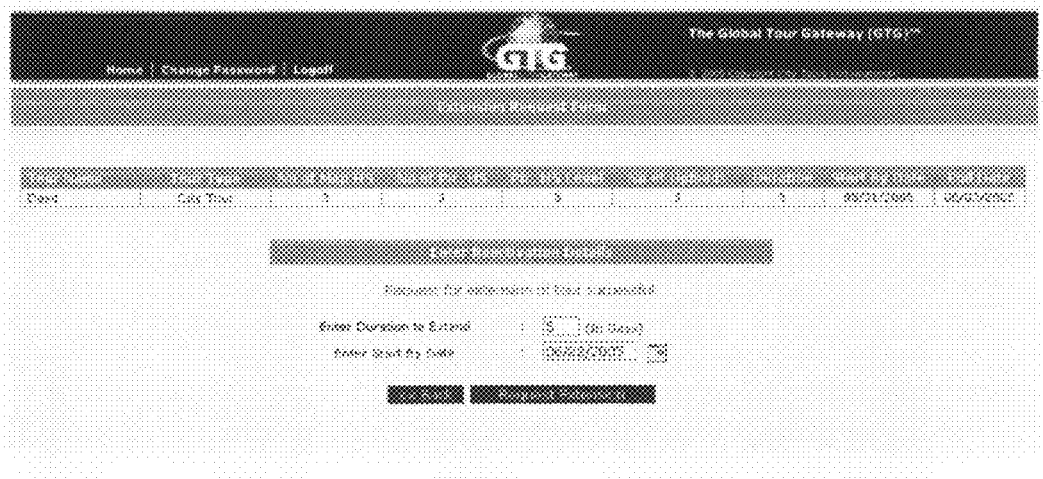
FIG. 73 is a screen shot illustrating the Licensee Extensions Request page, according to an exemplary embodiment of the present invention.

The licensee can request for extension when the tour is expired by clicking the Request Extension link in the Status column. This displays the Extension Request Form as shown in FIG. 73.

The screen displays the Tour Name, Tour Type, No. of Map Hotspots, Picture Hotspots Level, No. of Uploads, Duration, Start by Date, End Date. The Enter Reactivation Details are displayed in the middle of the screen. The licensee needs to enter the duration to extend the tour, the starting date and click on the Request Extension button. Then the tour will be approved for extension.

Note: The expired tour can be requested for extension only if the tour is approved, active and the start by date is mentioned.

Pending Tours The Pending Tours, if any are displayed at the bottom of the My Tours screen. The pending tour details such as Tour Name, Tour Type, Map Hotspots, Picture Hotspots, Picture Hotspots Level, No of Uploads, Start by Date are displayed in columns. The licensee can click on the Accept Tours or Decline Tours buttons either to accept or decline the Pending Tours.

4.3 Manage Default Settings

Figure 74:
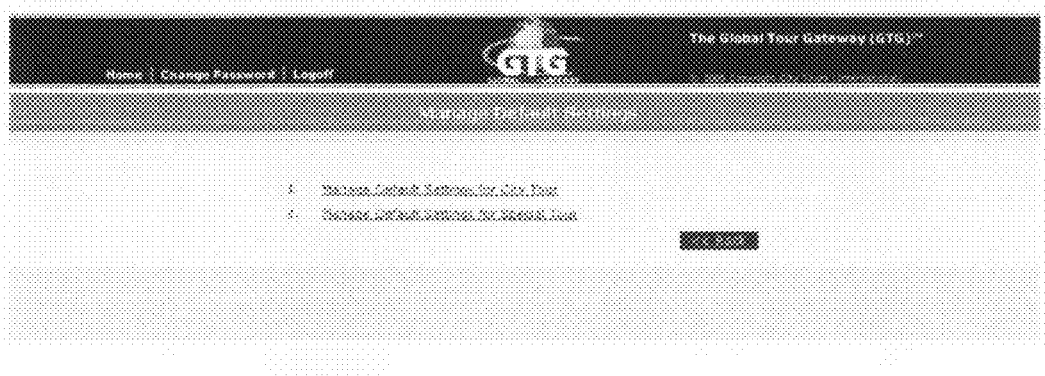
FIG. 74 is a screen shot illustrating the Licensee Manage Default Settings page, according to an exemplary embodiment of the present invention.

The licensee can add default settings to City Tour or Special Tour by clicking the Manage Default Settings hyperlink at the top right hand corner of the screen. This displays a screen as shown in FIG. 74.

4.3.1 Manage Default Settings for City Tour

Figure 75:
FIG. 75 is a screen shot illustrating the Licensee Manage Default Settings for City Tour page, according to an exemplary embodiment of the present invention.

The screen allows the licensee to add default settings for City Tour as shown in FIG. 75.

The admin needs to select the default city name, hotspot and place hotspot and click on the Set Default button. Then the City, map hotspot and place hotspot are added to the application as default settings. These default settings for City Tour are displayed to the user in the User Interface by default.

Note: The Dropdown list will have only tours which are approved by administrator and are active.

The Dropdown will be empty if there are no hotspots pertaining to that tour. About the Fields:

| Fields | Description |
|---|---|
| Set Default City | Holds the list of City names. [Combo Box] |
| Set Default Hotspot | Holds the list of hotspots. [Combo Box] |
| Set Default Place Hotspot | Holds the list of place hotspots. [Combo Box] |
| Set Default | When clicked, updates the information. [Button] |

The Licensee needs to select the default city name, hotspot and place hotspot and click on the Set Default button. Then the City, map hotspot and place hotspot are added to the application as default settings. These default settings for City Tour are displayed to the user in the User Interface by default.

4.3.2 Special Tour Default Settings

Figure 76:
FIG. 76 is a screen shot illustrating the Licensee Manage Default Settings for Special Tour page, according to an exemplary embodiment of the present invention.

The screen allows the licensee to add default settings for the Special Tour. On clicking the Manage Default Settings for Special Tour link the screen will be displayed as shown in FIG. 76.

About the Fields:

| Fields | Description |
|---|---|
| Set Default Spl Tours | Holds the list of Special Tours. [Combo Box] |
| Set Default Hotspot | Holds the list of hotspots. [Combo Box] |
| Set Default Place Hotspot | Holds the list of place hotspots. [Combo Box] |
| Set Default | When clicked, sets the default settings to the system [Button] |

The licensee is required to select the special tour, hotspot, place hotspot and click on the Set Default button. Then the special tour, hotspot and place hotspot are added to the application as default settings. These default settings for Special Tour are displayed to the user in the User Interface by default.

5. User Interface

Figure 77:
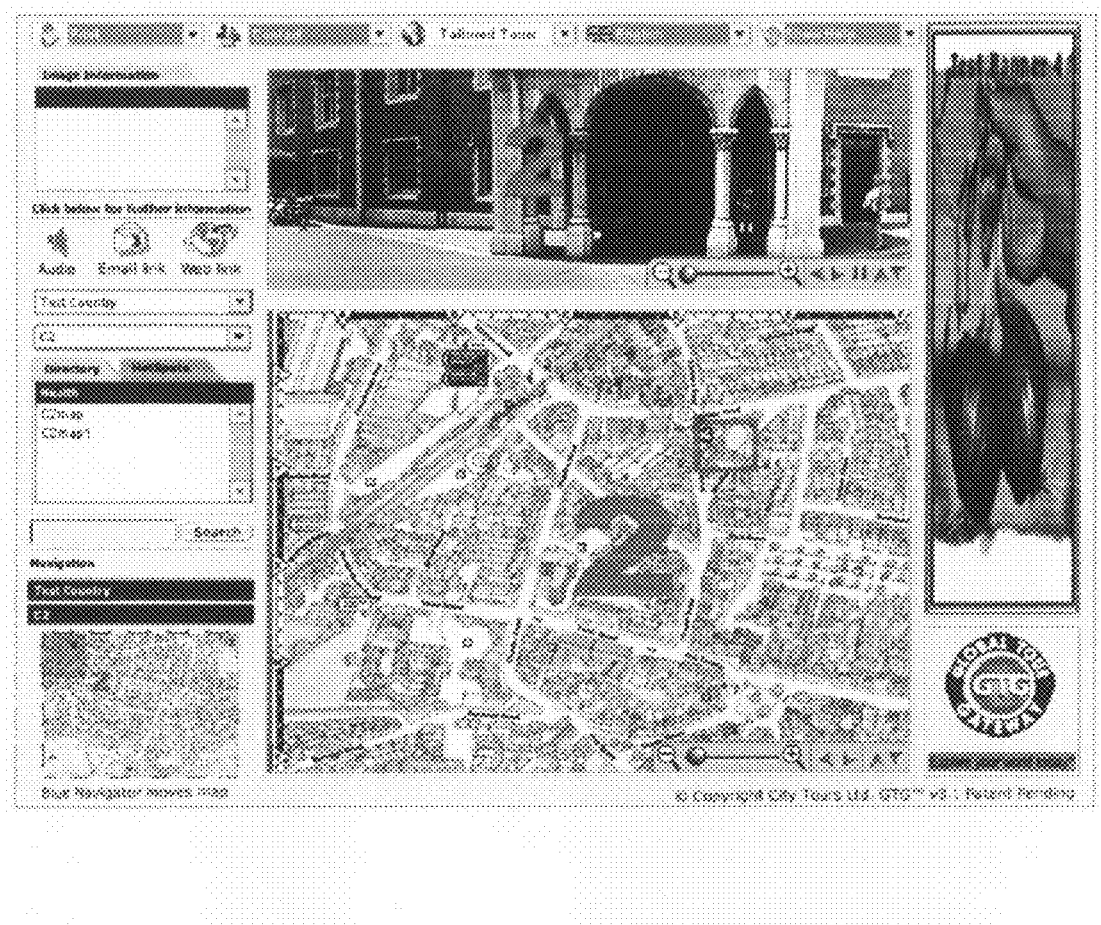
FIG. 77 is a screen shot of the User Interface, according to an exemplary embodiment of the present invention.
Figure 78:
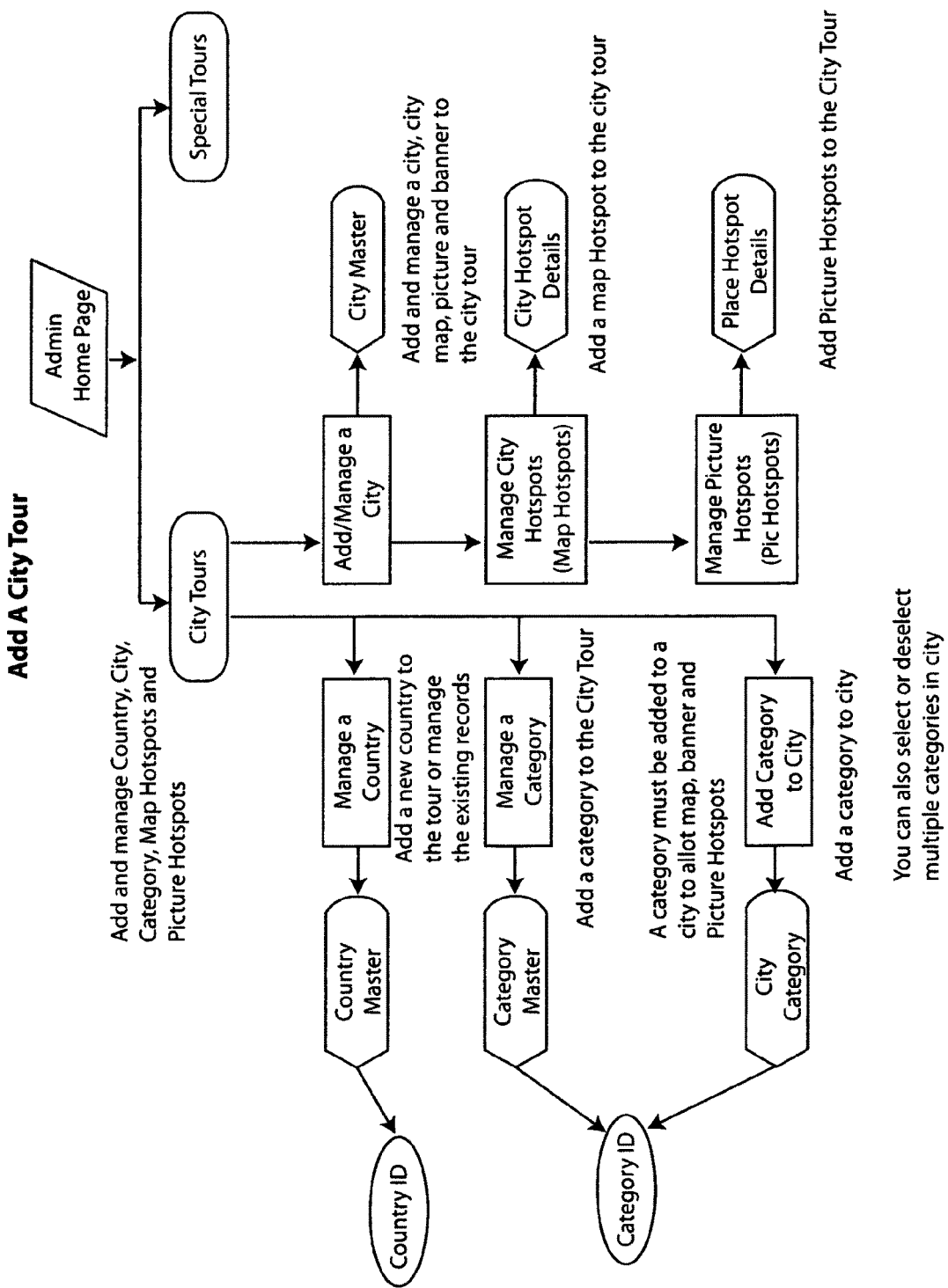
FIG. 78 is a flow chart illustrating a method for adding and managing Country and City Tours, according to an exemplary embodiment of the present invention.
Figure 79:
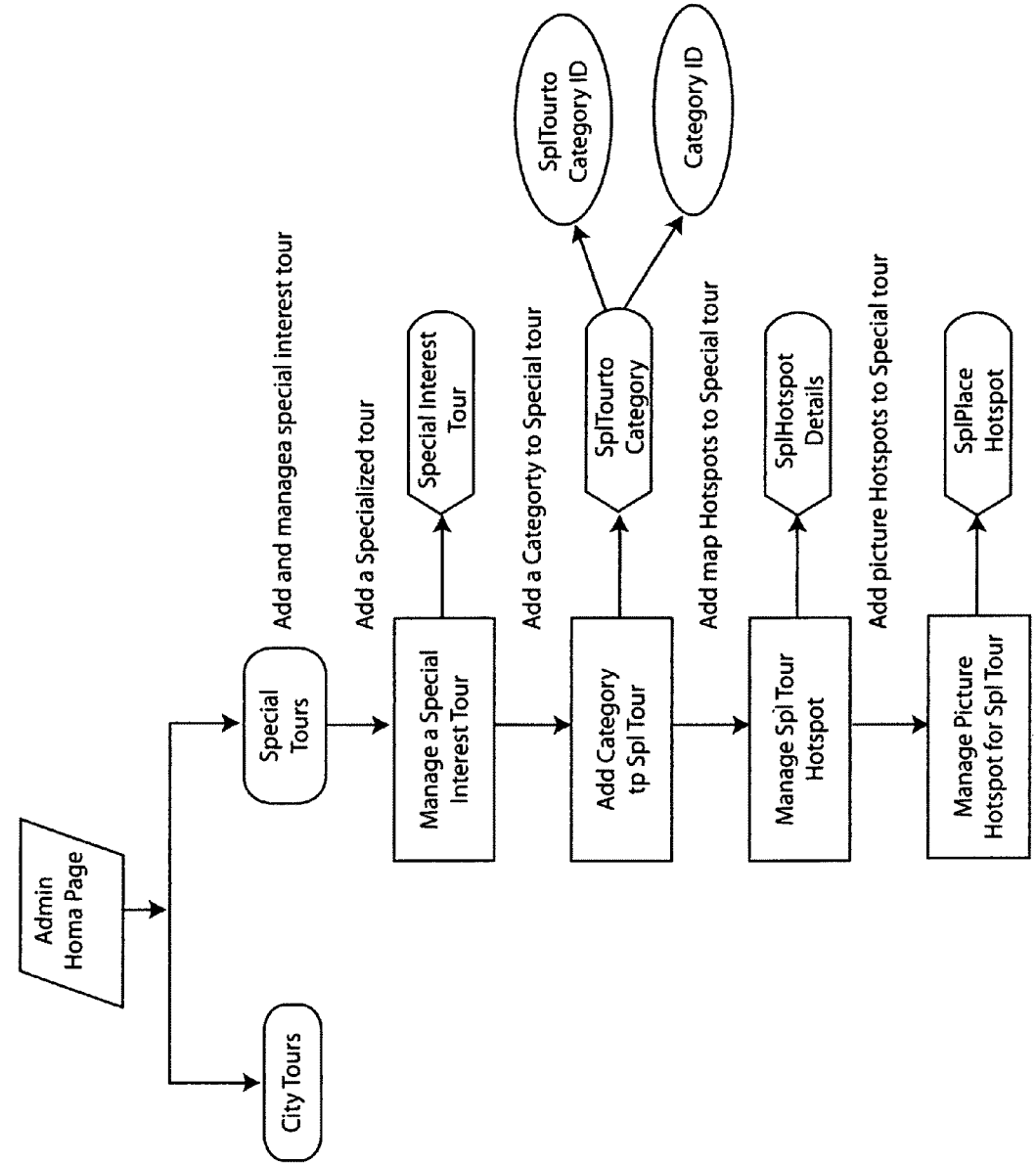
FIG. 79 is a flow chart illustrating a method for adding and managing a Special Tour, according to an exemplary embodiment of the present invention.
Figure 80:
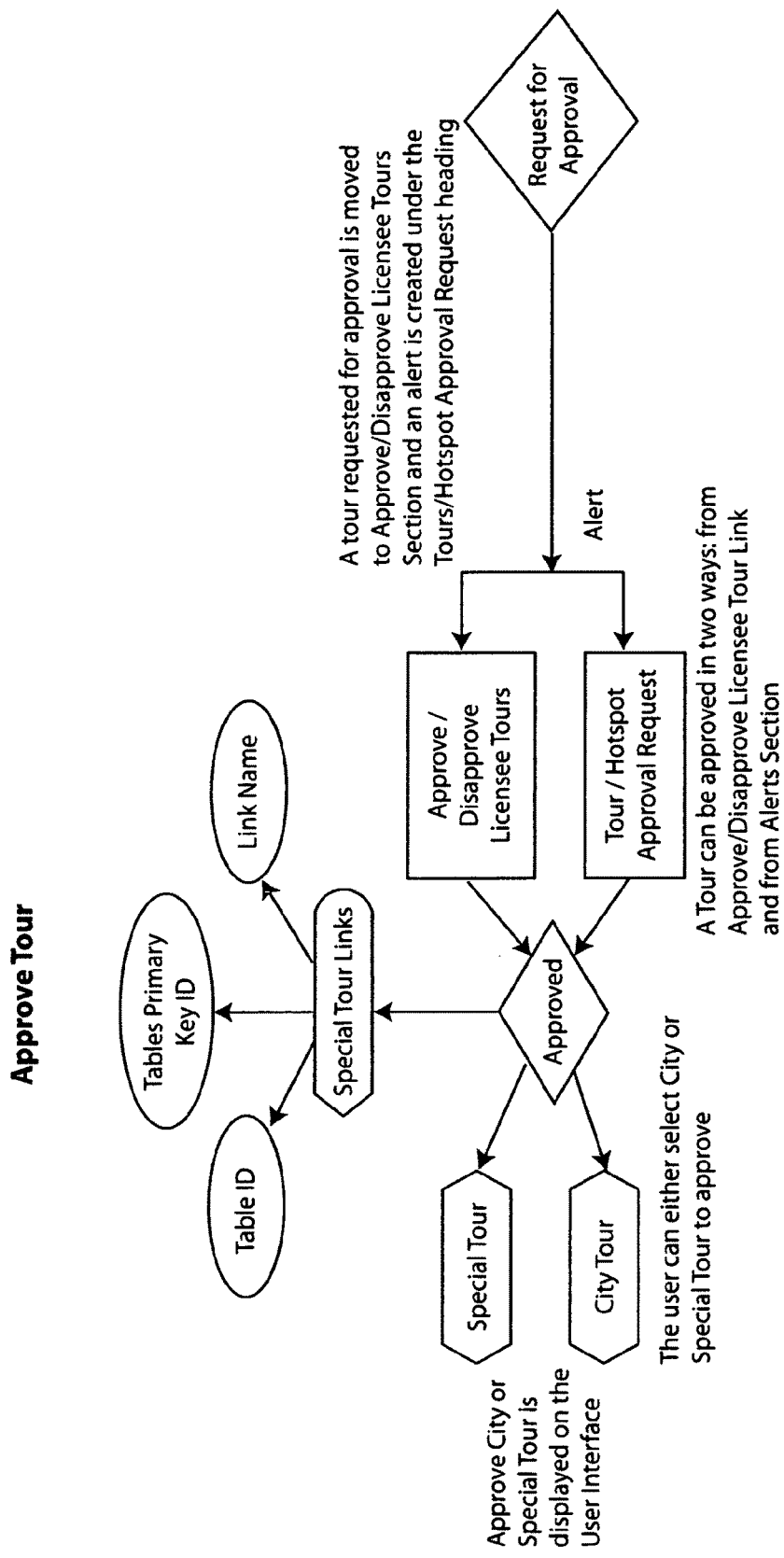
FIG. 80 is a flow chart illustrating a method for approving or disproving Country and City Tours, according to an exemplary embodiment of the present invention.
Figure 81:
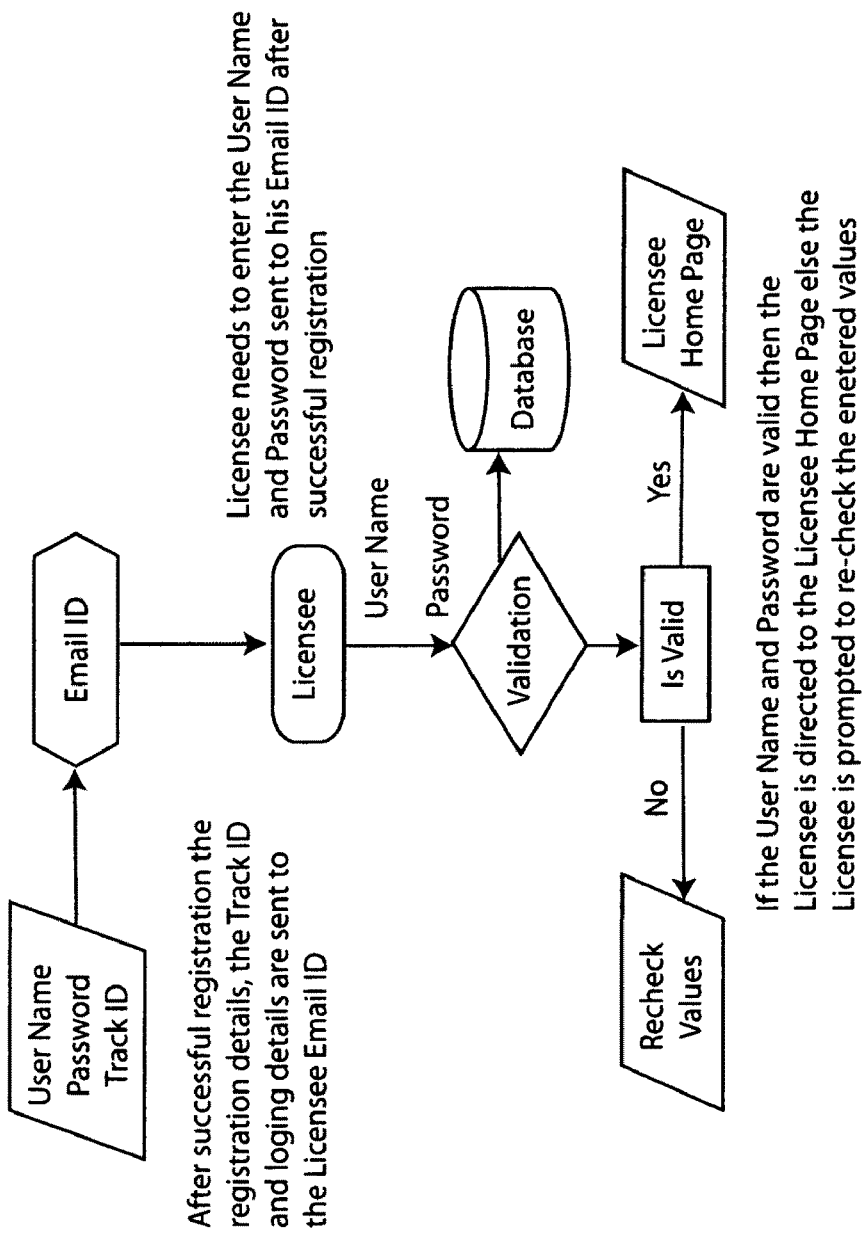
FIG. 81 is a flow chart illustrating a method for handling the Licensee Module Login, according to an exemplary embodiment of the present invention.
Figure 82:
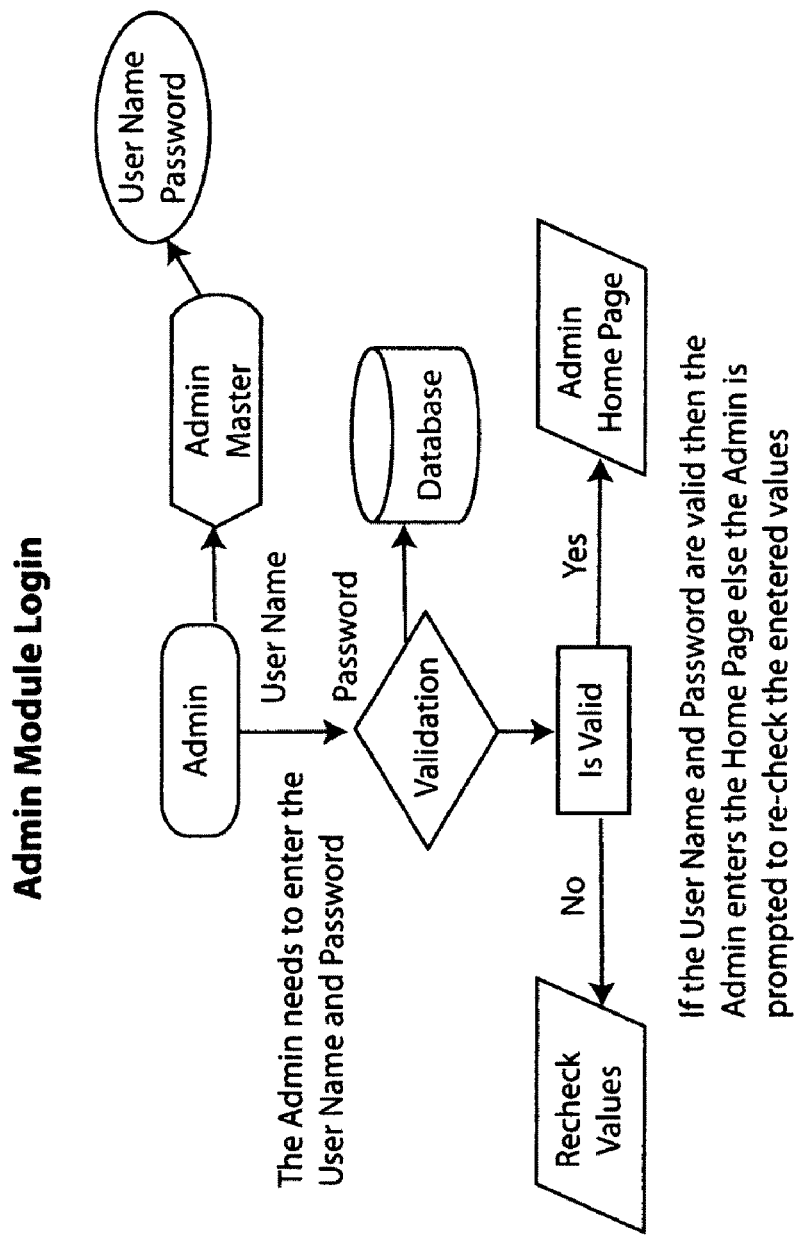
FIG. 82 is a flow chart illustrating a method for handling the Admin Module Login, according to an exemplary embodiment of the present invention.
Figure 83:
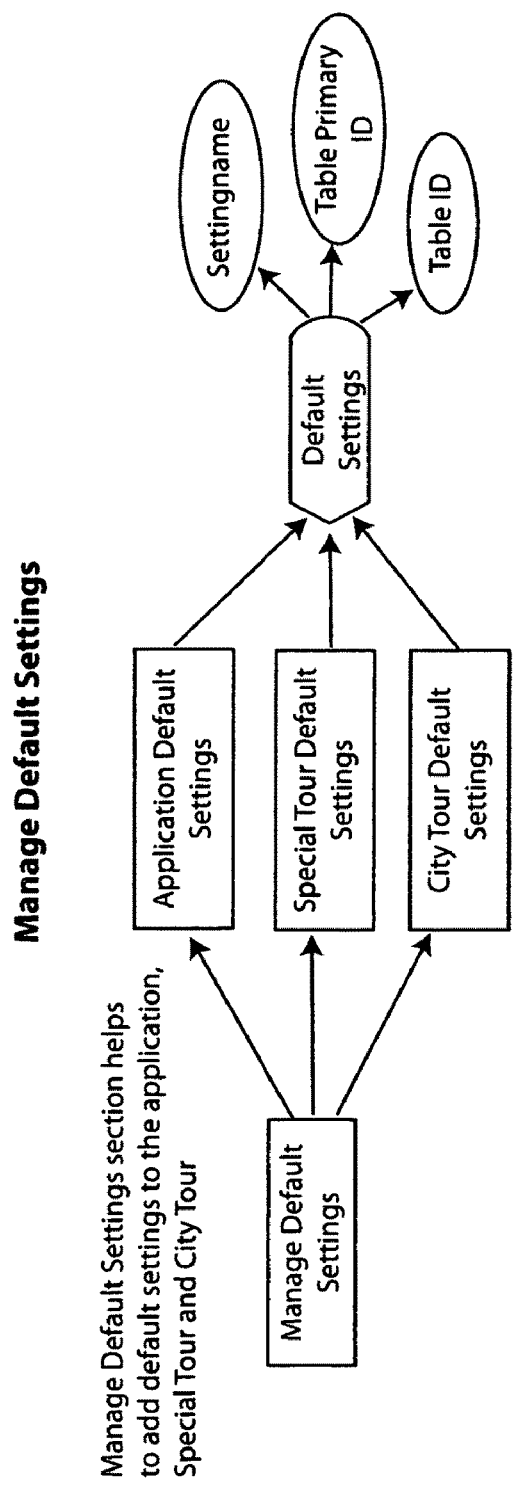
FIG. 83 is a flow chart illustrating a method for handling the Manage Default Settings for City Tours and Special Tours, according to an exemplary embodiment of the present invention.
Figure 84:
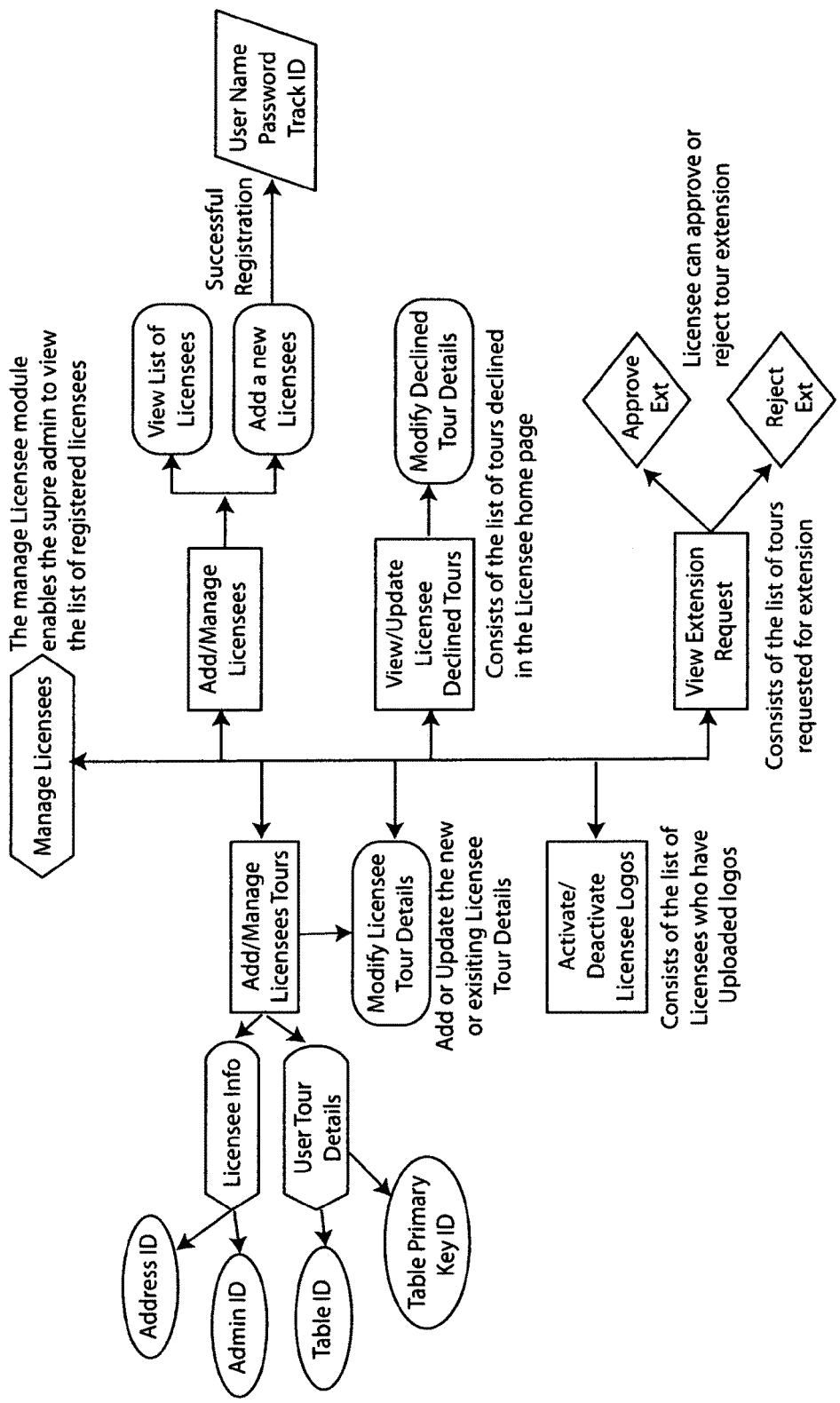
FIG. 84 is a flow chart illustrating a method for handling the Licensee Module Login, according to an exemplary embodiment of the present invention.
Figure 85:
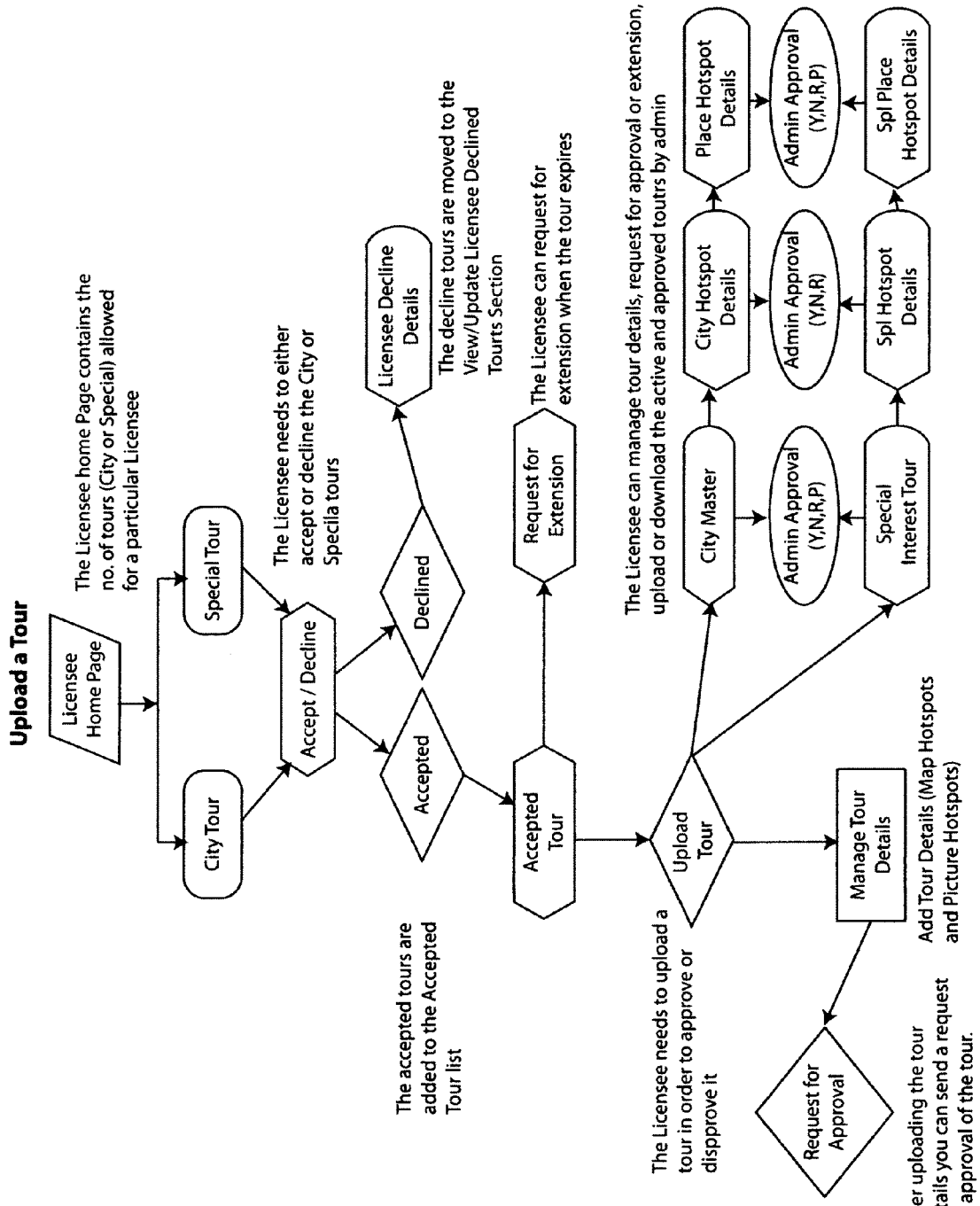
FIG. 85 is a flow chart illustrating a method for handling the Upload of a City Tour or Special Tour, according to an exemplary embodiment of the present invention.

The City Explorer User Interface enables the user to explore the City or Special Tour map hotspots, picture hotspots, and banners configured in the admin module. The User Interface is a user-friendly application. Most of the fields are self-explanatory and the user can use mouse to access the whole application. The User Interface screen appears as shown in FIG. 77.

The following fields are displayed on the top of the User Interface, which allow the user to perform the following tasks:

Print: Provides the print options such as Print Map and Print Image. The user can print either map or image by using this option. Services: Provides services such as client login, join the GTG, FREE tour, order a tour, and contact details. Tailored Tours: Provides the list of special tours. The user can view Special Tours by using this option. English: Provides the language options to the user. The user can view the application in whichever language he/she wants by using this option.

Help: Provides context sensitive help to the user. This opens a new window providing the information about the User Interface.

To Explore a City Tour:

The user needs to select a country of his/her choice from the "Country" drop down and the cities related to the selected country will be listed in the "City" drop down list. After selecting a city the user needs to choose any category listed under the "Directory" tab. By double clicking on any "Business Category" all the related hotspots will be listed under the "Hotspots" tab and the associated pulsing hotspots will be displayed in blue ripples on the map.

When the user selects a hotspot under the "Hotspots" tab then the activated hotspot is displayed on the map, the related 360° panoramic picture or video will be loaded, the promotional banner will be displayed and linked to their Website and Email and simultaneously the information related to the selected hotspot appears in the "Image Information" field.

The hotspots can also be activated in two ways:
By selecting a hotspot under the "Hotspot"
By placing a cursor over a hotspot, this displays a thumbnail providing a preview or more information about the hotspot. By clicking on the hotspot the hotspots are activated.

The user can delve in depth into a picture by clicking on any Red Transparent circle(s) that may appear in the 360° panoramic picture. The user can explore the picture to any level till the Red Transparent circle appears on the picture.

Search a Hotspot

The user can also select a hotspot after selecting Country, City and Category. The user can enter the Hotspot name in the "Search" field and click on the Search button.

Map Navigator

The map navigator highlights the area of the map, which the user is viewing. The user can navigate the map in two ways:
By using the arrow movement buttons located in the bottom left on the map.
By placing the cursor on one of the four edges of the map.
By placing the cursor in the "Map Navigator" and dragging the blue box that highlights the part, which the user is viewing.

Zoom in on Picture/Map

The user can zoom in Picture/Map inwards and outwards by using the zoom icons "−" and "+" located below the picture/map.

Note: The user can exit zoom only by pressing the "Exit Zoom" bar located at the bottom of the map.

Web Link

The user can visit the selected hotspot by using the "Web Link" button.

Email Link

The user can contact selected hotspot by using "Email Link" button.

Audio & Video

The user can also view Audio and Video pictures by using "Audio" button.

The invention claimed is:

1. A method for preparing and delivering virtual tour content, and the method includes the steps:
(A) providing at a back-end of an http web server, a super administrator module electronically issuing a tour owner license (I) for operating an administrative module, and the license is issued to a tour owner, and the respective tour owner is one of a large plurality of tour owners, wherein the license includes a permit for creating a tour of hotspots with a predetermined initial hotspot for the respective tour and (II) for managing and adding data and relationship into a relational database for touring;
(B) maintaining the relational database for transforming and extracting an elected virtual tour presentation from the data and relationship of the relational database for touring so that respective multimedia tour presentations are according to tour owner and geographical location;
(C) accepting at a back-end of the http web server, the administrative module electronically from the respective licensed tour owner (I) a coordinated package of multimedia tour content wherein said content is organized as hotspots, and (II) meta-rules for the respective hotspots wherein said meta-rules consisting of setting category for the tour, for turning the hotspot on/off, and for activating/de-activating the tour; (D) executing at the http web server, a predetermined ensemble software instructions consisting of (I) applying the meta-rules to the coordinated package of multimedia tour content, (II) assembling the coordinated package of multimedia tour content onto a tour of the respective hotspots, (III) activating a relational database to the coordinated package of tour content, (IV) indexing the hotspots by country and by city therein, (V) integrating this package of tour content into a collection of multimedia content for the large plurality of tours, and (VI) storing respective control rules for managing presentation of each tour to a front-end user; and (E) executing at a front-end of the http web server, a predetermined ensemble of software instructions (I) electronically allowing a user to select a tour from the large plurality of tours wherein said selection includes parameters of by country and by city therein, and (II) electronically delivering the tour to the user, wherein the tour is (a) an organized collection of multimedia content hotspots on a map, (b) the respective control rules for managing navigation of these hotspots, and (c) the respective control rules for presentation of the multimedia content thereat.

2. The method according to claim 1 wherein maintaining the relational database for transforming and extracting an elected virtual tour presentation includes configuring the presentation to be consisting of
A) a predetermined ensemble of executing software instructions enabled on an http web server wherein said software includes relational database rules for storing synchronized geographical multimedia content for a large plurality of virtual tours of real geographical sites, wherein (I) each tour is (a) an organized collection of multimedia content hotspots on a map, (b) the respective control rules for managing navigation of these hotspots, (c) the respective control rules for presentation of the multimedia content thereat, and (d) for each tour, front-end category organization of the content including parameters of by country and by city therein; and wherein (II) the multimedia content is organized as hotspots and most of said hotspots include (a) a map-coordinate association, (b) at least one category descriptor, (c) a banner, (d) an associated text, and (e) at least one content item selected from the list: a picture, a panorama, and a video.

3. The method according to claim 1 wherein maintaining the relational database for transforming and extracting an elected virtual tour presentation that includes a predetermined initial hotspot for the respective tour and includes at least four sub-entities selected from the list: a Title, a Business description, a Panoramic image, a Select Target Image, a High Resolution Picture, a Map, a PDF, a Publicity banner, an email, a web link, and an Audio clip.

4. The method according to claim 1 wherein maintaining the relational database for transforming and extracting an elected virtual tour presentation that includes a map-coordinate association, at least one category descriptor, a banner, an associated text, and at least one content item selected from the list: a picture, a panorama, and a video.

5. A virtual tour content preparing and delivering system, and the system includes:
(A) a back-end of an http web server enabled with executable software providing a super administrator module electronically issuing a tour owner license (I) for operating an administrative module, and the license is issued to a tour owner, and the respective tour owner is one of a large plurality of tour owners, wherein the license includes a permit for creating a tour of hotspots with a predetermined initial hotspot for the respective tour and (II) for managing and adding data and relationship into a relational database for touring;
(B) in communications with the an http web server, computer hardware maintaining the relational database for transforming and extracting an elected virtual tour presentation from the data and relationship of the relational database for touring so that respective multimedia tour presentations are according to tour owner and geographical location;
(C) a back-end of the http web server enabled with executable software for the administrative module electronically accepting from the respective licensed tour owner (I) a coordinated package of multimedia tour content wherein said content is organized as hotspots, and (II) meta-rules for the respective hotspots wherein said meta-rules consisting of setting category for the tour, for turning the hotspot on/off, and for activating/de-activating the tour;
(D) in communications with the an http web server, computer hardware having a predetermined ensemble software instructions consisting of (I) applying the meta-rules to the coordinated package of multimedia tour content, (II) assembling the coordinated package of multimedia tour content onto a tour of the respective hotspots, (III) activating a relational database to the coordinated package of tour content, (IV) indexing the hotspots by country and by city therein, (V) integrating this package of tour content into a collection of multimedia content for the large plurality of tours, and (VI) storing respective control rules for managing presentation of each tour to a front-end user; and (E) a front-end of the http web server enabled with executable software for (I) electronically allowing a user to select a tour from the large plurality of tours wherein said selection includes parameters of by country and by city therein, and (II) electronically delivering the tour to the user, wherein the tour is (a) an organized collection of multimedia content hotspots on a map, (b) the respective control rules for managing navigation of these hotspots, and (c) the respective control rules for presentation of the multimedia content thereat.

6. The system according to claim 5 wherein computer hardware maintaining the relational database includes executable software for configuring the presentation consisting of A) a predetermined ensemble of executing software instructions enabled on an http web server wherein said software includes relational database rules for storing synchronized geographical multimedia content for a large plurality of virtual tours of real geographical sites, wherein (I) each tour is (a) an organized collection of multimedia content hotspots on a map, (b) the respective control rules for managing navigation of these hotspots, (c) the respective control rules for presentation of the multimedia content thereat, and (d) for each tour, front-end category organization of the content including parameters of by country and by city therein; and wherein (II) the multimedia content is organized as hotspots and most of said hotspots include (a) a map-coordinate association, (b) at least one category descriptor, (c) a banner, (d) an associated text, and (e) at least one content item selected from the list: a picture, a panorama, and a video.

7. The system according to claim 5 wherein computer hardware maintaining the relational database includes executable software for an elected virtual tour presentation that includes a predetermined initial hotspot for the respective tour and includes at least four sub-entities selected from the list: a Title, a Business description, a Panoramic image, a Select Target Image, a High Resolution Picture, a Map, a PDF, a Publicity banner, an email, a web link, and an Audio clip.

8. The system according to claim 5 wherein computer hardware maintaining the relational database includes executable software for an elected virtual tour presentation that includes a map-coordinate association, at least one category descriptor, a banner, an associated text, and at least one content item selected from the list: a picture, a panorama, and a video.

9. A non-transitory medium for use on at least one intercommunication enabled computing device, the medium holding instructions executable using the at least one computing device, the instructions for performing the steps of:
(A) providing at a back-end of an http web server, a super administrator module electronically issuing a tour owner license (I) for operating an administrative module, and the license is issued to a tour owner, and the respective tour owner is one of a large plurality of tour owners, wherein the license includes a permit for creating a tour of hotspots with a predetermined initial hotspot for the respective tour and (II) for managing and adding data and relationship into a relational database for touring;
(B) maintaining the relational database for transforming and extracting an elected virtual tour presentation from the data and relationship of the relational database for touring so that respective multimedia tour presentations are according to tour owner and geographical location;
(C) accepting at a back-end of the http web server, the administrative module electronically from the respective licensed tour owner (I) a coordinated package of multimedia tour content wherein said content is organized as hotspots, and (II) meta-rules for the respective hotspots wherein said meta-rules consisting of setting category for the tour, for turning the hotspot on/off, and for activating/de-activating the tour;
(D) executing at the http web server, a predetermined ensemble software instructions consisting of (I) applying the meta-rules to the coordinated package of multimedia tour content, (II) assembling the coordinated package of multimedia tour content onto a tour of the respective hotspots, (III) activating a relational database to the coordinated package of tour content, (IV) indexing the hotspots by country and by city therein, (V) integrating this package of tour content into a collection of multimedia content for the large plurality of tours, and (VI) storing respective control rules for managing presentation of each tour to a front-end user; and (E) executing at a front-end of the http web server, a predetermined ensemble of software instructions (I) electronically allowing a user to select a tour from the large plurality of tours wherein said selection includes parameters of by country and by city therein, and (II) electronically delivering the tour to the user, wherein the tour is (a) an organized collection of multimedia content hotspots on a map, (b) the respective control rules for managing navigation of these hotspots, and (c) the respective control rules for presentation of the multimedia content thereat.

10. The non-transitory medium of claim 9, wherein the maintaining the relational database for transforming and extracting an elected virtual tour presentation instructions further perform the step of: configuring the presentation to be consisting of A) a predetermined ensemble of executing software instructions enabled on an http web server wherein said software includes relational database rules for storing synchronized geographical multimedia content for a large plurality of virtual tours of real geographical sites, wherein (I) each tour is (a) an organized collection of multimedia content hotspots on a map, (b) the respective control rules for managing navigation of these hotspots, (c) the respective control rules for presentation of the multimedia content thereat, and (d) for each tour, front-end category organization of the content including parameters of by country and by city therein; and wherein (II) the multimedia content is organized as hotspots and most of said hotspots include (a) a map-coordinate association, (b) at least one category descriptor, (c) a banner, (d) an associated text, and (e) at least one content item selected from the list: a picture, a panorama, and a video.

* * * * *